United States Patent
Hinckley et al.

(10) Patent No.: US 9,411,498 B2
(45) Date of Patent: Aug. 9, 2016

(54) BRUSH, CARBON-COPY, AND FILL GESTURES

(75) Inventors: Kenneth P. Hinckley, Redmond, WA (US); Koji Yatani, Toronto (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/484,075

(22) Filed: May 30, 2012

(65) Prior Publication Data

US 2012/0236026 A1    Sep. 20, 2012

Related U.S. Application Data

(63) Continuation of application No. 12/695,959, filed on Jan. 28, 2010, now Pat. No. 8,261,213.

(51) Int. Cl.
*G06F 3/048* (2013.01)
*G06F 3/0484* (2013.01)
*G06F 3/0354* (2013.01)
*G06F 3/0488* (2013.01)

(52) U.S. Cl.
CPC ........ *G06F 3/04845* (2013.01); *G06F 3/03545* (2013.01); *G06F 3/04883* (2013.01); *G06F 2203/04808* (2013.01)

(58) Field of Classification Search
CPC .............................. G06F 3/0481; G06F 3/041
USPC ................... 715/769, 863, 702, 770
See application file for complete search history.

(56) References Cited

U.S. PATENT DOCUMENTS

| | | | |
|---|---|---|---|
| 4,686,332 | A | 8/1987 | Greanias et al. |
| 4,843,538 | A | 6/1989 | Lane et al. |
| 4,868,912 | A | 9/1989 | Doering |
| 5,231,578 | A | 7/1993 | Levin et al. |
| 5,237,647 | A | 8/1993 | Roberts et al. |
| 5,252,951 | A | 10/1993 | Tannenbaum et al. |
| 5,351,995 | A | 10/1994 | Booker et al. |
| 5,404,458 | A | 4/1995 | Zetts |
| 5,463,725 | A | 10/1995 | Henckel et al. |

(Continued)

FOREIGN PATENT DOCUMENTS

| | | |
|---|---|---|
| CN | 1326564 | 12/2001 |
| CN | 1578430 | 2/2005 |

(Continued)

OTHER PUBLICATIONS

"Final Office Action", U.S. Appl. No. 12/700,357, (Oct. 24, 2012), 13 pages.

(Continued)

*Primary Examiner* — Daeho Song
(74) *Attorney, Agent, or Firm* — Judy Yee; Micah Goldsmith; Micky Minhas

(57) ABSTRACT

Techniques involving gestures and other functionality are described. In one or more implementations, the techniques describe gestures that are usable to provide inputs to a computing device. A variety of different gestures are contemplated, including bimodal gestures (e.g., using more than one type of input) and single modal gestures. Additionally, the gesture techniques may be configured to leverage these different input types to increase the amount of gestures that are made available to initiate operations of a computing device.

20 Claims, 38 Drawing Sheets

(56) References Cited

U.S. PATENT DOCUMENTS

| | | |
|---|---|---|
| 5,491,783 A | 2/1996 | Douglas et al. |
| 5,496,974 A | 3/1996 | Akebi et al. |
| 5,497,776 A | 3/1996 | Yamazaki et al. |
| 5,511,148 A * | 4/1996 | Wellner .................... 358/1.6 |
| 5,555,369 A | 9/1996 | Menendez et al. |
| 5,596,697 A | 1/1997 | Foster et al. |
| 5,661,773 A | 8/1997 | Swerdloff et al. |
| 5,664,128 A | 9/1997 | Bauer |
| 5,664,133 A | 9/1997 | Malamud et al. |
| 5,694,150 A | 12/1997 | Sigona et al. |
| 5,731,813 A | 3/1998 | O'Rourke et al. |
| 5,761,485 A | 6/1998 | Munyan |
| 5,777,596 A | 7/1998 | Herbert |
| 5,817,019 A | 10/1998 | Kawashima |
| 5,821,930 A | 10/1998 | Hansen |
| 5,838,889 A | 11/1998 | Booker et al. |
| 5,898,434 A | 4/1999 | Small et al. |
| 5,943,052 A | 8/1999 | Allen |
| 5,969,720 A | 10/1999 | Lisle et al. |
| 6,029,214 A | 2/2000 | Dorfman et al. |
| 6,037,937 A | 3/2000 | Beaton et al. |
| 6,061,061 A | 5/2000 | Conrad et al. |
| 6,072,476 A | 6/2000 | Harada et al. |
| 6,097,392 A | 8/2000 | Leyerle |
| 6,115,724 A | 9/2000 | Booker et al. |
| 6,167,439 A | 12/2000 | Levine et al. |
| 6,208,331 B1 | 3/2001 | Singh |
| 6,239,798 B1 | 5/2001 | Ludolph et al. |
| 6,246,395 B1 | 6/2001 | Goyins |
| 6,266,050 B1 | 7/2001 | Oh et al. |
| 6,278,443 B1 | 8/2001 | Amro et al. |
| 6,310,610 B1 | 10/2001 | Beaton et al. |
| 6,340,979 B1 | 1/2002 | Beaton et al. |
| 6,396,523 B1 | 5/2002 | Segal et al. |
| 6,459,424 B1 | 10/2002 | Resman |
| 6,507,352 B1 | 1/2003 | Cohen et al. |
| 6,525,749 B1 | 2/2003 | Moran et al. |
| 6,545,669 B1 | 4/2003 | Kinawi et al. |
| 6,831,631 B2 | 12/2004 | Chuang |
| 6,859,909 B1 | 2/2005 | Lerner et al. |
| 6,920,619 B1 | 7/2005 | Milekic |
| 6,957,233 B1 | 10/2005 | Beezer et al. |
| 7,023,427 B2 | 4/2006 | Kraus et al. |
| 7,053,887 B2 | 5/2006 | Kraus et al. |
| 7,295,191 B2 | 11/2007 | Kraus et al. |
| 7,302,650 B1 | 11/2007 | Allyn |
| 7,338,224 B2 | 3/2008 | Jones et al. |
| 7,339,580 B2 | 3/2008 | Westerman et al. |
| 7,454,717 B2 | 11/2008 | Hinckley et al. |
| 7,479,949 B2 | 1/2009 | Jobs |
| 7,506,269 B2 | 3/2009 | Lang |
| 7,532,196 B2 | 5/2009 | Hinckley |
| 7,561,146 B1 | 7/2009 | Hotelling |
| 7,636,071 B2 | 12/2009 | O'Gorman |
| 7,636,898 B2 * | 12/2009 | Takahashi ............ G06F 3/0486 715/769 |
| 7,643,012 B2 | 1/2010 | Kim et al. |
| 7,656,393 B2 | 2/2010 | King et al. |
| 7,676,767 B2 | 3/2010 | Hofmeister et al. |
| 7,760,187 B2 | 7/2010 | Kennedy |
| 7,821,780 B2 | 10/2010 | Choy |
| 7,847,789 B2 | 12/2010 | Kolmykov-Zotov et al. |
| D631,043 S | 1/2011 | Kell |
| 7,898,529 B2 | 3/2011 | Fitzmaurice et al. |
| 7,956,847 B2 | 6/2011 | Christie |
| 8,018,440 B2 | 9/2011 | Townsend et al. |
| 8,102,858 B1 | 1/2012 | Rahim et al. |
| 8,122,384 B2 | 2/2012 | Partridge et al. |
| 8,169,418 B2 | 5/2012 | Birkler |
| 8,212,788 B2 | 7/2012 | Lam |
| 8,239,785 B2 | 8/2012 | Hinckley |
| 8,261,213 B2 | 9/2012 | Hinckley |
| 8,274,482 B2 | 9/2012 | Kim et al. |
| 8,284,170 B2 | 10/2012 | Bernstein |
| 8,289,289 B2 | 10/2012 | Rimon et al. |
| 8,294,669 B2 | 10/2012 | Partridge et al. |
| 8,294,686 B2 | 10/2012 | Townsend et al. |
| 8,327,295 B2 | 12/2012 | Ikeda et al. |
| 8,345,008 B2 | 1/2013 | Lee et al. |
| 8,373,660 B2 | 2/2013 | Pallakoff |
| 8,395,600 B2 | 3/2013 | Kawashima et al. |
| 8,473,870 B2 | 6/2013 | Hinckley et al. |
| 8,477,114 B2 | 7/2013 | Miller et al. |
| 8,539,384 B2 | 9/2013 | Hinckley et al. |
| 8,581,864 B2 | 11/2013 | Miyazawa et al. |
| 8,587,526 B2 | 11/2013 | Engelhardt et al. |
| 8,640,047 B2 | 1/2014 | Mouton et al. |
| 8,643,628 B1 | 2/2014 | Eriksson et al. |
| 8,659,570 B2 | 2/2014 | Townsend et al. |
| 8,707,174 B2 | 4/2014 | Hinckley et al. |
| 8,751,970 B2 | 6/2014 | Hinckley et al. |
| 8,799,827 B2 | 8/2014 | Hinckley et al. |
| 8,810,533 B2 | 8/2014 | Chen |
| 8,836,648 B2 | 9/2014 | Wilairat |
| 8,836,659 B2 | 9/2014 | Chen et al. |
| 9,047,009 B2 | 6/2015 | King |
| 9,075,522 B2 | 7/2015 | Hinckley et al. |
| 2001/0012000 A1 | 8/2001 | Eberhard |
| 2001/0035860 A1 | 11/2001 | Segal et al. |
| 2001/0047263 A1 | 11/2001 | Smith et al. |
| 2002/0060701 A1 | 5/2002 | Naughton et al. |
| 2002/0097229 A1 | 7/2002 | Rose et al. |
| 2002/0101457 A1 | 8/2002 | Lang |
| 2002/0116421 A1 | 8/2002 | Fox et al. |
| 2003/0016253 A1 | 1/2003 | Aoki et al. |
| 2003/0067451 A1 | 4/2003 | Tagg et al. |
| 2003/0095095 A1 | 5/2003 | Pihlaja |
| 2003/0098858 A1 | 5/2003 | Perski et al. |
| 2003/0142081 A1 | 7/2003 | Iizuka |
| 2003/0179541 A1 | 9/2003 | Sullivan |
| 2003/0231219 A1 | 12/2003 | Leung |
| 2004/0001048 A1 | 1/2004 | Kraus et al. |
| 2004/0155871 A1 | 8/2004 | Perski et al. |
| 2004/0175764 A1 * | 9/2004 | Nishiyama ............ G06T 1/00 435/7.2 |
| 2004/0190754 A1 * | 9/2004 | Sakagami ............ H04N 7/18 382/103 |
| 2004/0236741 A1 | 11/2004 | Burstrom |
| 2004/0236774 A1 | 11/2004 | Baird et al. |
| 2004/0255254 A1 | 12/2004 | Weingart et al. |
| 2005/0012723 A1 | 1/2005 | Pallakoff |
| 2005/0017957 A1 | 1/2005 | Yi |
| 2005/0017959 A1 | 1/2005 | Kraus et al. |
| 2005/0052432 A1 | 3/2005 | Kraus et al. |
| 2005/0076300 A1 | 4/2005 | Martinez |
| 2005/0101864 A1 | 5/2005 | Zheng et al. |
| 2005/0129314 A1 | 6/2005 | Chen |
| 2005/0162402 A1 | 7/2005 | Watanachote |
| 2005/0177796 A1 | 8/2005 | Takahashi |
| 2005/0184973 A1 | 8/2005 | Lum et al. |
| 2005/0189154 A1 | 9/2005 | Perski et al. |
| 2005/0198592 A1 | 9/2005 | Keely, Jr. et al. |
| 2006/0001650 A1 | 1/2006 | Robbins et al. |
| 2006/0010371 A1 * | 1/2006 | Shur et al. .................... 715/513 |
| 2006/0012580 A1 | 1/2006 | Perski et al. |
| 2006/0012581 A1 | 1/2006 | Haim et al. |
| 2006/0022955 A1 | 2/2006 | Kennedy |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0031786 A1 | 2/2006 | Hillis et al. |
| 2006/0071912 A1 | 4/2006 | Hill |
| 2006/0092177 A1 | 5/2006 | Blasko |
| 2006/0093219 A1 | 5/2006 | Gounares et al. |
| 2006/0101354 A1 | 5/2006 | Hashimoto et al. |
| 2006/0109252 A1 | 5/2006 | Kolmykov-Zotov et al. |
| 2006/0112335 A1 | 5/2006 | Hofmeister et al. |
| 2006/0161870 A1 | 7/2006 | Hotelling et al. |
| 2006/0197750 A1 | 9/2006 | Kerr et al. |
| 2006/0197753 A1 | 9/2006 | Hotelling |
| 2006/0197963 A1 * | 9/2006 | Royal ............ G06T 11/60 358/1.2 |
| 2006/0238517 A1 | 10/2006 | King et al. |
| 2006/0238520 A1 | 10/2006 | Westerman et al. |

(56) References Cited

U.S. PATENT DOCUMENTS

| | | |
|---|---|---|
| 2006/0262105 A1* | 11/2006 | Smith ............ G06F 3/0488 345/179 |
| 2006/0262188 A1 | 11/2006 | Elyada et al. |
| 2006/0267955 A1 | 11/2006 | Hino |
| 2006/0284852 A1 | 12/2006 | Hofmeister |
| 2007/0043744 A1 | 2/2007 | Carro |
| 2007/0063987 A1 | 3/2007 | Sato et al. |
| 2007/0075976 A1 | 4/2007 | Kun et al. |
| 2007/0097096 A1 | 5/2007 | Rosenberg |
| 2007/0106939 A1 | 5/2007 | Qassoudi |
| 2007/0109274 A1 | 5/2007 | Reynolds |
| 2007/0120762 A1 | 5/2007 | O'Gorman |
| 2007/0146337 A1 | 6/2007 | Ording et al. |
| 2007/0146347 A1 | 6/2007 | Rosenberg |
| 2007/0150496 A1 | 6/2007 | Feinsmith |
| 2007/0152976 A1 | 7/2007 | Townsend et al. |
| 2007/0168890 A1 | 7/2007 | Zhao et al. |
| 2007/0171211 A1 | 7/2007 | Perski et al. |
| 2007/0236468 A1 | 10/2007 | Tuli |
| 2007/0242056 A1 | 10/2007 | Engelhardt et al. |
| 2007/0262951 A1 | 11/2007 | Huie et al. |
| 2008/0001924 A1 | 1/2008 | de los Reyes et al. |
| 2008/0005703 A1 | 1/2008 | Radivojevic et al. |
| 2008/0036743 A1 | 2/2008 | Westerman |
| 2008/0040692 A1 | 2/2008 | Sunday et al. |
| 2008/0042978 A1 | 2/2008 | Perez-Noguera |
| 2008/0046425 A1 | 2/2008 | Perski |
| 2008/0052945 A1 | 3/2008 | Matas et al. |
| 2008/0059914 A1 | 3/2008 | Allyn |
| 2008/0062141 A1 | 3/2008 | Chandhri |
| 2008/0065720 A1 | 3/2008 | Brodersen et al. |
| 2008/0074402 A1 | 3/2008 | Cornish et al. |
| 2008/0082903 A1 | 4/2008 | McCurdy et al. |
| 2008/0084400 A1 | 4/2008 | Rosenberg |
| 2008/0164982 A1 | 7/2008 | Andrews et al. |
| 2008/0165141 A1 | 7/2008 | Christie |
| 2008/0165255 A1 | 7/2008 | Christie et al. |
| 2008/0168396 A1 | 7/2008 | Matas et al. |
| 2008/0168403 A1 | 7/2008 | Westerman et al. |
| 2008/0180404 A1 | 7/2008 | Han et al. |
| 2008/0211766 A1 | 9/2008 | Westerman et al. |
| 2008/0211778 A1 | 9/2008 | Ording et al. |
| 2008/0218494 A1 | 9/2008 | Perski et al. |
| 2008/0229192 A1 | 9/2008 | Gear et al. |
| 2008/0249682 A1 | 10/2008 | Wisniewski et al. |
| 2008/0278455 A1 | 11/2008 | Atkins et al. |
| 2008/0303798 A1 | 12/2008 | Matsudate et al. |
| 2009/0019188 A1 | 1/2009 | Mattice et al. |
| 2009/0033632 A1 | 2/2009 | Szolyga et al. |
| 2009/0054107 A1 | 2/2009 | Feland, III et al. |
| 2009/0058830 A1 | 3/2009 | Herz |
| 2009/0059730 A1 | 3/2009 | Lyons et al. |
| 2009/0064012 A1 | 3/2009 | Tremblay |
| 2009/0074255 A1 | 3/2009 | Holm |
| 2009/0077501 A1 | 3/2009 | Partridge et al. |
| 2009/0079699 A1 | 3/2009 | Sun |
| 2009/0094562 A1 | 4/2009 | Jeong et al. |
| 2009/0096758 A1 | 4/2009 | Hotelling et al. |
| 2009/0117943 A1 | 5/2009 | Lee et al. |
| 2009/0128505 A1 | 5/2009 | Partridge et al. |
| 2009/0138830 A1 | 5/2009 | Borgaonkar et al. |
| 2009/0143141 A1 | 6/2009 | Wells et al. |
| 2009/0153289 A1 | 6/2009 | Hope et al. |
| 2009/0153438 A1 | 6/2009 | Miller et al. |
| 2009/0167696 A1 | 7/2009 | Griffin |
| 2009/0167702 A1 | 7/2009 | Nurmi |
| 2009/0174679 A1 | 7/2009 | Westerman |
| 2009/0184921 A1 | 7/2009 | Scott et al. |
| 2009/0193366 A1 | 7/2009 | Davidson |
| 2009/0217211 A1 | 8/2009 | Hildreth et al. |
| 2009/0249236 A1 | 10/2009 | Westerman et al. |
| 2009/0249247 A1 | 10/2009 | Tseng et al. |
| 2009/0251432 A1 | 10/2009 | Wang et al. |
| 2009/0251434 A1 | 10/2009 | Rimon et al. |
| 2009/0276701 A1 | 11/2009 | Nurmi |
| 2009/0278806 A1 | 11/2009 | Duarte et al. |
| 2009/0282332 A1 | 11/2009 | Porat |
| 2009/0284478 A1 | 11/2009 | De la Torre Baltierra |
| 2009/0295753 A1 | 12/2009 | King et al. |
| 2009/0307589 A1* | 12/2009 | Inose et al. ............ 715/702 |
| 2009/0309846 A1 | 12/2009 | Trachtenberg et al. |
| 2009/0320070 A1 | 12/2009 | Inoguchi |
| 2009/0327963 A1 | 12/2009 | Mouilleseaux et al. |
| 2009/0327975 A1 | 12/2009 | Stedman |
| 2010/0013768 A1 | 1/2010 | Leung |
| 2010/0016049 A1 | 1/2010 | Shirakawa et al. |
| 2010/0020025 A1 | 1/2010 | Lemort et al. |
| 2010/0039392 A1 | 2/2010 | Pratt et al. |
| 2010/0042827 A1 | 2/2010 | Pratt et al. |
| 2010/0045705 A1 | 2/2010 | Vertegaal et al. |
| 2010/0050076 A1 | 2/2010 | Roth |
| 2010/0051355 A1 | 3/2010 | Yang |
| 2010/0053103 A1 | 3/2010 | No et al. |
| 2010/0053861 A1 | 3/2010 | Kim et al. |
| 2010/0058182 A1 | 3/2010 | Jung |
| 2010/0060607 A1 | 3/2010 | Ludwig |
| 2010/0066667 A1 | 3/2010 | MacDougall et al. |
| 2010/0066694 A1 | 3/2010 | Jonsdottir |
| 2010/0066698 A1 | 3/2010 | Seo |
| 2010/0079392 A1 | 4/2010 | Chiang et al. |
| 2010/0081475 A1 | 4/2010 | Chiang et al. |
| 2010/0083154 A1 | 4/2010 | Takeshita |
| 2010/0083190 A1 | 4/2010 | Roberts et al. |
| 2010/0088641 A1 | 4/2010 | Choi |
| 2010/0090971 A1 | 4/2010 | Choi et al. |
| 2010/0097338 A1 | 4/2010 | Miyashita et al. |
| 2010/0103136 A1 | 4/2010 | Ono et al. |
| 2010/0105443 A1 | 4/2010 | Vaisanen |
| 2010/0107067 A1 | 4/2010 | Vaisanen |
| 2010/0110019 A1 | 5/2010 | Ozias et al. |
| 2010/0115455 A1 | 5/2010 | Kim |
| 2010/0123675 A1 | 5/2010 | Ippel |
| 2010/0134415 A1 | 6/2010 | Iwase et al. |
| 2010/0134423 A1 | 6/2010 | Brisebois |
| 2010/0137027 A1 | 6/2010 | Kim |
| 2010/0149109 A1* | 6/2010 | Elias ............ G06F 3/04845 345/173 |
| 2010/0164878 A1 | 7/2010 | Bestle et al. |
| 2010/0164959 A1 | 7/2010 | Brown et al. |
| 2010/0169813 A1 | 7/2010 | Chang |
| 2010/0182247 A1 | 7/2010 | Petschnigg et al. |
| 2010/0182264 A1 | 7/2010 | Hahn et al. |
| 2010/0188371 A1 | 7/2010 | Lowles et al. |
| 2010/0201634 A1 | 8/2010 | Coddington |
| 2010/0213040 A1 | 8/2010 | Yeh et al. |
| 2010/0217428 A1 | 8/2010 | Strong et al. |
| 2010/0220900 A1 | 9/2010 | Orsley |
| 2010/0241973 A1 | 9/2010 | Whiddett |
| 2010/0245263 A1 | 9/2010 | Parada, Jr. et al. |
| 2010/0251112 A1 | 9/2010 | Hinckley et al. |
| 2010/0251189 A1 | 9/2010 | Jaeger |
| 2010/0262928 A1 | 10/2010 | Abbott |
| 2010/0283748 A1 | 11/2010 | Hsieh et al. |
| 2010/0295795 A1 | 11/2010 | Wilairat |
| 2010/0302172 A1 | 12/2010 | Wilairat |
| 2010/0306702 A1 | 12/2010 | Warner |
| 2010/0313124 A1 | 12/2010 | Privault et al. |
| 2010/0321326 A1 | 12/2010 | Grunthaner et al. |
| 2011/0012841 A1 | 1/2011 | Lin |
| 2011/0018821 A1 | 1/2011 | Kii |
| 2011/0041096 A1 | 2/2011 | Larco et al. |
| 2011/0043472 A1 | 2/2011 | Hada |
| 2011/0050594 A1 | 3/2011 | Kim et al. |
| 2011/0055729 A1 | 3/2011 | Mason et al. |
| 2011/0055753 A1 | 3/2011 | Horodezky et al. |
| 2011/0072036 A1 | 3/2011 | Agsen et al. |
| 2011/0107220 A1 | 5/2011 | Perlman |
| 2011/0115735 A1 | 5/2011 | Lev et al. |
| 2011/0117526 A1 | 5/2011 | Wigdor et al. |
| 2011/0126094 A1 | 5/2011 | Horodezky et al. |
| 2011/0143769 A1 | 6/2011 | Jones et al. |
| 2011/0159915 A1 | 6/2011 | Yano et al. |
| 2011/0167336 A1 | 7/2011 | Aitken et al. |
| 2011/0167391 A1 | 7/2011 | Momeyer et al. |

(56) References Cited

U.S. PATENT DOCUMENTS

| | | |
|---|---|---|
| 2011/0169749 A1 | 7/2011 | Ganey et al. |
| 2011/0181524 A1 | 7/2011 | Hinckley |
| 2011/0185299 A1 | 7/2011 | Hinckley |
| 2011/0185300 A1 | 7/2011 | Hinckley |
| 2011/0185318 A1 | 7/2011 | Hinckley |
| 2011/0185320 A1 | 7/2011 | Hinckley |
| 2011/0191704 A1 | 8/2011 | Hinckley |
| 2011/0191718 A1 | 8/2011 | Hinckley |
| 2011/0191719 A1 | 8/2011 | Hinckley |
| 2011/0199386 A1 | 8/2011 | Dharwada et al. |
| 2011/0205163 A1 | 8/2011 | Hinckley |
| 2011/0209039 A1 | 8/2011 | Hinckley |
| 2011/0209057 A1 | 8/2011 | Hinckley |
| 2011/0209058 A1 | 8/2011 | Hinckley |
| 2011/0209088 A1 | 8/2011 | Hinckley |
| 2011/0209089 A1 | 8/2011 | Hinckley |
| 2011/0209093 A1 | 8/2011 | Hinckley |
| 2011/0209097 A1 | 8/2011 | Hinckley |
| 2011/0209098 A1 | 8/2011 | Hinckley |
| 2011/0209099 A1 | 8/2011 | Hinckley |
| 2011/0209100 A1 | 8/2011 | Hinckley |
| 2011/0209101 A1 | 8/2011 | Hinckley |
| 2011/0209102 A1 | 8/2011 | Hinckley |
| 2011/0209103 A1 | 8/2011 | Hinckley |
| 2011/0209104 A1 | 8/2011 | Hinckley |
| 2011/0231796 A1 | 9/2011 | Vigil |
| 2011/0242039 A1 | 10/2011 | Kalis et al. |
| 2011/0242138 A1 | 10/2011 | Tribble |
| 2011/0261058 A1 | 10/2011 | Luo |
| 2011/0291948 A1 | 12/2011 | Stewart et al. |
| 2011/0291964 A1 | 12/2011 | Chambers et al. |
| 2011/0310459 A1 | 12/2011 | Gates et al. |
| 2012/0001861 A1 | 1/2012 | Townsend et al. |
| 2012/0075194 A1 | 3/2012 | Ferren |
| 2012/0084705 A1 | 4/2012 | Lee et al. |
| 2012/0096411 A1 | 4/2012 | Nash |
| 2012/0131454 A1 | 5/2012 | Shah |
| 2012/0154303 A1 | 6/2012 | Lazaridis et al. |
| 2012/0158629 A1 | 6/2012 | Hinckley et al. |
| 2012/0212445 A1 | 8/2012 | Heikkinen et al. |
| 2012/0262407 A1 | 10/2012 | Hinckley et al. |
| 2012/0287076 A1 | 11/2012 | Dao et al. |
| 2012/0304133 A1 | 11/2012 | Nan et al. |
| 2012/0306788 A1 | 12/2012 | Chen et al. |
| 2012/0311476 A1 | 12/2012 | Campbell |
| 2012/0324384 A1 | 12/2012 | Cohen et al. |
| 2013/0038564 A1 | 2/2013 | Ho |
| 2013/0044070 A1 | 2/2013 | Townsend et al. |
| 2013/0063891 A1 | 3/2013 | Martisauskas |
| 2013/0088434 A1 | 4/2013 | Masuda et al. |
| 2013/0093691 A1 | 4/2013 | Moosavi |
| 2013/0117715 A1 | 5/2013 | Williams et al. |
| 2013/0154999 A1 | 6/2013 | Guard |
| 2013/0181902 A1 | 7/2013 | Hinckley |
| 2013/0222287 A1 | 8/2013 | Bae et al. |
| 2013/0265269 A1 | 10/2013 | Sharma et al. |
| 2013/0300668 A1 | 11/2013 | Churikov |
| 2013/0335453 A1 | 12/2013 | Lim et al. |
| 2014/0022183 A1 | 1/2014 | Ayoub et al. |
| 2014/0043265 A1 | 2/2014 | Chang et al. |
| 2014/0043277 A1 | 2/2014 | Saukko et al. |
| 2014/0092041 A1 | 4/2014 | Ih |
| 2014/0111462 A1 | 4/2014 | Townsend et al. |
| 2014/0132551 A1 | 5/2014 | Bathiche |
| 2014/0192019 A1 | 7/2014 | Fukushima |
| 2014/0289668 A1 | 9/2014 | Mavrody |
| 2014/0293145 A1 | 10/2014 | Jones et al. |
| 2014/0337791 A1 | 11/2014 | Agnetta et al. |
| 2015/0042588 A1 | 2/2015 | Park |
| 2015/0145797 A1 | 5/2015 | Corrion |
| 2015/0160849 A1 | 6/2015 | Weiss et al. |
| 2015/0261362 A1 | 9/2015 | King |

FOREIGN PATENT DOCUMENTS

| | | |
|---|---|---|
| CN | 1704888 | 12/2005 |
| CN | 1766824 | 5/2006 |
| CN | 1936799 | 3/2007 |
| CN | 101198925 | 6/2008 |
| CN | 201181467 | 1/2009 |
| CN | 101404687 | 4/2009 |
| CN | 101410781 | 4/2009 |
| CN | 101432677 | 5/2009 |
| CN | 101482790 | 7/2009 |
| CN | 101496404 | 7/2009 |
| CN | 201298220 | 8/2009 |
| CN | 101551728 | 10/2009 |
| CN | 101566865 | 10/2009 |
| CN | 101576789 | 11/2009 |
| CN | 101599002 A | 12/2009 |
| CN | 101609383 A | 12/2009 |
| CN | 101615102 A | 12/2009 |
| CN | 101627361 | 1/2010 |
| CN | 101636711 | 1/2010 |
| EP | 1942401 | 7/2008 |
| EP | 2 081 107 A1 | 7/2009 |
| EP | 2148268 | 1/2010 |
| EP | 2466442 | 6/2012 |
| EP | 2560088 | 2/2013 |
| EP | 2634678 | 9/2013 |
| JP | 6282368 | 10/1994 |
| JP | 7281810 | 10/1995 |
| JP | 2001265523 | 9/2001 |
| JP | 2001290585 | 10/2001 |
| JP | 2002055753 | 2/2002 |
| JP | 2003195998 | 7/2003 |
| JP | 2005004690 | 1/2005 |
| JP | 2005026834 | 1/2005 |
| JP | 2005122271 | 5/2005 |
| JP | 2005149279 | 6/2005 |
| JP | 2007240964 | 9/2007 |
| JP | 3143462 | 7/2008 |
| JP | 2008532185 | 8/2008 |
| JP | 2008217742 | 9/2008 |
| JP | 2008305087 | 12/2008 |
| JP | 2009097724 | 4/2009 |
| JP | 2010019643 | 1/2010 |
| JP | 2010026834 | 2/2010 |
| JP | 2010250465 | 11/2010 |
| KR | 20090013927 | 2/2009 |
| KR | 1020090088501 | 8/2009 |
| KR | 20090106755 | 10/2009 |
| TW | 200921478 | 5/2009 |
| TW | 200947297 | 11/2009 |
| TW | 200951783 | 12/2009 |
| WO | WO-9928812 | 1/1999 |
| WO | WO-2009086628 | 7/2009 |
| WO | WO-2011106467 | 9/2011 |
| WO | WO-2011106468 | 9/2011 |

OTHER PUBLICATIONS

"Final Office Action", U.S. Appl. No. 12/700,460, (Aug. 28, 2012), 26 pages.

"Final Office Action", U.S. Appl. No. 12/700,510, (Oct. 10, 2012), 23 pages.

"Final Office Action", U.S. Appl. No. 12/709,204, (Oct. 3, 2012), 24 pages.

"Final Office Action", U.S. Appl. No. 12/709,376, (Nov. 8, 2012), 20 pages.

"Final Office Action", U.S. Appl. No. 12/713,118, (Oct. 26, 2012), 10 pages.

"Foreign Office Action", Chinese Application No. 201110046529.3, (Aug. 16, 2012), 13 pages.

"Non-Final Office Action", U.S. Appl. No. 12/695,842, (Oct. 3, 2012), 16 pages.

"Non-Final Office Action", U.S. Appl. No. 12/695,976, (Sep. 11, 2012), 8 pages.

"Non-Final Office Action", U.S. Appl. No. 12/709,301, (Sep. 13, 2012), 13 pages.

(56) References Cited

OTHER PUBLICATIONS

"Apple Unibody MacBook Pro #MB991LL/A 2.53 GHz Intel Core 2 Duo", Retrieved from: <http://www.themacstore.com/parts/show/c-nmb3-mb991ll_a> on Nov. 10, 2009, (2009), 12 pages.
"Dell and Windows 7—The Wait is Over", Retrieved from: <http://content.dell.com/us/en/corp/d/press-releases/2009-10-22-Dell-and-Windows-7.aspx> on Nov. 10, 2009, (Oct. 22, 2009), 2 pages.
"Final Office Action", U.S. Appl. No. 12/695,937, (Jul. 26, 2012), 13 pages.
"Final Office Action", U.S. Appl. No. 12/709,245, (Jan. 6, 2012), 13 pages.
"Final Office Action", U.S. Appl. No. 12/709,301, (Mar. 1, 2012), 11 pages.
"Final Office Action", U.S. Appl. No. 12/709,348, (Feb. 17, 2012), 13 pages.
"Final Office Action", U.S. Appl. No. 12/709,376, (Mar. 30, 2012), 16 pages.
"Final Office Action", U.S. Appl. No. 12/713,053, (Aug. 17, 2012), 10 pages.
"Final Office Action", U.S. Appl. No. 12/713,081, (May 9, 2012), 19 pages.
"Final Office Action", U.S. Appl. No. 12/713,113, (Jun. 4, 2012), 18 pages.
"Final Office Action", U.S. Appl. No. 12/713,127, (Jun. 6, 2012), 18 pages.
"Final Office Action", U.S. Appl. No. 12/713,130, (Jun. 29, 2012), 8 pages.
"Final Office Action", U.S. Appl. No. 12/713,133, (Jul. 2, 2012), 8 pages.
"Foreign Office Action", Chinese Application No. 201110046519.X, (Aug. 2, 2012), 12 pages.
"Foreign Office Action", Chinese Application No. 201110050499.3, (Aug. 3, 2012), 8 pages.
"Foreign Office Action", Chinese Application No. 201110050508.9, (Aug. 3, 2012), 8 pages.
"iQuery & Css Example—Dropdown Menu", *DesignReviver*, Retrieved from: <http://designreviver.com/tutorials/jquery-css-example-dropdown-menu/> on Nov. 22, 2011,(Oct. 7, 2008), 30 pages.
"New MS Courier Leak Details Multi-Touch Interface", Retrieved from: <http://www.electronista.com/articles/09/11/04/courier.gestures.ui.explained/> on Nov. 10, 2009, (Nov. 4, 2009), 9 pages.
"Non-Final Office Action", U.S. Appl. No. 12/695,937, (Apr. 25, 2012), 14 pages.
"Non-Final Office Action", U.S. Appl. No. 12/700,357, (Jul. 2, 2012), 10 pages.
"Non-Final Office Action", U.S. Appl. No. 12/700,460, (Jan. 13, 2012), 21 pages.
"Non-Final Office Action", U.S. Appl. No. 12/700,510, (Feb. 7, 2012), 20 pages.
"Non-Final Office Action", U.S. Appl. No. 12/709,204, (May 10, 2012), 20 pages.
"Non-Final Office Action", U.S. Appl. No. 12/709,245, (Nov. 30, 2011), 11 pages.
"Non-Final Office Action", U.S. Appl. No. 12/709,245, (Mar. 21, 2012), 14 pages.
"Non-Final Office Action", U.S. Appl. No. 12/709,282, (Apr. 12, 2012), 9 pages.
"Non-Final Office Action", U.S. Appl. No. 12/709,301, (Nov. 28, 2011), 9 pages.
"Non-Final Office Action", U.S. Appl. No. 12/709,348, (Dec. 7, 2011), 12 pages.
"Non-Final Office Action", U.S. Appl. No. 12/709,348, (Aug. 2, 2012), 14 pages.
"Non-Final Office Action", U.S. Appl. No. 12/709,376, (Jan. 23, 2012), 14 pages.
"Non-Final Office Action", U.S. Appl. No. 12/709,376, (Aug. 17, 2012), 17 pages.
"Non-Final Office Action", U.S. Appl. No. 12/713,053, (Feb. 3, 2012), 8 pages.
"Non-Final Office Action", U.S. Appl. No. 12/713,081, (Dec. 23, 2011), 18 pages.
"Non-Final Office Action", U.S. Appl. No. 12/713,096, (Jun. 6, 2012), 9 pages.
"Non-Final Office Action", U.S. Appl. No. 12/713,110, (Jun. 21, 2012), 21 pages.
"Non-Final Office Action", U.S. Appl. No. 12/713,113, (Dec. 22, 2011), 20 pages.
"Non-Final Office Action", U.S. Appl. No. 12/713,118, (Jun. 8, 2012), 7 pages.
"Non-Final Office Action", U.S. Appl. No. 12/713,127, (Dec. 27, 2011), 22 pages.
"Non-Final Office Action", U.S. Appl. No. 12/713,130, (Jan. 23, 2012), 7 pages.
"Non-Final Office Action", U.S. Appl. No. 12/713,133, (Jan. 31, 2012), 7 pages.
"Notice of Allowance", U.S. Appl. No. 12/695,064, (Mar. 28, 2012), 12 pages.
"Notice of Allowance", U.S. Appl. No. 12/695,959, (Apr. 17, 2012), 13 pages.
"PCT Search Report and Written Opinion", Application No. PCT/US2011/025131, (Oct. 31, 2011),10 pages.
"PCT Search Report and Written Opinion", Application No. PCT/US2011/025974, (Oct. 26, 2011), 8 pages.
"PCT Search Report and Written Opinion", Application No. PCT/US2011/025973, (Oct. 27, 2011), 13 pages.
"PCT Search Report and Written Opinion", Application No. PCT/US2011/025132, (Oct. 26, 2011), 10 pages.
"PCT Search Report and Written Opinion", Application No. PCT/US2011/025575, (Sep. 30, 2011), 14 pages.
"PCT Search Report and Written Opinion", Application No. PCT/US2011/025971, (Oct. 31, 2011), 15 pages.
"PCT Search Report and Written Opinion", Application No. PCT/US/2011025972, (Sep. 30, 2011), 14 pages.
"PCT Search Report and Written Opinion", Application No. PCT/US2011/020412, (Aug. 31, 2011), 9 pages.
"PCT Search Report and Written Opinion", Application No. PCT/US2011/020410, (Sep. 27, 2011), 9 pages.
"PCT Search Report and Written Opinion", Application No. PCT/US2011/020417, (Oct. 20, 2011), 8 pages.
Appleinsider, "Special Report: Apple's Touch-Sensitive iPod Ambitions Disclosed in Filing", Retrieved from: <http://www.appleinsider.com/articles/06/10/26/special_report_apples_touch_sensitive_ipod_ambitions_disclosed_in_filing.html> on Nov. 11, 2009, (Oct. 26, 2006), 10 pages.
Brandl, Peter et al., "Combining and Measuring the Benefits of Bimanual Pen and Direct-Touch Interaction on Horizontal Interfaces", Retrieved from: <http://www.merl.com/papers/docs/TR2008-054.pdf> on Nov. 5, 2009, Mitsubishi Electric Research Laboratories,(May 2008), 10 pages.
Daniels, Martyn "Brave New World", Retrieved from: <http://bookseller-association.blogspot.com/2009_03_01_archive.html> Nov. 10, 2009, (Mar. 2009), 54 pages.
Elliott, Matthew "First Dell, Then HP: What's Next for N-trig's Multitouch Screen Technology", Retrieved from: <http://news.cnet.com/8301-17938_105-10107886-1.html> on Nov. 11, 2009, (Nov. 25, 2008), 5 pages.
Emigh, Jacqueline "Lenovo Launches Windows 7 ThinkPads with Multitouch and Outdoor Screens", Retrieved from: <http://www.betanews.com/article/Lenovo-launches-Windows-7-ThinkPads-with-multitouch-and-outdoor-screens/1253017166> on Nov. 11, 2009, (Sep. 15, 2009), 3 pages.
Gross, Mark D., "Stretch-A-Sketch: A Dynamic Diagrammer", *IEEE Symposium on Visual Languages*, Available at <http://depts.washington.edu/dmachine/PAPER/VL94/vl.html>,(Oct. 1994), 11 pages.
Hinckley, Ken et al., "Codex: A Dual Screen Tablet Computer", *Conference on Human Factors in Computing Systems*, Available at <http://research.microsoft.com/en-us/um/people/kenh/codex-chi-2009-with-authors.pdf>,(2009), 10 pages.
Hinckley, Ken et al., "Stitching: Pen Gestures that Span Multiple Displays", *CHI 2004*, Available at <http://www.cs.cornell.edu/~francois/Papers/2004-Hinckley-AVI04-Stitching.>(2004), pp. 1-8.

(56) References Cited

OTHER PUBLICATIONS

Krazit, Tom "Has Apple Found the Magic Touch?", Retrieved from: <http://news.cnet.com/8301-13579_3-9879471-37.html> on Nov. 10, 2009, (Feb. 26, 2008), 2 pages.
Minsky, Margaret R., "Manipulating Simulated Objects with Real-world Gestures using a Force and Position Sensitive Screen", *Computer Graphics*, vol. 18, No. 3, Available at <http://delivery.acm.org/10.1145/810000/808598/p195-minsky.pdf?key1=808598&key2=2244955521&coll=GUIDE&dl=GUIDE&CFID=57828830&CFTOKEN=43421964>,(Jul. 1984), pp. 195-203.
Olwal, Alex et al., "Rubbing and Tapping for Precise and Rapid Selection on Touch-Screen Displays", *Conference on Human Factors in Computing Systems*, Available at <http://www.csc.kth.se/~alx/projects/research/rubbing/olwal_rubbing_tapping_chi_2008.pdf>,(Apr. 2008), 10 pages.
Pierce, Jeffrey S., et al., "Toolspaces and Glances: Storing, Accessing, and Retrieving Objects in 3D Desktop Applications", *1999 Symposium on Interactive 3D Graphics*, Available at <http://delivery.acm.org/10.1145/310000/300545/p163-pierce.pdf?key1=300545&key2=8792497521&coll=GUIDE&dl=GUIDE&CFID=61004073&CFTOKEN=28819248>,(Apr. 1999), pp. 163-168.
Roth, Volker et al., "Bezel Swipe: Conflict-Free Scrolling and Multiple Selection on Mobile Touch Screen Devices", *CHI 2009*, Available at <http://www.volkerroth.com/download/Roth2009a.pdf>,(Apr. 2009), 4 pages.
Vigil, Jose M., "Methods for Controlling a Floating Cursor on a Multi-touch Mobile Phone or Tablet in Conjunction with Selection Gestures and Content Gestures", U.S. Appl. No. 61/304,972,(Feb. 16, 2010), 54 pages.
Yee, Ka-Ping "Two-Handed Interaction on a Tablet Display", Retrieved from: <http://zesty.ca/tht/yee-tht-chi2004-short.pdf>, Conference on Human Factors in Computing Systems,(Apr. 2004), 4 pages.
"Final Office Action", U.S. Appl. No. 12/695,976,(Nov. 21, 2012),10 pages.
"Final Office Action", U.S. Appl. No. 12/709,245, (Mar. 15, 2013),16 pages.
"Final Office Action", U.S. Appl. No. 12/709,282, (Dec. 24, 2012),11 pages.
"Final Office Action", U.S. Appl. No. 12/709,301, (Jan. 7, 2013),14 pages.
"Final Office Action", U.S. Appl. No. 12/709,348, (Jan. 7, 2013),15 pages.
"Final Office Action", U.S. Appl. No. 12/713,096, (Feb. 15, 2013), 7 pages.
"Final Office Action", U.S. Appl. No. 12/713,110, (Jan. 17, 2013),10 pages.
"Foreign Office Action", Chinese Application No. 201110046529.3, (Feb. 4, 2013), 8 pages.
"Foreign Office Action", Chinese Application No. 201110050499.3, (Nov. 27, 2012), 8 pages.
"Foreign Office Action", Chinese Application No. 201110050508.9, (Mar. 7, 2013), 8 pages.
"Foreign Office Action", European Patent Application No. 11747907.1, (Jan. 28, 2013), 5 pages.
"Foreign Office Action", European Patent Application No. 11748027.7, (Jan. 18, 2013), 5 pages.
"Foreign Office Action", European Patent Application No. 11748026.9, (Jan. 16, 2013), 5 pages.
"Foreign Office Action", European Patent Application No. 11748029.3, (Jan. 16, 2013), 5 pages.
"Foreign Office Action", European Patent Application No. 11748028.5, (Jan. 28, 2013), 5 pages.
"Non-Final Office Action", U.S. Appl. No. 12/709,282, (Feb. 28, 2013), 11 pages.
"Non-Final Office Action", U.S. Appl. No. 12/713,053, (Nov. 23, 2012), 13 pages.
"Non-Final Office Action", U.S. Appl. No. 12/713,081, (Nov. 29, 2012), 9 pages.
"Non-Final Office Action", U.S. Appl. No. 12/713,130, (Jan. 16, 2013), 5 pages.
"Non-Final Office Action", U.S. Appl. No. 12/713,133, (Jan. 14, 2013), 8 pages.
"Notice of Allowance", U.S. Appl. No. 12/713,130, (Feb. 19, 2013), 5 pages.
"Supplementary European Search Report", European Patent Application No. 11747907.1, (Nov. 7, 2012), 3 pages.
"Supplementary European Search Report", European Patent Application No. 11748028.5, (Nov. 7, 2012), 3 pages.
"Supplementary European Search Report", European Patent Application No. 11748027.7, (Nov. 29, 2012), 3 pages.
"Final Office Action", U.S. Appl. No. 12/472,699, (Jul. 29, 2013),12 pages.
"Final Office Action", U.S. Appl. No. 12/472,699, (Feb. 15, 2012),12 pages.
"Final Office Action", U.S. Appl. No. 12/709,282, (Jul. 16, 2013),11 pages.
"Foreign Office Action", Chinese Application 201110044285.5, (Apr. 24, 2013), 8 pages.
"Foreign Office Action", Chinese Application 201110044285.5, (Jun. 20, 2012),12 pages.
"Foreign Office Action", Chinese Application No. 201110044285.5, (Jan. 4, 2013), 13 pages.
"Foreign Office Action", Chinese Application No. 201110046510.9, (May 31, 2013), 11 pages.
"Foreign Office Action", Chinese Application No. 201110046519.X, (Aug. 6, 2013), 10 pages.
"Foreign Office Action", Chinese Application No. 201110046529.3, (Aug. 6, 2013), 10 pages.
"Non-Final Office Action", U.S. Appl. No. 12/472,699, (Mar. 28, 2013),10 pages.
"Non-Final Office Action", U.S. Appl. No. 12/472,699, (Sep. 12, 2011),12 pages.
"Non-Final Office Action", U.S. Appl. No. 12/713,096, (Jun. 26, 2013), 8 pages.
"UI Guidelines", Retrieved from: http://na.blackberry.com/eng/deliverables/6622/BlackBerry_Smartphones-US.pdf., 76 Pages.
Nordgren, Peder "Development of a Touch Screen Interface for Scania Interactor", *Master's Thesis in Computing Science, UMEA University*, Available at <http://www.cs.umu.se/education/exam ina/Rapporter/PederNordgren.pdf>,(Apr. 10, 2007), pp. 1-59.
Vallerio, Keith S., et al., "Energy-Efficient Graphical User Interface Design", Retrieved from: <http://www.cc.gatech.edu/classes/AY2007/cs7470_fall/zhong-energy-efficient-user-interface.pdf>, (Jun. 10, 2004), pp. 1-13.
"Final Office Action", U.S. Appl. No. 12/709,204, (Sep. 12, 2013), 24 pages.
"Final Office Action", U.S. Appl. No. 12/709,301, (Sep. 3, 2013),12 pages.
"Final Office Action", U.S. Appl. No. 12/709,348, (Sep. 12, 2013),12 pages.
"Final Office Action", U.S. Appl. No. 12/709,376, (Sep. 10, 2013),12 pages.
"Final Office Action", U.S. Appl. No. 12/713,113, (Oct. 8, 2013), 21 pages.
"Foreign Office Action", Chinese Application No. 201110050852.8, (Nov. 1, 2013), 8 Pages.
"Non-Final Office Action", U.S. Appl. No. 12/472,699, (Oct. 23, 2013),14 pages.
"Non-Final Office Action", U.S. Appl. No. 12/709,204, (Nov. 20, 2013), 31 pages.
"Non-Final Office Action", U.S. Appl. No. 12/709,282, (Oct. 10, 2013),12 pages.
"Non-Final Office Action", U.S. Appl. No. 12/709,301, (Oct. 24, 2013),11 pages.
"Notice of Allowance", U.S. Appl. No. 12/713,110, Dec. 4, 2013, 13 pages.
"Final Office Action", U.S. Appl. No. 12/695,842, Dec. 2, 2013, 17 pages.

(56) References Cited

OTHER PUBLICATIONS

"Supplemental Notice of Allowance", U.S. Appl. No. 12/713,133, Feb. 3, 2014, 2 pages.
"Advisory Action", U.S. Appl. No. 12/709,376, Dec. 19, 2013, 2 pages.
"Non-Final Office Action", U.S. Appl. No. 12/713,127, Jan. 31, 2014, 21 pages.
"Ex Parte Mewherter, PTAB precedential decision", U.S. Appl. No. 10/685,192, May 8, 2013, 22 pages.
"Non-Final Office Action", U.S. Appl. No. 12/713,096, Jan. 30, 2014, 23 pages.
"Notice of Allowance", U.S. Appl. No. 12/713,133, Jan. 17, 2014, 4 pages.
"Non-Final Office Action", U.S. Appl. No. 12/713,133, Dec. 10, 2013, 8 pages.
"Foreign Office Action", CN Application No. 201110046510.9, Feb. 12, 2014, 9 Pages.
"Non-Final Office Action", U.S. Appl. No. 12/709,348, Dec. 20, 2013, 9 pages.
"Final Office Action", U.S. Appl. No. 12/713,133, (May 20, 2013),10 pages.
"Foreign Office Action", Chinese Application No. 201110046519.X, (Mar. 19, 2013), 12 pages.
"Foreign Office Action", Chinese Application No. 201110050506.X, (Apr. 2, 2013), 11 pages.
"Foreign Office Action", Chinese Application No. 201110050852.8, (Mar. 26, 2013), 10 pages.
"Non-Final Office Action", U.S. Appl. No. 12/695,842, (May 22, 2013),16 pages.
"Non-Final Office Action", U.S. Appl. No. 12/709,204, (Jun. 6, 2013), 27 pages.
"Non-Final Office Action", U.S. Appl. No. 12/709,245, (May 30, 2013),15 pages.
"Non-Final Office Action", U.S. Appl. No. 12/709,301, (May 14, 2013),14 pages.
"Non-Final Office Action", U.S. Appl. No. 12/709,348, (Apr. 25, 2013),15 pages.
"Non-Final Office Action", U.S. Appl. No. 12/709,376, (May 23, 2013),17 pages.
"Non-Final Office Action", U.S. Appl. No. 12/713,110, (May 3, 2013),10 pages.
"Non-Final Office Action", U.S. Appl. No. 12/713,113, (Apr. 23, 2013),18 pages.
"Notice of Allowance", U.S. Appl. No. 12/713,053, (Jun. 7, 2013), 7 pages.
"Final Office Action", U.S. Appl. No. 12/709,204, Apr. 11, 2014, 24 pages.
"Final Office Action", U.S. Appl. No. 12/709,282, May 9, 2014, 17 pages.
"Foreign Office Action", CN Application No. 201110050506.X, Feb. 26, 2014, 6 pages.
"Non-Final Office Action", U.S. Appl. No. 12/695,937, May 7, 2014, 11 pages.
"Non-Final Office Action", U.S. Appl. No. 12/709,245, Mar. 20, 2014, 16 pages.
"Notice of Allowance", U.S. Appl. No. 12/472,699, May 2, 2014, 6 pages.
"Notice of Allowance", U.S. Appl. No. 12/709,376, Mar. 17, 2014, 6 pages.
Roudaut, et al., "Leaf Menus: Linear Menus with Stroke Shortcuts for Small Handheld Devices", Proceedings of the 12th IFIP TC 13 International Conference on Human-Computer Interaction: Part I, Aug. 2009, 4 pages.
"Final Office Action", U.S. Appl. No. 12/695,976, Jul. 23, 2014, 12 pages.
"Non-Final Office Action", U.S. Appl. No. 12/700,357, Jun. 26, 2014, 11 pages.
"Non-Final Office Action", U.S. Appl. No. 12/700,510, Jun. 12, 2014, 26 pages.
"Non-Final Office Action", U.S. Appl. No. 12/709,301, May 23, 2014, 12 pages.
"Non-Final Office Action", U.S. Appl. No. 12/713,113, Jun. 4, 2014, 11 pages.
"Final Office Action", U.S. Appl. No. 12/695,937, Nov. 10, 2014, 13 pages.
"Final Office Action", U.S. Appl. No. 12/700,357, Nov. 20, 2014, 12 pages.
"Final Office Action", U.S. Appl. No. 12/709,245, Nov. 14, 2014, 6 pages.
"Final Office Action", U.S. Appl. No. 12/713,113, Oct. 8, 2014, 12 pages.
"Final Office Action", U.S. Appl. No. 12/713,127, Aug. 14, 2014, 15 pages.
"Foreign Office Action", CN Application No. 201110046510.9, Jul. 25, 2014, 11 Pages.
"Foreign Office Action", CN Application No. 201180007100.1, Sep. 10, 2014, 22 pages.
"Foreign Office Action", CN Application No. 201180009579.2, Nov. 4, 2014, 16 pages.
"Foreign Office Action", CN Application No. 201180010692.2, Jun. 26, 2014, 13 pages.
"Foreign Office Action", CN Application No. 201180010769.6, Sep. 3, 2014, 12 Pages.
"Foreign Office Action", CN Application No. 201180011020.3, May 4, 2014, 12 Pages.
"Foreign Office Action", CN Application No. 201180011039.8, Jun. 5, 2014, 16 Pages.
"Non-Final Office Action", U.S. Appl. No. 12/695,842, Aug. 18, 2014, 21 pages.
"Non-Final Office Action", U.S. Appl. No. 12/709,204, Aug. 13, 2014, 25 pages.
"Notice of Allowance", U.S. Appl. No. 12/713,096, Aug. 29, 2014, 14 pages.
"Supplemental Notice of Allowance", U.S. Appl. No. 12/713,096, Nov. 4, 2014, 2 pages.
"Final Office Action", U.S. Appl. No. 12/709,204, Jan. 12, 2015, 29 pages.
"Foreign Notice of Allowance", CN Application No. 201110050506. X, Nov. 2, 2014, 4 Pages.
"Foreign Office Action", CN Application No. 201180011020.3, Jan. 15, 2015, 9 Pages.
"Foreign Office Action", JP Application No. 2012-554008, Nov. 25, 2014, 7 pages.
"Non-Final Office Action", U.S. Appl. No. 12/709,282, Jan. 29, 2015, 22 pages.
"Non-Final Office Action", U.S. Appl. No. 12/709,301, Jan. 16, 2015, 5 pages.
"Non-Final Office Action", U.S. Appl. No. 12/713,118, Jan. 29, 2015, 11 pages.
"Notice of Allowance", U.S. Appl. No. 12/709,245, Jan. 30, 2015, 4 pages.
"Notice of Allowance", U.S. Appl. No. 12/713,096, Jan. 9, 2015, 14 pages.
"Final Office Action", U.S. Appl. No. 12/695,842, Feb. 12, 2015, 20 pages.
"Final Office Action", U.S. Appl. No. 12/695,937, Apr. 2, 2015, 14 pages.
"Final Office Action", U.S. Appl. No. 12/700,510, Feb. 3, 2015, 28 pages.
"Foreign Notice of Allowance", CN Application No. 201110046510. 9, Feb. 12, 2015, 6 Pages.
"Foreign Notice of Allowance", JP Application No. 2012-555062, Mar. 3, 2015, 4 Pages.
"Foreign Office Action", CN Application No. 201180010692.2, 03/10/20105, 9 Pages.
"Foreign Office Action", CN Application No. 201180011039.8, Feb. 17, 2015, 17 Pages.
"Non-Final Office Action", U.S. Appl. No. 12/695,976, Mar. 25, 2015, 10 pages.
"Non-Final Office Action", U.S. Appl. No. 12/700,357, Apr. 2, 2015, 12 pages.

(56) References Cited

OTHER PUBLICATIONS

"Non-Final Office Action", U.S. Appl. No. 12/713,113, Feb. 12, 2015, 24 pages.
"Non-Final Office Action", U.S. Appl. No. 12/713,127, Mar. 26, 2015, 18 pages.
"Notice of Allowance", U.S. Appl. No. 12/709,245, Apr. 28, 2015, 4 pages.
"Notice of Allowance", U.S. Appl. No. 12/713,118, Mar. 5, 2015, 4 pages.
"Supplemental Notice of Allowance", U.S. Appl. No. 12/713,118, Mar. 19, 2015, 2 pages.
"Advisory Action", U.S. Appl. No. 12/695,842, May 12, 2015, 3 pages.
"Decision on Reexamination", CN Application No. 201110046519.X, May 28, 2015, 9 Pages.
"Foreign Notice of Allowance", CN Application No. 201180010769.6, Apr. 30, 2015, 4 Pages.
"Foreign Office Action", CN Application No. 201180007100.1, May 15, 2015, 20 Pages.
"Foreign Office Action", CN Application No. 201180009579.2, Apr. 21, 2015, 16 Pages.
"Non-Final Office Action", U.S. Appl. No. 12/709,204, May 7, 2015, 14 pages.
"Non-Final Office Action", U.S. Appl. No. 12/709,301, Jul. 14, 2015, 11 pages.
"Final Office Action", U.S. Appl. No. 12/695,976, Aug. 5, 2015, 12 pages.
"Final Office Action", U.S. Appl. No. 12/700,357, Aug. 31, 2015, 14 pages.
"Final Office Action", U.S. Appl. No. 12/709,282, Aug. 24, 2015, 24 pages.
"Final Office Action", U.S. Appl. No. 12/713,113, Aug. 5, 2015, 26 pages.
"Final Office Action", U.S. Appl. No. 12/713,127, Jul. 31, 2015, 19 pages.
"Foreign Office Action", CN Application No. 201180010692.2, Sep. 15, 2015, 10 Pages.
"Foreign Office Action", CN Application No. 201180011039.8, Sep. 6, 2015, 7 pages.
"Foreign Office Action", JP Application No. 2012-554008, Jun. 25, 2015, 13 pages.
"Non-Final Office Action", U.S. Appl. No. 12/695,842, Aug. 13, 2015, 18 pages.
"Non-Final Office Action", U.S. Appl. No. 12/700,510, Aug. 28, 2015, 34 pages.
"Notice of Allowance", U.S. Appl. No. 12/709,204, Sep. 25, 2015, 7 pages.
"Notice of Allowance", U.S. Appl. No. 12/709,301, Sep. 8, 2015, 6 pages.
"Search Report", TW Application No. 099142890, Jun. 30, 2015, 1 page.
"3M Touch Systems, Inc. Announces Shipment of Dispersive Signal Technology Product", Datasheet, 3M Corporation, retrieved from <http://solutions.3m.com/wps/portal/3M/en_US/TouchSystems/TouchScreen/Informatio/Media/PressReleases/Archive/?PC_7_RJH9U52300FA602N9RSR991OI3000000_assetId=1114287537178<, Sep. 6, 2005, 3 pages.
"3M TouchWare TM Software for Windows User Guide", In White Paper of 3M Touch Systems—Retrieved at: <<http://multimedia.3m.com/mws/mediawebserver?6666660Zjcf6IVs6EVs66SS0LCOrrrrQ->>, Aug. 9, 2013, 65 pages.
"AccuScribe Touchscreens", Datasheet, Elo TouchSystem, Aug. 2005, 2 pages.
"Foreign Notice of Allowance", CN Application No. 201180011039.8, Jan. 13, 2016, 4 Pages.
"Foreign Office Action", CN Application No. 201180009635.2, Jul. 28, 2014, 13 pages.
"In touch with new opportunities—Dispersive Signal Technology", DataSheet, NXT, 2005, 1 page.

"International Search Report and Written Opinion", Application No. PCT/US2013/020413, Apr. 8, 2013, 10 pages.
"International Search Report and Written Opinion", Application No. PCT/US2015/019811, Jul. 8, 2015, 11 pages.
"International Search Report and Written Opinion", Application No. PCT/US2014/067804, Jul. 24, 2015, 19 Pages.
"Touch Screen is available in .36-50.8 mm thickness", ThomasNet Industrial News Room, Jul. 29, 2003, 2 pages.
"TouchSystems—Innovation Touch Screen Solution", Retrieved from <http://www.touchsystems.com/article.aspx?id=16> on Aug. 30, 2012, Aug. 14, 2012, 1 page.
Boudreaux, "Touch Patterns: Chapter 6—Programming the iPhone User Experience", retrieved from <http://oreilly.com/iphone/excerpts/iphone-programming-user/touch-patterns.html> Oct. 25, 2011, 12 pages.
Findlater, "Personalized Input: Improving Ten-Finger Touchscreen Typing through Automatic Adaptation", Proceedings of the SIGCHI Conference on Human Factors in Computing Systems, Available at <http://terpconnect.umd.edu/~leahkf/pubs/CHI2012-findlater-PersonalizedTyping.pdf>, May 5, 2012, 10 pages.
Fonseca,"New Apple Patent Hints at Touch Enabled Bezels for Future Devices", Retrieved from: <http://vr-zone.com/articles/new-apple-patent-hints-at-touch-enabled-bezels-for-future-devices/42928.html?utm_source=rss&utm_medium=rss&utm_campaign=new-apple-patent-hints-at-touch-enabled-bezels-for-future-devices> Jan. 31, 2014, Jul. 3, 2013, 6 Pages.
Goel,"GripSense: Using Built-In Sensors to Detect Hand Posture and Pressure on Commodity Mobile Phones", Proceedings of the 25th Annual ACM Symposium on User Interface Software and Technology, Oct. 7, 2012, pp. 545-554.
Hinckley,"Sensor Synaesthesia: Touch in Motion, and Motion in Touch", CHI 2011, May 7-12, 2011, available at <http://research.microsoft.com/en-us/um/people/kenh/papers/touch-motion-camera-ready-final.pdf>, May 7, 2011, 10 pages.
Hirche,"Adaptive Interface for Text Input on Large-Scale Interactive Surfaces", 3rd IEEE International Workshop on Horizontal Interactive Human Computer System, Oct. 1, 2008, pp. 153-156.
Hotelling,"Multi-functional hand-held device", U.S. Appl. No. 60/658,777, filed Mar. 4, 2015, 117 pages.
Hotelling,"Multi-functional hand-held device", U.S. Appl. No. 60/663,345, filed Mar. 16, 2005, 76 pages.
Kim,"Hand Grip Pattern Recognition for Mobile User Interfaces", Interaction Lab / Samsung Advanced Institute of Technology, Available at <http://www.alice.org/stage3/pubs/uistsensing.pdf>, 2006, pp. 1789-1794.
Lee,"The TypeWay iPad app is an adaptive on-screen keyboard", Retrieved from <http://www.ubergizmo.com/2012/02/the-typeway-ipad-app-is-an-adaptive-on-screen-keyboard/> on Mar. 7, 2013, Feb. 1, 2012, 2 pages.
Maxwell,"Writing drivers for common touch-screen interface hardware", Industrial Control Design Line, Jun. 15, 2005, 9 pages.
Moore,"TypeWay Adaptive Keyboard for iPad Review", Retrieved from <http://www.technologytell.com/apple/89378/typeway-adaptive-keyboard-for-ipad-review/> on Mar. 6, 2013, Feb. 5, 2012, 10 pages.
Panzarino,"Apple's iPad Mini Should have a Widescreen Display", Retrieved from <http://thenextweb.com/apple/2012/08/15/what-ipad-mini-169-instead-43/> on Aug. 29, 2012, Aug. 15, 2012, 6 pages.
Saini,"Designing of a Virtual System with Fingerprint Security by considering many Security Threats", International Journal of Computer Applications, vol. 3—No. 2, available at <http://www.ijcaonline.org/volume3/number2/pxc387995.pdf>, Jun. 2010, pp. 25-31.
Sajid,"Microsoft Patent a Futuristic Virtual Multitouch Keyboard", Retrieved from <http://thetechnopath.com/microsoft-patent-futuristic-virtual-multitouch-keyboard/857/> on Mar. 6, 2013, Sep. 27, 2009, 8 pages.
Sax,"LiquidKeyboard: An Ergonomic, Adaptive QWERTY Keyboard for Touchscreens and Surfaces", ICDS 2011, The Fifth International Conference on Digital Society, Feb. 23, 2011, 6 pages.

(56) References Cited

OTHER PUBLICATIONS

Serrano,"Bezel-Tap Gestures: Quick Activation of Commands from Sleep Mode on Tablets", n Proceedings of the SIGCHI Conference on Human Factors in IComputing Systems, Apr. 27, 2013, 10 pages.
T.,"Smartphone displays need a bezel. Here's why", Retrieved from <http://www.phonearena.com/news/Smartphone-displays-need-a-bezel.-Heres-why_id27670> on Aug. 29, 2012, Mar. 12, 2012, 4 pages.
U.S. Appl. No. 12/695,842, filed Jan. 28, 2010, Hinckley.
U.S. Appl. No. 12/700,460, filed Feb. 4, 2010, Hinckley.
U.S. Appl. No. 12/695,064, filed Jan. 27, 2010, Hinckley.
U.S. Appl. No. 12/695,937, filed Jan. 28, 2010, Hinckley.
U.S. Appl. No. 12/695,959, filed Jan. 28, 2010, Hinckley.
U.S. Appl. No. 12/695,976, filed Jan. 28, 2010, Hinckley.
U.S. Appl. No. 12/700,357, filed Feb. 4, 2010, Hinckley.
U.S. Appl. No. 12/700,510, filed Feb. 4, 2010, Hinckley.
TW Search Report for Application No. 099142890, Oct. 12, 2015.
CN Notice on the Third Office Action for Application No. 201110046519.X, Sep. 21, 2015.
CN Notice on the Third Office Action for Application No. 201180009579.2, Sep. 6, 2015.
CN Notice on the Third Office Action for Application No. 201180007100.1, Nov. 20, 2015.
EP Communication for Application No. 11 737 428.0-1954, Reference 26566.542EP(PCT, Nov. 18, 2013.
EP Communication and Search Report for Application No. 11737428-1954 / 2529288, Nov. 4, 2013.

\* cited by examiner

BRUSH, CARBON-COPY, AND FILL GESTURES

RELATED APPLICATIONS

This application is a continuation of, and claims priority to, U.S. patent application Ser. No. 12/695,959, filed on Jan. 28, 2010, the disclosure of which is incorporated by reference herein.

BACKGROUND

The amount of functionality that is available from computing devices is ever increasing, such as from mobile devices, game consoles, televisions, set-top boxes, personal computers, and so on. However, traditional techniques that were employed to interact with the computing devices may become less efficient as the amount of functionality increases.

For example, inclusion of additional functions in a menu may add additional levels to the menu as well as additional choices at each of the levels. Consequently, the addition of these functions in the menu may frustrate users by the sheer number of choices of functions and thereby result in decreased utilization of both the additional functions as well as the device itself that employs the functions. Thus, traditional techniques that were used to access the functions may limit the usefulness of the functions to a user of the computing device.

SUMMARY

Techniques involving gestures and other functionality are described. In one or more implementations, the techniques describe gestures that are usable to provide inputs to a computing device. A variety of different gestures are contemplated, including bimodal gestures (e.g., using more than one type of input) and single modal gestures. Additionally, the gesture techniques may be configured to leverage these different input types to increase the amount of gestures that are made available to initiate operations of a computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Conventional techniques that were used to access functions of a computing device may become less efficient when expanded to access an ever increasing number of functions. Therefore, these conventional techniques may result in user frustration regarding the additional functions and may result in decreased user satisfaction with a computing device having those additional functions. For example, use of a traditional menu may force a user to navigate through multiple levels and selections at each of the levels to locate a desired function, which may be both time consuming and frustrating for the user.

Techniques involving gestures are described. In the following discussion, a variety of different implementations are described that involve gestures to initiate functions of a computing device. In this way, a user may readily access the functions in an efficient and intuitive manner without encountering the complexities involved using conventional access techniques. For example, in one or more implementations a gesture involves a bimodal input to signify the gesture, such as through direct manual input using touch (e.g., a finger of a user's hand) and a stylus (e.g., a pointed input device such as a pen). Through recognition of which input is a touch input versus a stylus input and vice versa, a variety of different gestures may be supported. Further discussion of this and other implementations that do and do not involve bimodal inputs may be found in the following sections.

In the following discussion, an example environment is first described that is operable to employ the gesture techniques described herein. Example illustrations of gestures and procedures involving the gestures are then described, which may be employed in the example environment as well as in other environments. Accordingly, the example environment is not limited to performing the example gestures and procedures. Likewise, the example procedures and gestures are not limited to implementation in the example environment.

Example Environment

Figure 1:
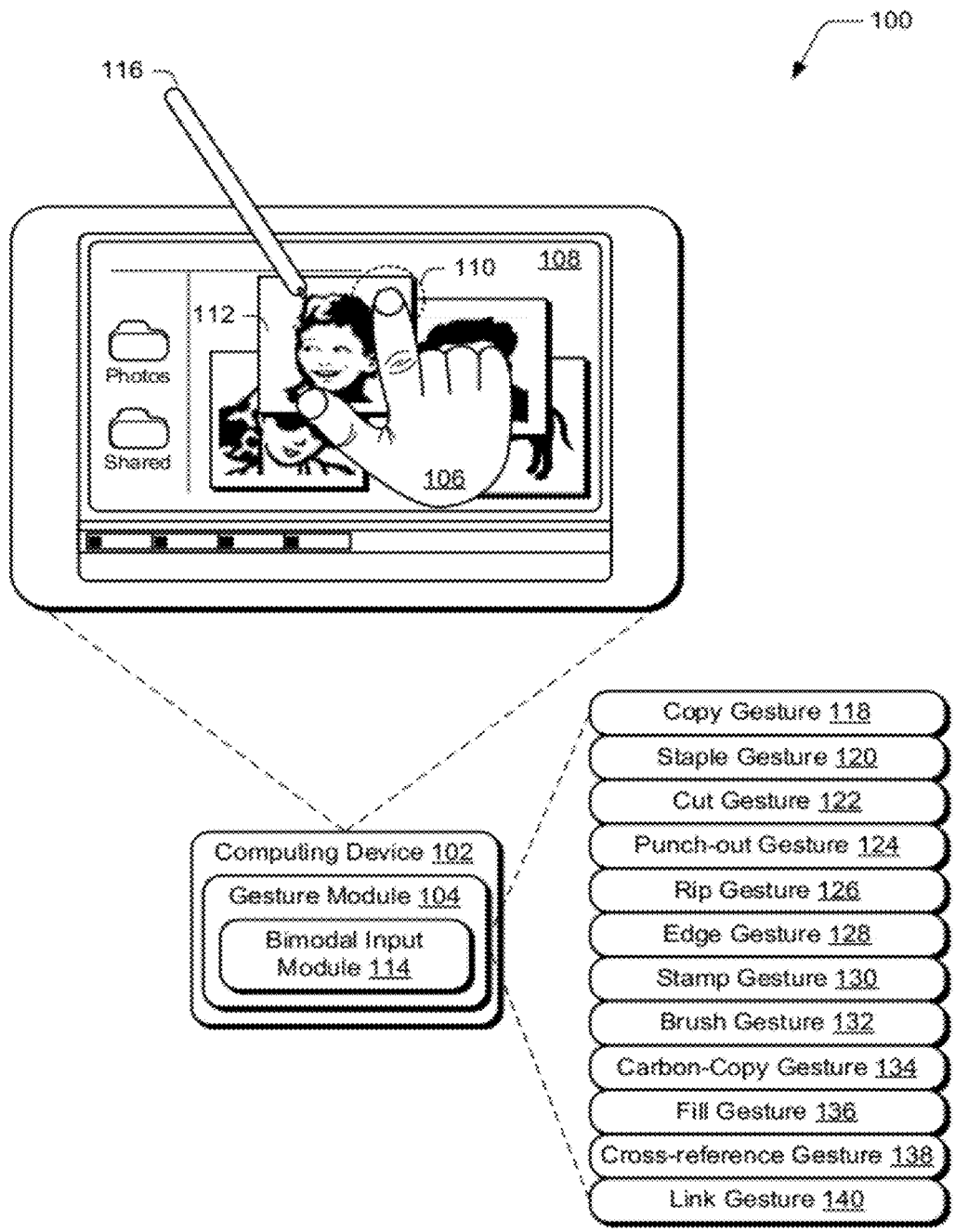
FIG. 1 is an illustration of an environment in an example implementation that is operable to employ gesture techniques.

FIG. 1 is an illustration of an environment 100 in an example implementation that is operable to employ gesture techniques. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, and so forth as further described in relation to FIG. 2. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is illustrated as including a gesture module 104. The gesture module 104 is representative of functionality to identify gestures and cause operations to be performed that correspond to the gestures. The gestures may be identified by the gesture module 104 in a variety of different ways. For example, the gesture module 104 may be configured to recognize a touch input, such as a finger of a user's hand 106 as proximal to a display device 108 of the computing device 102 using touchscreen functionality.

The touch input may also be recognized as including attributes (e.g., movement, selection point, etc.) that are usable to differentiate the touch input from other touch inputs recognized by the gesture module 104. This differentiation may then serve as a basis to identify a gesture from the touch inputs and consequently an operation that is to be performed based on identification of the gesture.

For example, a finger of the user's hand 106 is illustrated as selecting 110 an image 112 displayed by the display device 108. Selection 110 of the image 112 and subsequent movement of the finger of the user's hand 106 may be recognized by the gesture module 104. The gesture module 104 may then identify this recognized movement as indicating a "drag and drop" operation to change a location of the image 112 to a point in the display at which the finger of the user's hand 106 was lifted away from the display device 108. Thus, recognition of the touch input that describes selection of the image, movement of the selection point to another location, and then lifting of the finger of the user's hand 106 may be used to identify a gesture (e.g., drag-and-drop gesture) that is to initiate the drag-and-drop operation.

A variety of different types of gestures may be recognized by the gesture module 104, such a gestures that are recognized from a single type of input (e.g., touch gestures such as the previously described drag-and-drop gesture) as well as gestures involving multiple types of inputs. As illustrated in FIG. 1, for instance, the gesture module 104 is illustrated as including a bimodal input module 114 that is representative of functionality to recognize inputs and identify gestures involving bimodal inputs.

For example, the computing device 102 may be configured to detect and differentiate between a touch input (e.g., provided by one or more fingers of the user's hand 106) and a stylus input (e.g., provided by a stylus 116). The differentiation may be performed in a variety of ways, such as by detecting an amount of the display device 108 that is contacted by the finger of the user's hand 106 versus an amount of the display device 108 that is contacted by the stylus 116. Differentiation may also be performed through use of a camera to distinguish a touch input (e.g., holding up one or more fingers) from a stylus input (e.g., holding two fingers together to indicate a point) in a natural user interface (NUI). A variety of other example techniques for distinguishing touch and stylus inputs are contemplated, further discussion of which may be found in relation to FIG. 38.

Thus, the gesture module 104 may support a variety of different gesture techniques by recognizing and leveraging a division between stylus and touch inputs through use of the bimodal input module 114. For instance, the bimodal input module 114 may be configured to recognize the stylus as a writing tool, whereas touch is employed to manipulate objects displayed by the display device 108. Consequently, the combination of touch and stylus inputs may serve as a basis to indicate a variety of different gestures. For instance, primitives of touch (e.g., tap, hold, two-finger hold, grab, cross, pinch, hand or finger postures, and so on) and stylus (e.g., tap, hold-and-drag-off, drag-into, cross, stroke) may be composed to create a space of intuitive and semantically rich gestures. It should be noted that by differentiating between stylus and touch inputs, the number of gestures that are made possible by each of these inputs alone is also increased. For example, although the movements may be the same, different gestures (or different parameters to analogous commands) may be indicated using touch inputs versus stylus inputs.

Accordingly, the gesture module 104 may support a variety of different gestures, both bimodal and otherwise. Examples of gestures described herein include a copy gesture 118, a staple gesture 120, a cut gesture 122, a punch-out gesture 124, a rip gesture 126, an edge gesture 128, a stamp gesture 130, a brush gesture 132, a carbon-copy gesture 134, a fill gesture 136, a cross-reference gesture 138, and a link gesture 140. Each of these different gestures is described in a corresponding section in the following discussion. Although different sections are used, it should be readily apparent that the features of these gestures may be combined and/or separated to support additional gestures. Therefore, the description is not limited to these examples.

Additionally, although the following discussion may describe specific examples of touch and stylus inputs, in instances the types of inputs may be switched (e.g., touch may be used to replace stylus and vice versa) and even removed (e.g., both inputs may be provided using touch or a stylus) without departing from the spirit and scope thereof. Further, although in instances in the following discussion the gestures are illustrated as being input using touchscreen functionality, the gestures may be input using a variety of different techniques by a variety of different devices, further discussion of which may be found in relation to the following figure.

Figure 2:
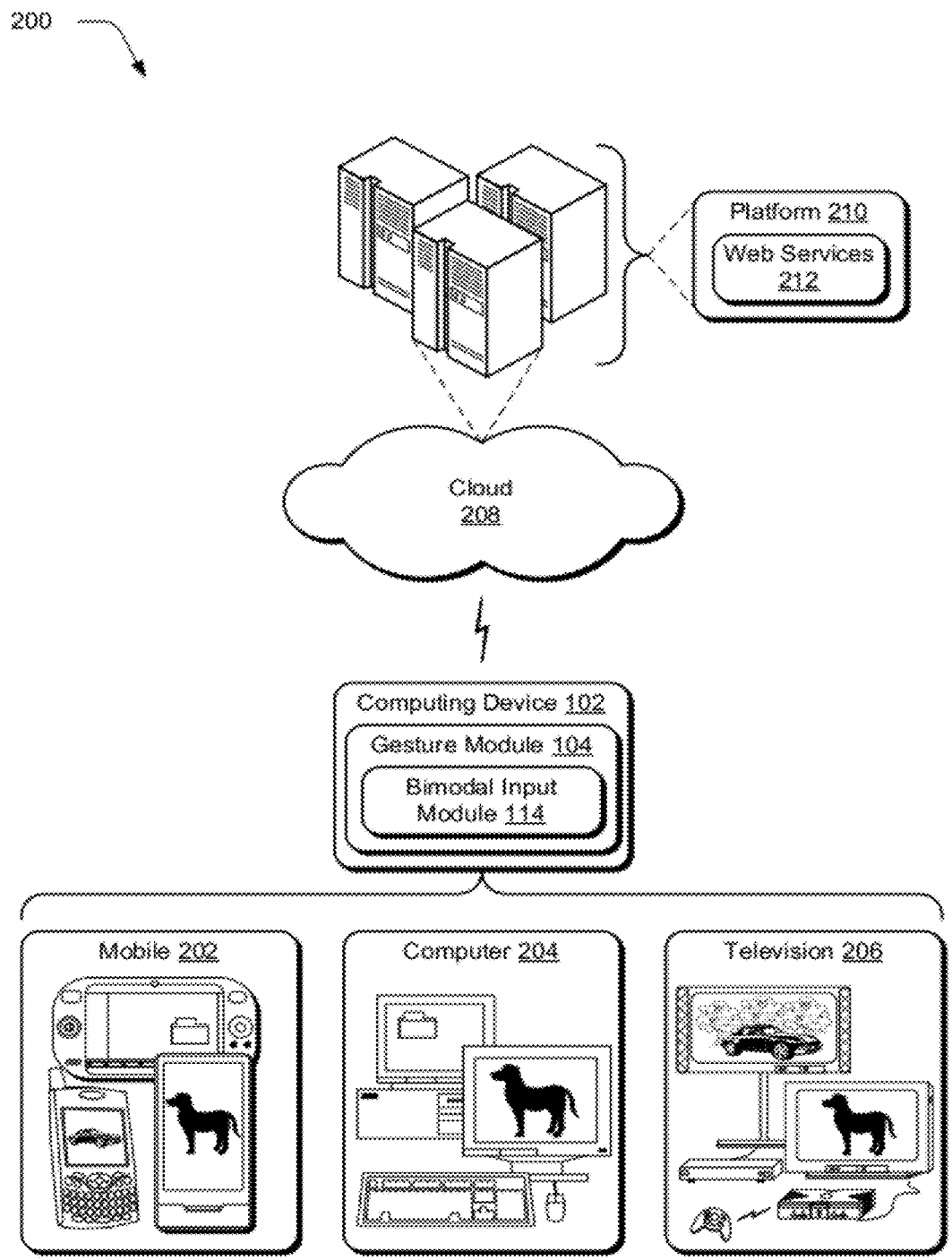
FIG. 2 illustrates an example system 200 showing the gesture module 104 and bimodal input module 114 of FIG. 1 as being implemented using in an environment where multiple devices are interconnected through a central computing device.

FIG. 2 illustrates an example system 200 showing the gesture module 104 and bimodal input module 114 of FIG. 1 as being implemented using in an environment where multiple devices are interconnected through a central computing device. The central computing device may be local to the multiple devices or may be located remotely from the multiple devices. In one embodiment, the central computing device is a "cloud" server farm, which comprises one or more server computers that are connected to the multiple devices through a network or the Internet or other means. In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices.

For example, as previously described the computing device 102 may assume a variety of different configurations, such as for mobile 202, computer 204, and television 206 uses. Each of these configurations has a generally corresponding screen size and thus the computing device 102 may be configured accordingly to one or more of these device classes in this example system 200. For instance, the computing device 102 may assume the mobile 202 class of device which includes mobile phones, portable music players, game devices, and so on. The computing device 102 may also assume a computer 204 class of device that includes personal computers, laptop computers, netbooks, and so on. The television 206 configuration includes configurations of devices that involve display on a generally larger screen in a casual environment, e.g., televisions, set-top boxes, game consoles, and so on. Thus, the techniques described herein may be supported by these various configurations of the computing device 102 and are not limited to the specific examples described in the following sections.

The cloud 208 is illustrated as including a platform 210 for web services 212. The platform 210 abstracts underlying functionality of hardware (e.g., servers) and software resources of the cloud 208 and thus may act as a "cloud operating system." For example, the platform 210 may abstract resources to connect the computing device 102 with other computing devices. The platform 210 may also serve to abstract scaling of resources to provide a corresponding level of scale to encountered demand for the web services 212 that are implemented via the platform 210. A variety of other examples are also contemplated, such as load balancing of servers in a server farm, protection against malicious parties (e.g., spam, viruses, and other malware), and so on. Thus, web services 212 and other functionality may be supported without the functionality "having to know" the particulars of the supporting hardware, software, and network resources.

Accordingly, in an interconnected device embodiment, implementation of functionality of the gesture module 104 (and the bimodal input module 114) may be distributed throughout the system 200. For example, the gesture module 104 may be implemented in part on the computing device 102 as well as via the platform 210 that abstracts the functionality of the cloud 208.

Further, the functionality may be supported by the computing device 102 regardless of the configuration. For example, the gesture techniques supported by the gesture module 104 may be detected using touchscreen functionality in the mobile 202 configuration, track pad functionality of the computer 204 configuration, detected by a camera as part of support of a natural user interface (NUI) that does not involve contact with a specific input device in the television 206 example, and so on. Further, performance of the operations to detect and recognize the inputs to identify a particular gesture may be distributed throughout the system 200, such as by the computing device 102 and/or the web services 212 supported by the platform 210 of the cloud 208. Further discussion of the gestures supported by the gesture module 104 may be found in relation to the following sections.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the gesture techniques described below are platform-independent, meaning that the techniques may be implemented on a variety of commercial computing platforms having a variety of processors.

Copy Gesture

Figure 3:
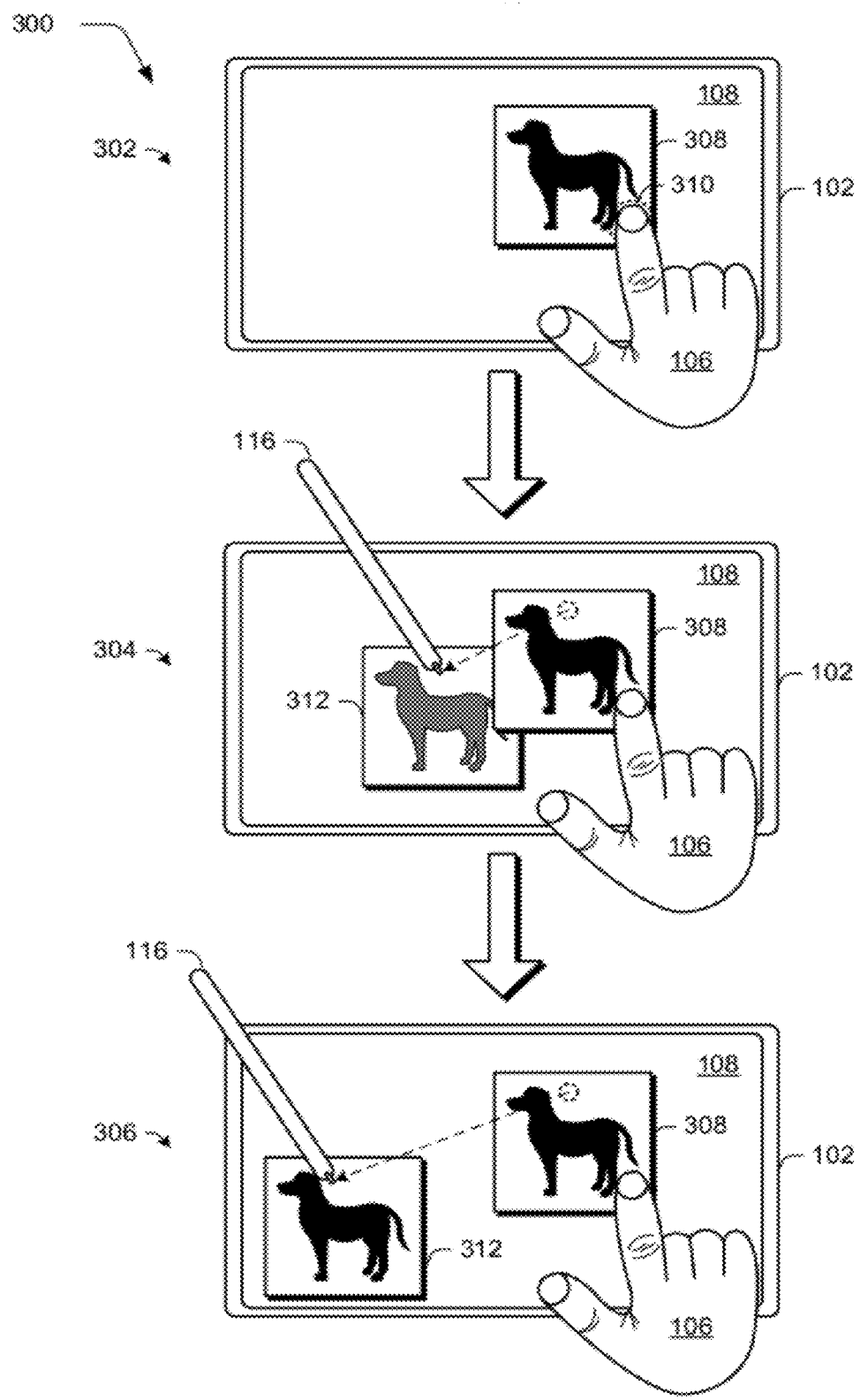
FIG. 3 is an illustration of an example implementation in which stages of a copy gesture of FIG. 1 are shown as being input through interaction with the computing device.

FIG. 3 is an illustration of an example implementation 300 in which stages of the copy gesture 118 of FIG. 1 are shown as being input through interaction with the computing device 102. The copy gesture 118 is illustrated in FIG. 3 using first, second, and third stages 302, 304, 306. In the first stage 302, an image 308 is displayed by the display device 108 of the computing device 102. The image 308 is further illustrated as being selected 310 using a finger of the user's hand 106. For example, the finger of the user's hand 106 may be placed and held within a boundary of image 308. This touch input may therefore be recognized by the gesture module 104 of the computing device 102 as a touch input to select the image 308. Although selection with the user's finger has been described, other touch inputs are also contemplated without departing from the spirit and scope thereof.

In the second stage 304, the image 308 is still selected using the finger of the user's hand 106, although in other embodiments the image 308 may remain in a selected state even after the finger of the user's hand 106 is lifted away from the image 308. While the image 308 is selected, the stylus 116 is used to provide a stylus input that includes placement of the stylus within the boundary of the image 308 and then subsequent movement of the stylus outside the boundary of the image 308. This movement is illustrated in the second stage 304 using a phantom line and a circle indicating the initial point of interaction with the image 308 by the stylus 116. Responsive to the touch and stylus inputs, the computing device 102 (through the gesture module 104) causes a copy 312 of the image 308 to be displayed by the display device 108. The copy 312 in this example follows the movement of the stylus 116 at the initial point of interaction with the image 308. In other words, the initial point of interaction of the stylus 116 with the image 308 is used as a continuing point for manipulation of the copy 312 such that the copy 312 follows movement of the stylus. In an implementation, the copy 312 of the image 308 is displayed once the movement of the stylus 116 crosses a boundary of the image 308, although other implementations are also contemplated, such as movement that has passed a threshold distance, recognition of the touch and stylus inputs as indicating the copy gesture 118, and so on. For example, if a boundary edge of an image lies beyond a maximum allowed stroke distance from a starting point of the stylus, crossing of this maximum allowed stroke distance may instead trigger initiation of the copy gesture. In another example, if a boundary edge of an image is closer than a minimum allowed stroke distance, movement of the stylus beyond the minimum allowed stroke distance likewise replaces crossing of the image boundary itself. In a further example, movement velocity may be employed rather than distance threshold, e.g. moving the pen "fast" for a copy gesture versus slow for a carbon copy gesture. In a further example, pressure at the initiation of the movement may be employed, e.g., pressing relatively "hard" on the pen for a copy gesture.

In the third stage 306, the stylus 116 is illustrated as having moved further away from the image 308. In the illustrated implementation, the opacity of the copy 312 increases the further the copy 312 is moved, an example of which may be noticed by comparison of the second and third stages 304, 306 that is shown using grayscale. Once the stylus 116 is removed from the display device 108, the copy 312 is displayed at that location on the display device 108 as being fully opaque, e.g., is a "true copy" of the image 308. In an implementation, another copy may be created by repeating the stylus 116 movement while the image 308 is selected, e.g., using the finger of the user's hand 106. For example, if the finger of the user's hand 106 remains on the image 308 (thereby selecting the image), each subsequent movement of the stylus from within the boundary of the image 308 to outside the boundary may cause another copy of the image 308 to be created. In an implementation, the copy is not considered to be fully realized until the copy becomes fully opaque. That is, lifting the stylus (or moving the stylus back to a distance less than the copy creation threshold) while the image remains semi-transparent may cancel the copy operation in this implementation.

As previously described, although a specific implementation has been described using touch and stylus inputs, it should be readily apparent that a variety of other implementations are also contemplated. For example, the touch and stylus inputs may be switched to perform the copy gesture 118, the gesture may be performed using touch or stylus inputs alone, or a physical keyboard, mouse, or bezel button may be held down in lieu of continuing a touch input on the display device, and so on. In some embodiments, ink annotations or other objects completely or partially overlapping, proximal to, previously selected, or otherwise associated with the selected image may also be considered as part of the "image" and copied as well.

Figure 4:
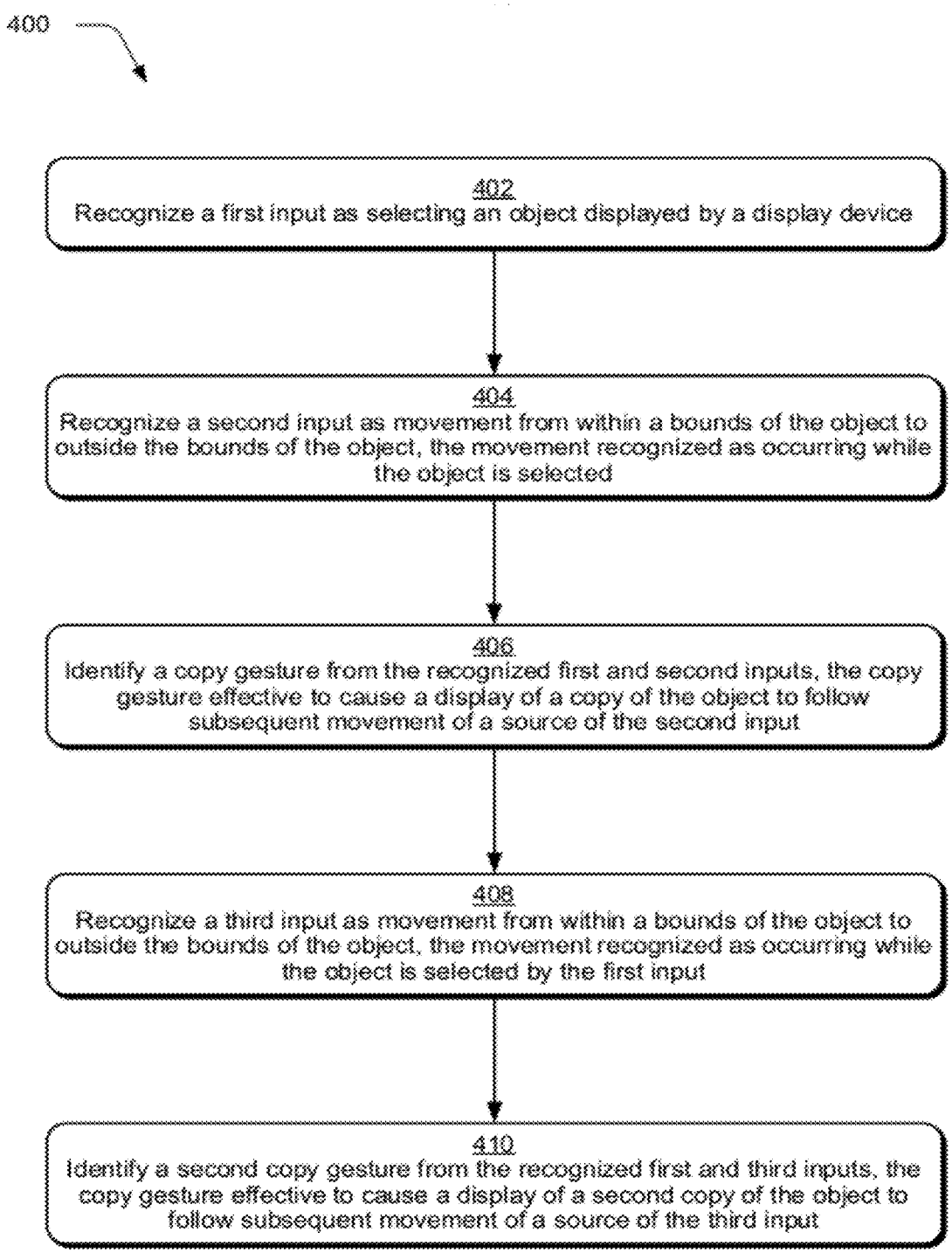
FIG. 4 is a flow diagram depicting a procedure in an example implementation of a copy gesture in accordance with one or more embodiments.

FIG. 4 is a flow diagram that depicts a procedure 400 in an example implementation of a copy gesture 118 in accordance with one or more embodiments. Aspects of the procedure may be implemented in hardware, firmware, software, or a combination thereof. The procedure is shown as a set of blocks in this example that specify operations performed by one or more devices and are not necessarily limited to the orders shown for performing the operations by the respective blocks. In portions of the following discussion, reference will be made to the environment 100 of FIG. 1, the system 200 of FIG. 2, and the example implementation 300 of FIG. 3.

A first input is recognized as selecting an object displayed by a display device (block 402). For example, a touch input provided using a finger of a user's hand 106 may be recognized by the gesture module 104 as selecting an image 308 displayed by the display device 108 of the computing device 102.

A second input is recognized as movement from within the bounds of the object to outside the bounds of the object, the movement recognized as occurring while the object is selected (block 404). Continuing with the previous example, a stylus 116 may be used to provide an input describing movement from a point within the image 308 to outside a boundary of the image 308 as shown in the second stage 304 of FIG. 3. Accordingly, the gesture module 104 may recognize this movement from a stylus input detected using touch-screen functionality of the display device 108. In an implementation, the first and second inputs are input and detected concurrently using the computing device 102.

A copy gesture is identified from the recognized first and second inputs, the copy gesture effective to cause a display of a copy of the object to follow subsequent movement of a source of the second input (block 406). Through recognition of the first and second inputs, the gesture module 104 may identify a corresponding copy gesture 118 to be indicated using those inputs. In response, the gesture module 104 may cause a copy 312 of the image 308 to be displayed by the display device 108 and follow subsequent movement of the stylus 116 across the display device 108. In this way, the copy 312 of the image 308 may be created and moved in an intuitive manner. Additional copies may also be made using these techniques.

For example, a third input is recognized as movement from within the bounds of the object to outside the bounds of the object, the movement recognized as occurring while the object is selected by the first input (block 408). Thus, in this example the object (e.g., the image 308) is still selected using the finger of the user's hand 106 (or other touch input). Another stylus input may then be received that involves movement from within the image 308 to outside the bounds of the image 308. Accordingly, a second copy gesture is identified from the recognized first and third inputs, the copy gesture effective to cause a display of a second copy of the object to follow subsequent movement of a source of the third input (block 410).

Continuing with the previous example, the second copy may follow the subsequent movement of the stylus 116. Although this example described continued selection of the image 308 using the finger of the user's hand 106, selection may continue even when the selection of the object is not continued using the source, e.g., the finger of the user's hand. For example, the image 308 may be placed in a "selected state" such that continued contact by the finger of the user's hand 106 is not needed to keep the image 308 selected. Again, it should be noted that although a specific example was described in the copy gesture 118 above using touch and stylus inputs, those inputs may be switched, a single input type (e.g., touch or stylus) may be used to provide the input, and so on.

Staple Gesture

Figure 5:
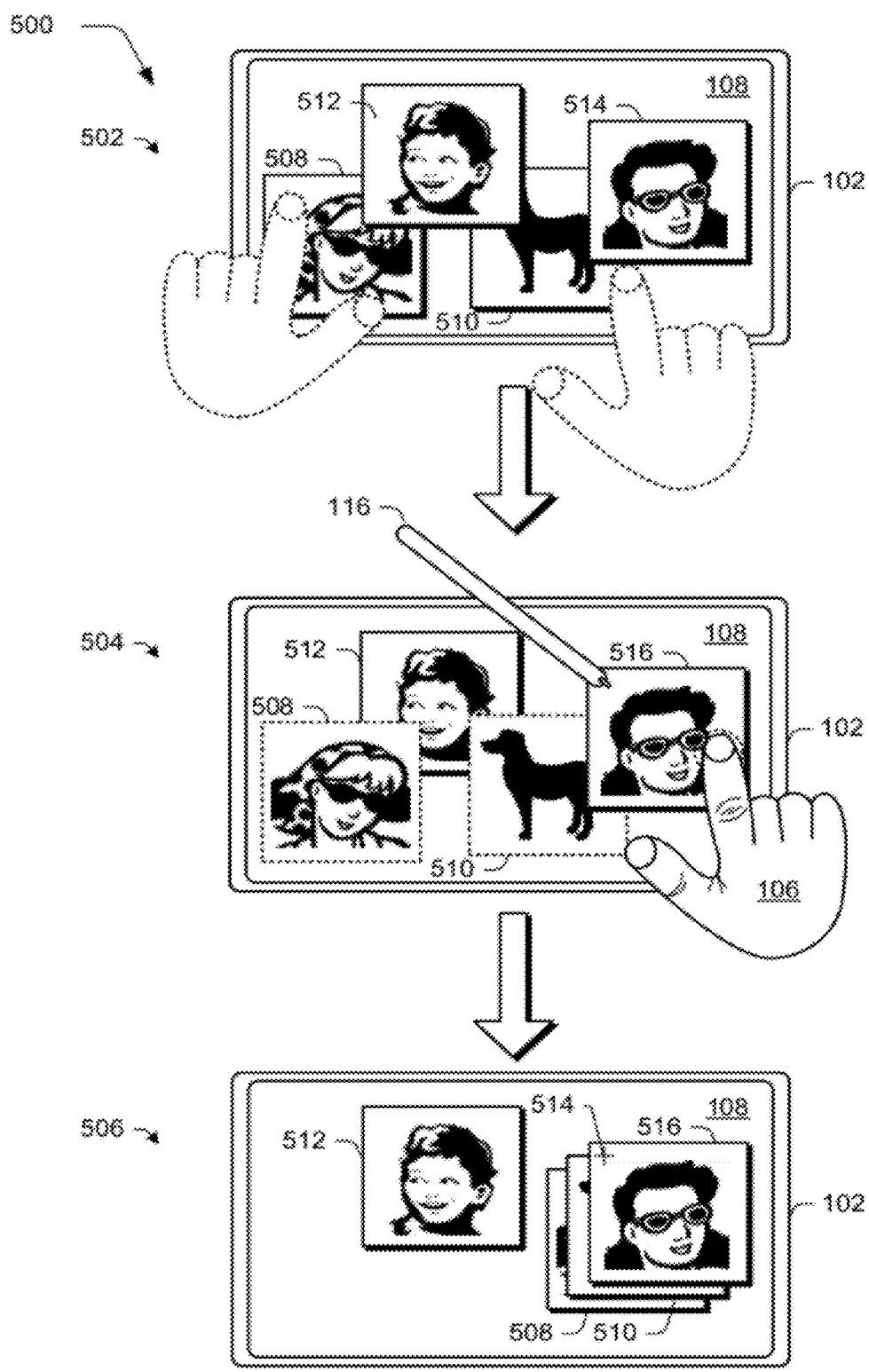
FIG. 5 is an illustration of an example implementation in which stages of a staple gesture of FIG. 1 are shown as being input through interaction with the computing device.

FIG. 5 is an illustration of an example implementation 500 in which stages of the staple gesture 120 of FIG. 1 are shown as being input in conjunction with the computing device 102. The staple gesture 120 is illustrated in FIG. 5 using first, second, and third stages 502, 504, 506. In the first stage 502, first, second, third, and fourth images 508, 510, 512, 514 are displayed by the display device 108 of the computing device 102. A user's hands are shown in phantom as selecting the first and second images 508, 510 using touch inputs, such as by "tapping" on the images using the user's hands.

In the second stage 504, the first and second images 508, 510 are shown as being in a selected state through the use of a phantom border around the images, although other techniques may also be employed. A finger of the user's hand 106 is further illustrated in the second stage 504 as holding the fourth image 514, such as by placing the finger of the user's hand 106 in the proximity of the fourth image 514 and keeping it there, e.g., for at least a predetermined amount of time.

While the fourth image 514 is being held by the finger of the user's hand 106, the stylus 116 may be used to "tap" within the bounds of the fourth image 514. Accordingly, the gesture module 104 (and the bimodal input module 114) may identify a staple gesture 120 from these inputs, e.g., the selection of the first and second images 508, 510, the hold of the fourth image 514, and the tap of the fourth image 514 using the stylus 116.

Responsive to the identification of the staple gesture 120, the gesture module 104 may arrange the first, second, and fourth images 508, 510, 514 into a collated display. For example, the first and second images 508, 510 may be displayed in the order selected as beneath the held object (e.g., the fourth image 514) by the display device 108. Additionally, an indication 516 may be displayed to indicate that the first, second, and fourth images 508, 510, 514 are stapled together. In an embodiment, the indication 516 may be removed by holding the fourth image 514 and swiping the stylus 116 over the indication to "remove the staple."

This gesture may be repeated to add additional items to the collated display, e.g., selection of the third image 512 and then tapping the fourth image 514 using the stylus 116 while the fourth image 514 is being held. In another example, a book may be formed through use of the staple gesture 120 to collate collections of already stapled material. Further, the collated collection of objects may be manipulated as a group, such as to resize, move, rotate, and so on, further discussion of which may be found in relation to the following figure. Performing a staple gesture on top of a stack that is already stapled may toggle the stack between collated and un-collated states (with the gesture module 104 remembering the original relative spatial relationship between the items collated), may add a cover sheet or book binding (cover) to a stack, and so on.

As previously described, although a specific implementation has been described using touch and stylus inputs, it should be readily apparent that a variety of other implementations are also contemplated. For example, the touch and stylus inputs may be switched to perform the staple gesture 120, the gesture may be performed using touch or stylus inputs alone, and so on.

Figure 6:
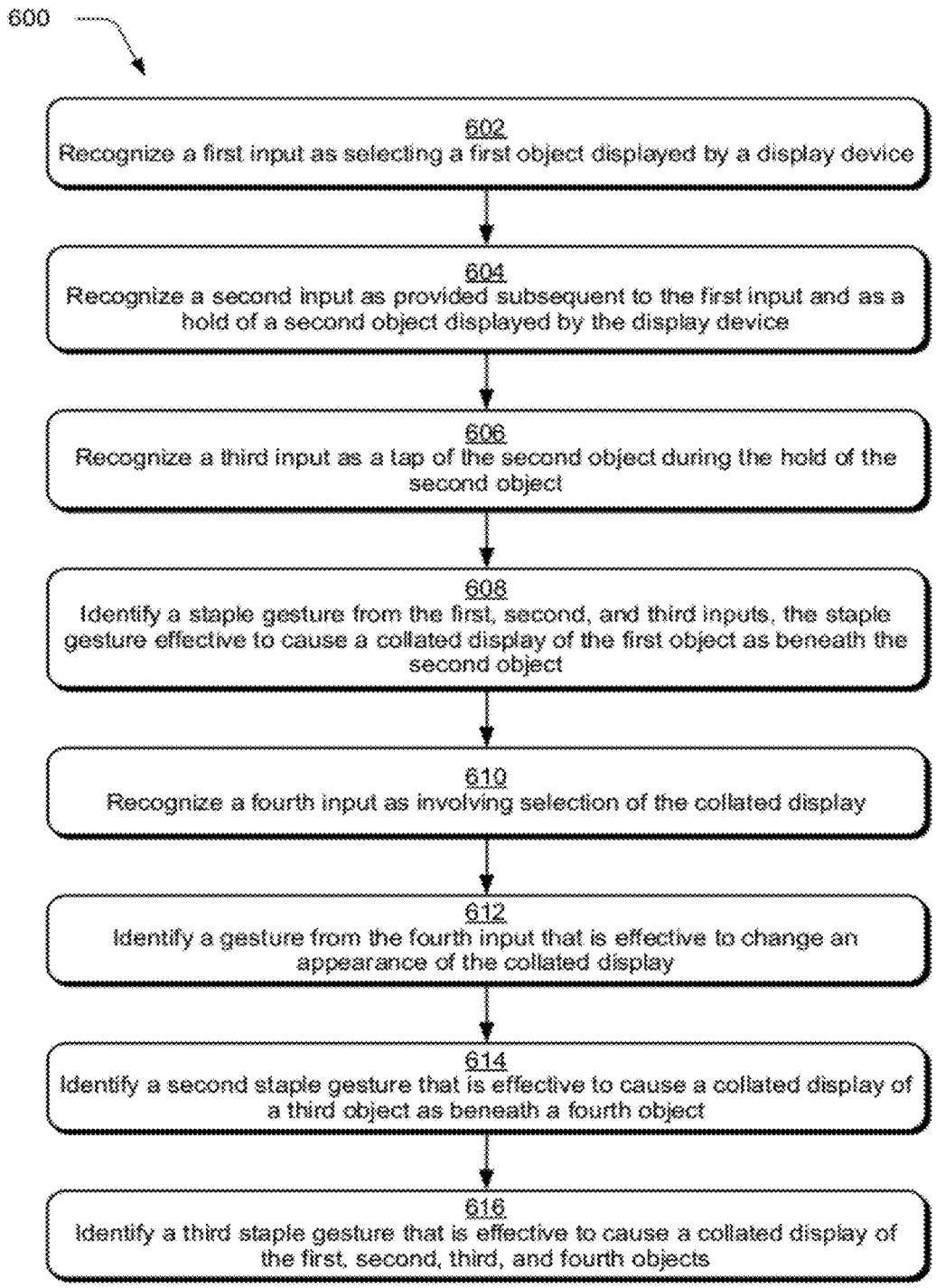
FIG. 6 is a flow diagram depicting a procedure in an example implementation of a staple gesture in accordance with one or more embodiments.

FIG. 6 is a flow diagram that depicts a procedure 600 in an example implementation of a staple gesture in accordance with one or more embodiments. Aspects of the procedure may be implemented in hardware, firmware, software, or a combination thereof. The procedure is shown as a set of blocks in this example that specify operations performed by one or more devices and are not necessarily limited to the orders shown for performing the operations by the respective blocks. In portions of the following discussion, reference will be made to the environment 100 of FIG. 1, the system 200 of FIG. 2, and the example implementation 500 of FIG. 5.

A first input is recognized as selecting a first object displayed by a display device (block 602). The first object may be selected in a variety of ways. For example, the first image 508 may be tapped by a finger of the user's hand 106, a stylus 116, use of a cursor control device, and so on.

A second input is recognized as provided subsequent to the first input and as a hold of a second object displayed by the display device (block 604). A third input is also recognized as a tap of the second object during the hold of the second object (block 606). Continuing with the previous example, a finger of the user's hand 106 may be placed and held within the boundary of the fourth image 514 while the stylus 116 is tapped within the boundary of the fourth image 514. Additionally, these inputs may be received after selection of the first image 508, e.g., using a touch input.

A staple gesture is identified from the first, second, and third inputs, the staple gesture effective to cause a collated display of the first object as beneath the second object (block 608). The gesture module 104 may identify the staple gesture 120 from the first, second, and third inputs. Responsive to this identification, the gesture module 104 may cause one or more objects selected by the first input to be arranged beneath the object that is being held as described by the second input. An example of this is shown in the third stage 506 of the system 500 of FIG. 5. In an implementation, the one or more objects that are selected via the first input are arranged beneath the second input in an order that corresponds to an order in which the one or more objects were selected. In other words, the order of selection of the one or more objects is used as a basis to arrange the objects in the collated display. The collated display of the objects, as stapled together, may be leveraged in a variety of ways.

For instance, a fourth input is recognized as involving selection of the collated display (block 610). A gesture is identified from the fourth input that is effective to change an appearance of the collated display (block 612). For example, the gesture may involve resizing the collated display, moving the collated display, rotating the collated display, minimizing the collated display, and so on. Thus, the stapled group of objects may be manipulated as a group in an efficient and intuitive manner by a user.

The staple gesture may also be repeated to add additional objects to the collated display of a stapled group of objects, further collate groups of already collated objects, and so on. For instance, a second staple gesture is identified that is effective to cause a collated display of a third object as beneath a fourth object (block 614). A third staple gesture is then identified that is effective to cause a collated display of the first, second, third, and fourth objects (block 616). In this way, a user may form a "book" of objects by repeating the staple gesture 120. Again, it should be noted that although a specific example was described regarding the staple gesture 120 above using touch and stylus inputs, those inputs may be switched, a single input type (e.g., touch or stylus) may be used to provide the input, and so on.

Cut Gesture

Figure 7:
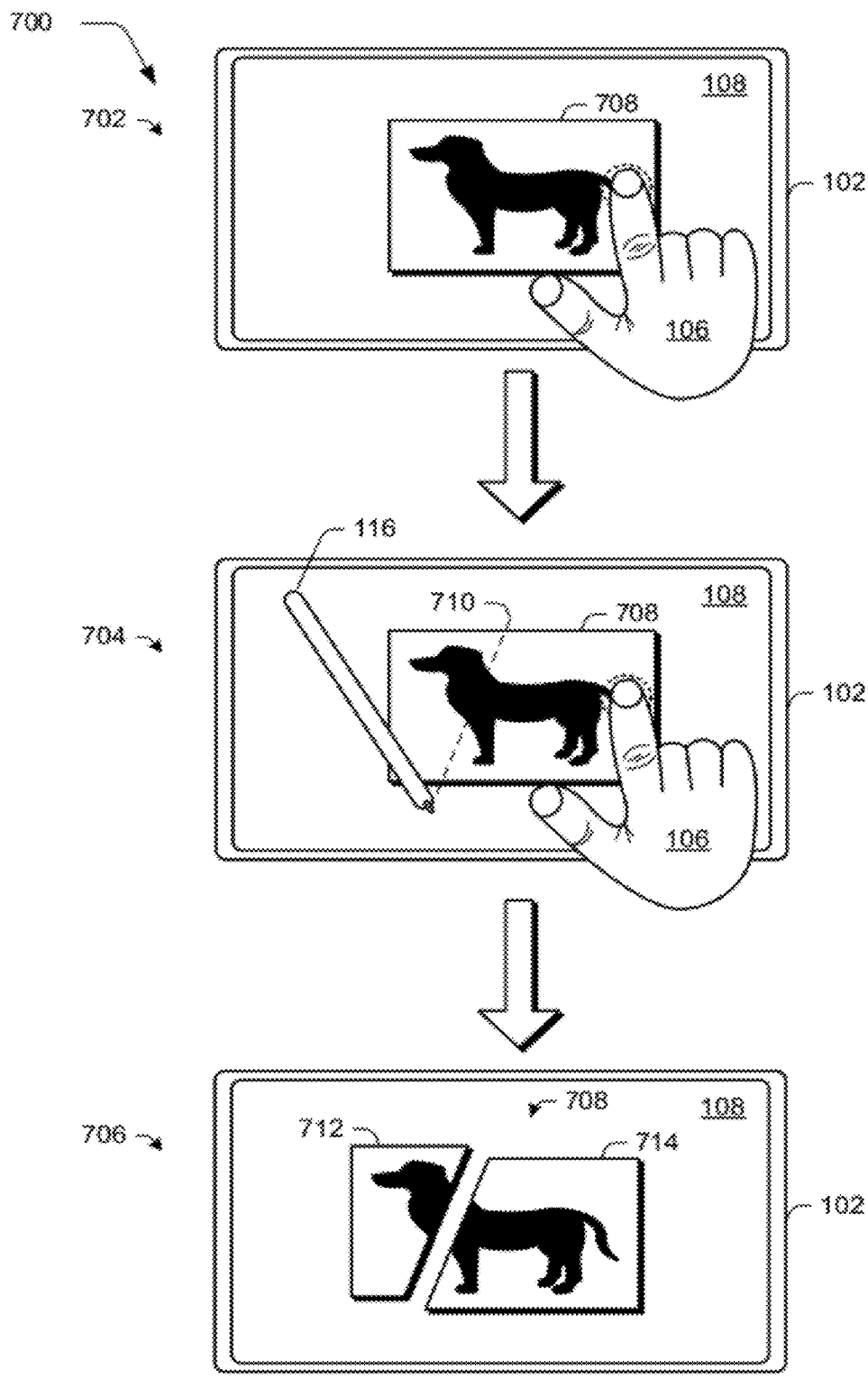
FIG. 7 is an illustration of an example implementation in which stages of a cut gesture of FIG. 1 are shown as being input through interaction with the computing device.

FIG. 7 is an illustration of an example implementation 700 in which stages of the cut gesture 122 of FIG. 1 are shown as being input through interaction with the computing device 102. The cut gesture 122 is illustrated in FIG. 7 using first, second, and third stages 702, 704, 706. In the first stage 702, an image 708 is displayed by the display device 108 of the computing device 102. A finger of the user's hand 106 is illustrated as selecting the image 708 in the first stage 702.

In the second stage 704, a stylus input is received that describes movement 710 of the stylus 116 at least twice across one or more boundaries of the image 708 while the image 708 is selected. This movement 708 is illustrated through use of a dashed line in the second stage 704 that begins outside the image 708, passes through a first boundary of the image 708, proceeds through at least a portion of the image 708, and passes through another boundary of the image 708, thereby leaving the confines of the image 708.

Responsive to these inputs (e.g., the touch input to select the image 708 and the stylus input defining the movement), the gesture module 104 may identify the cut gesture 122. Accordingly, as shown in the third stage 706, the gesture module 104 may cause the image 708 to be displayed in at least two portions 712, 714 in accordance with the indicated movement 710 of the stylus 116. In an implementation, the portions are displaced slightly in the display by the gesture module 104 to better indicate the cut. Although a specific implementation has been described using touch and stylus inputs, it should be readily apparent that a variety of other implementations are also contemplated. For example, the touch and stylus inputs may be switched to perform the cut gesture 122, the gesture may be performed using touch or stylus inputs alone, and so on.

Figure 8:
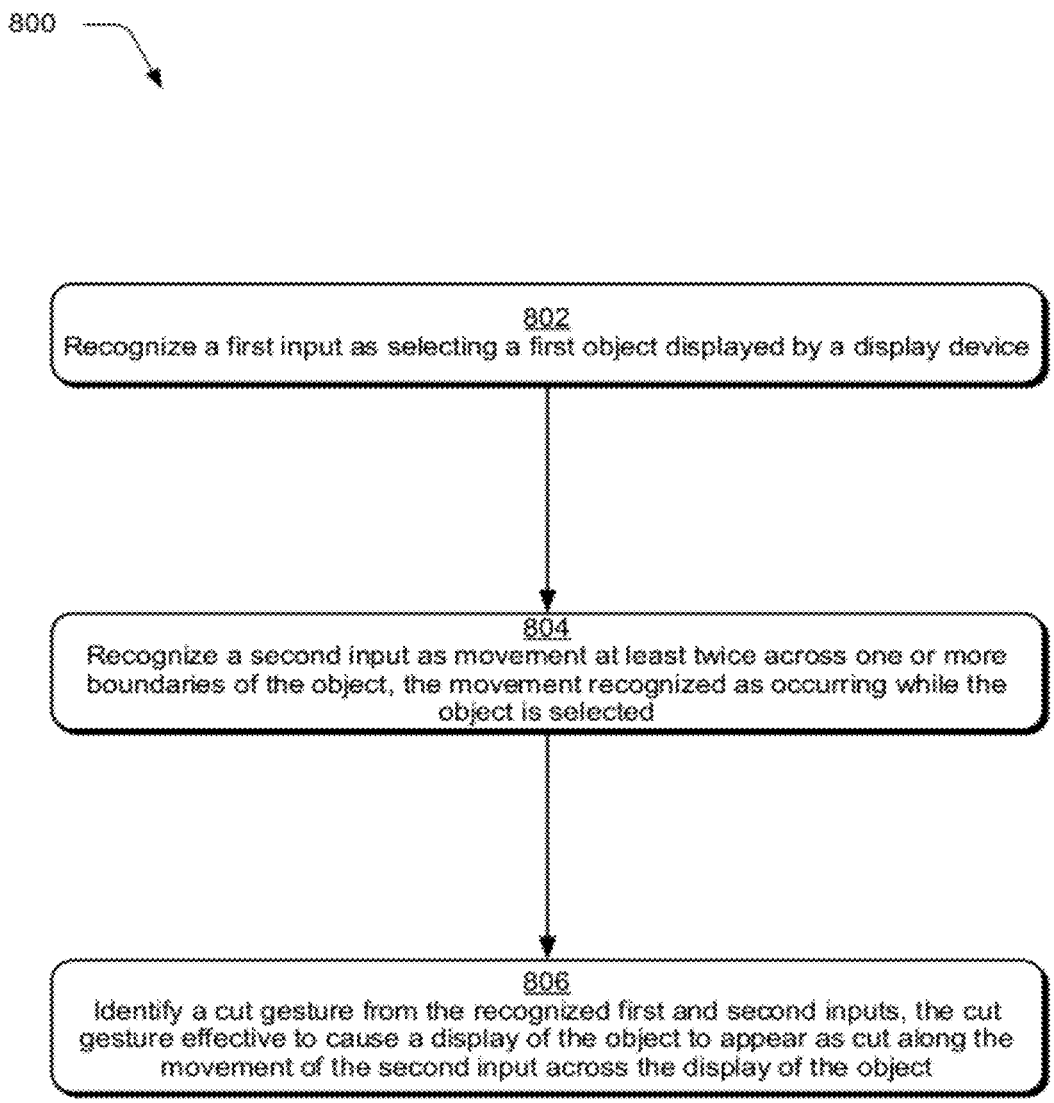
FIG. 8 is a flow diagram depicting a procedure in an example implementation of a cut gesture in accordance with one or more embodiments.

FIG. 8 is a flow diagram that depicts a procedure 800 in an example implementation of a cut gesture in accordance with one or more embodiments. Aspects of the procedure may be implemented in hardware, firmware, software, or a combination thereof. The procedure is shown as a set of blocks in this example that specify operations performed by one or more devices and are not necessarily limited to the orders shown for performing the operations by the respective blocks. In portions of the following discussion, reference will be made to the environment 100 of FIG. 1, the system 200 of FIG. 2, and the example implementation 700 of FIG. 7.

A first input is recognized as selecting an object displayed by a display device (block 802). For example, the image 708 may be tapped by a finger of the user's hand 106, a stylus 116, use of a cursor control device, and so on. In the illustrated implementation, a finger of the user's hand 106 is illustrated as selecting the image 708.

A second input is recognized as movement at least twice across one or more boundaries of the object, the movement recognized as occurring while the object is selected (block 804). The movement may be input in a variety of ways. For example, the movement 710 may involve uninterrupted contact of the stylus 116 with the display device 108 of the computing device 102 that crosses boundaries (e.g., edges) of the image 708 at least twice. Additionally, although the movement 710 is illustrated as beginning "outside" the image 708, the movement may also begin within the bounds of the image 708 and then cross at least two boundaries to indicate the cut in this example. Further, the stylus movement may also include multiple strokes (e.g., overlapping) that collectively cross the boundaries. Multiple strokes drawn in this manner may be recognized by the module as together since the hold of the image (e.g., the touch input) clearly indicates that these strokes belong together. To realize this, the first (partial) stroke may put the selection in a special state such that additional strokes are permitted without invoking other gestures (e.g., the copy gesture) until the "phrase" of multiple stroke inputs has completed.

A cut gesture is identified from the recognized first and second inputs, the cut gesture effective to cause a display of the object to appear as cut along the movement of the second input across the display of the object (block 806). Upon identification of the cut gesture 122 by the computing device 102, for instance, the gesture module 104 may cause one or more portions of the image 106 to appear displaced from an initial location and to have a boundary that corresponds at least partially to the movement 710 of the stylus 116. Furthermore, the initial and final portions of the pen stroke (outside of the image boundary) may initially be seen as ordinary "ink" strokes by the gesture module 104, but during or subsequent to the cut operation, these ink traces may be removed from the display device so as not to leave marks as a result of performing the cut gesture.

It should be realized that each subsequent crossing of a boundary of the object (e.g., the image 708) may be identified as another cut gesture. Therefore, each pair of crossings of the border of the image 708 may be identified by the gesture module 104 as a cut. In this way, multiple cuts may be performed while the image 708 is selected, e.g., while the finger of the user's hand 106 is still placed within the image 708. Again, it should be noted that although a specific example was described in the cut gesture 122 above using touch and stylus inputs, those inputs may be switched, a single input type (e.g., touch or stylus) may be used to provide the input, and so on.

Punch-Out Gesture

Figure 9:
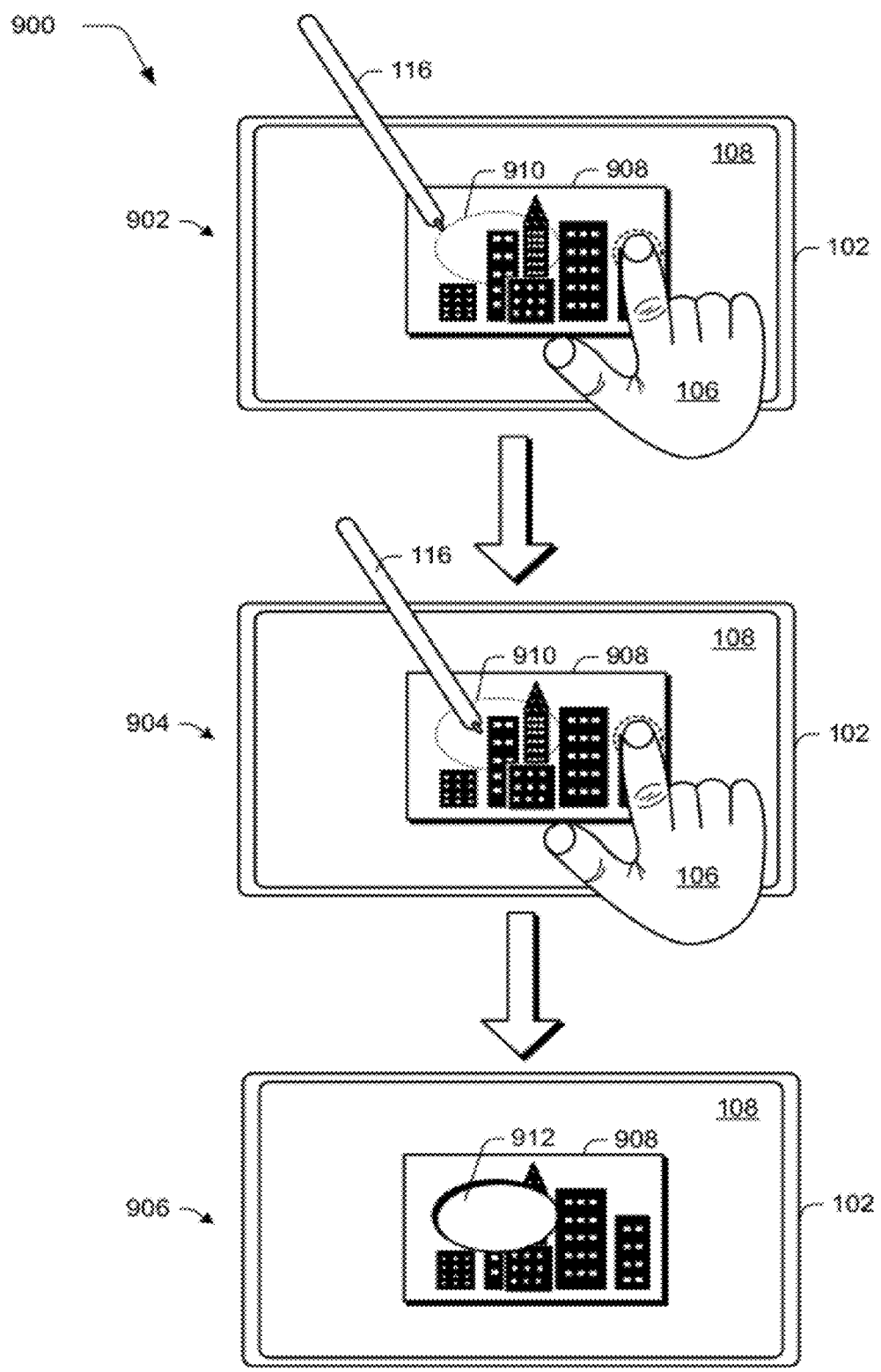
FIG. 9 is an illustration of an example implementation in which stages of a punch-out gesture of FIG. 1 are shown as being input through interaction with the computing device.

FIG. 9 is an illustration of an example implementation 900 in which stages of the punch-out gesture 124 of FIG. 1 are shown as being input through interaction with the computing device 102. The punch-out gesture 124 is illustrated in FIG. 9 using first, second, and third stages 902, 904, 906. In the first stage 902, an image 908 is illustrated as being selected using a finger of a user's hand 106, although other implementations are also contemplated as previously described.

While the image 908 is selected (e.g., in a selected state), a second input is received that approximates self-intersecting movement 910 within the image 908. For example, the movement 910 is illustrated in the second stage 904 as being input using the stylus 116. The stylus input that describes the movement 910 in illustrated example details an oval shown through the use of dashed lines on the image 908. In an implementation, the gesture module 104 may provide such a display (e.g., during or upon completion of the self-intersecting movement) to serve as a visual cue to the user. Additionally, the gesture module 104 may use a threshold to identify when the movement is sufficiently close to approximate the self-intersecting movement. In an implementation, the gesture module 104 incorporates a threshold size for the movement, e.g., to limit punch outs below the threshold size such as at a pixel level.

At the second stage 904, the gesture module 104 has recognized that the movement 910 is self intersecting. While the image 908 is still selected (e.g., the finger of the user's hand 106 remains within the image 908), another input is received that involves a tap within the self intersecting movement 910. For example, the stylus 116 that was used to detail the self intersecting movement 910 may then be used to tap within the self intersecting movement, e.g., the dashed oval as illustrated in the second stage 904. From these inputs, the gesture module 104 may identify the punch-out gesture 124. In another implementation, the tap may be performed "outside" the approximated self-intersecting movement to remove that portion of the image. Thus, the "tap" may be used to indicate which portion of the image is to be retained and which is to be removed.

Accordingly, as illustrated in the third stage 906, a portion of the image 908 that was within the self intersecting movement 910 is punched out (e.g., removed) from the image 908, thereby leaving a hole 912 in the image 908. In the illustrated implementation, the portion of the image 908 that was punched out is no longer displayed by the display device 108, although other implementations are also contemplated. For example, the punched out portion may be minimized and displayed within the hole 912 in the image 908, may be displayed proximal to the image 908, and so on. Subsequent taps while the image is still held (selected) may produce additional punch-outs with the same shape as the first—thus the operation may define a paper-punch shape and the user may then repeatedly apply it to punch additional holes in the image, other images, the canvas in the background, and so forth.

As previously described, although a specific implementation has been described using touch and stylus inputs, it should be readily apparent that a variety of other implementations are also contemplated. For example, the touch and stylus inputs may be switched to perform the punch-out gesture 124, the gesture may be performed using touch or stylus inputs alone, and so on.

Figure 10:
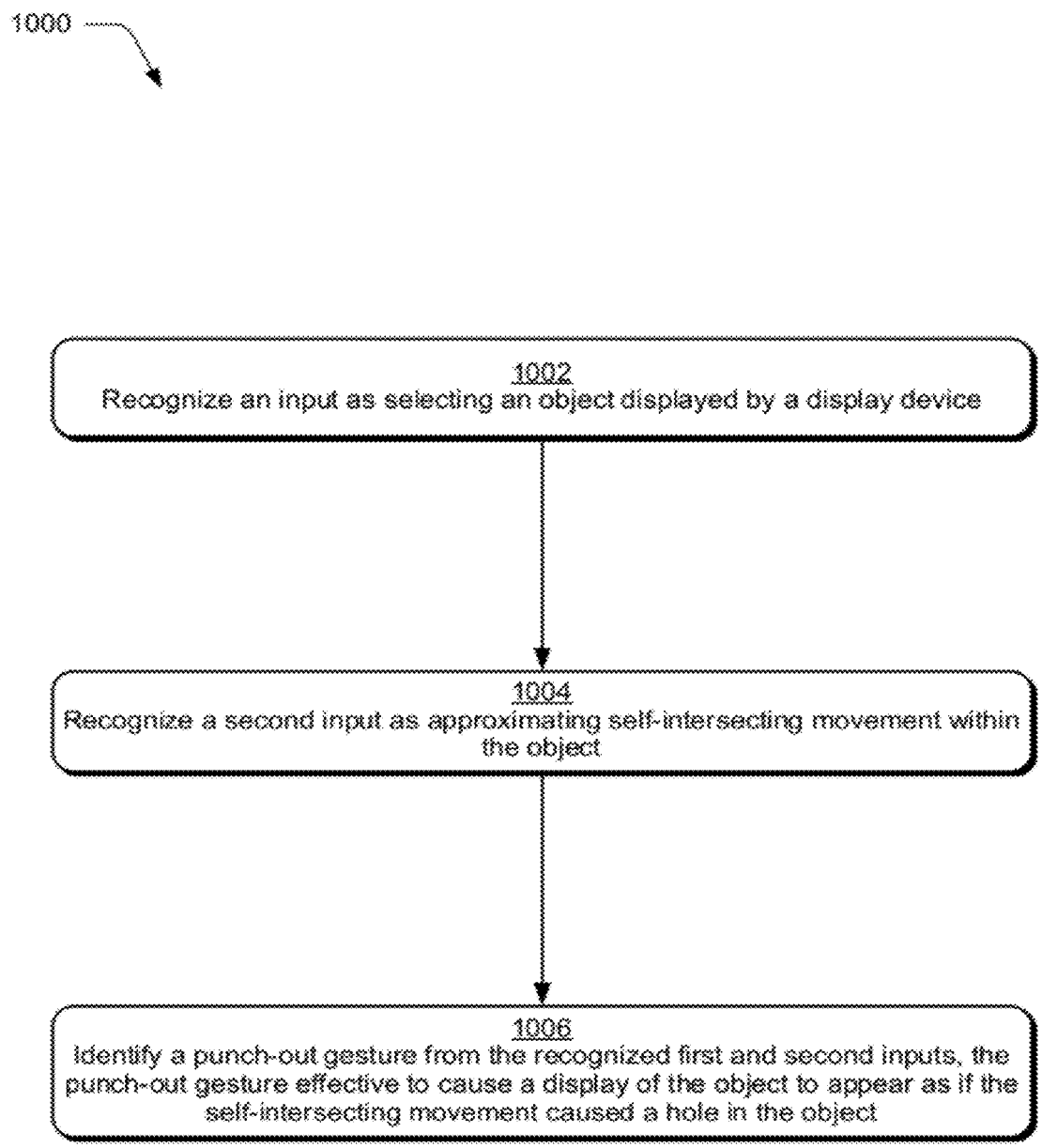
FIG. 10 is a flow diagram depicting a procedure in an example implementation of a punch-out gesture in accordance with one or more embodiments.

FIG. 10 is a flow diagram that depicts a procedure 1000 in an example implementation of a punch-out gesture in accordance with one or more embodiments. Aspects of the procedure may be implemented in hardware, firmware, software, or a combination thereof. The procedure is shown as a set of blocks in this example that specify operations performed by one or more devices and are not necessarily limited to the orders shown for performing the operations by the respective blocks. In portions of the following discussion, reference will be made to the environment 100 of FIG. 1, the system 200 of FIG. 2, and the example implementation 900 of FIG. 9.

A first input is recognized as selecting an object displayed by a display device (block 1002). For example, the image 708 may be tapped by a finger of the user's hand 106, a stylus 116, through use of a cursor control device, and so on.

A second input is recognized as self-intersecting movement within the object (block 1004). For example, the self-intersecting movement may be input as a continuous movement that crosses itself. A variety of shapes and sizes of self-intersecting movement are contemplated and as such this movement is not limited to the example illustrated movement 910 of FIG. 9. In an implementation, the second input also includes a tap within an area defined by the movement as previously described in relation to FIG. 9. However, other implementations are also contemplated, e.g., the portion within the self-intersecting movement 910 may "drop out" without the tap of the stylus 116.

A punch-out gesture is identified from the recognized first and second inputs, the punch-out gesture effective to cause a display of the object to appear as if the self-intersecting movement caused a hole in the object (block 1006). Continuing with the previous example, the hole 912 may be displayed by the gesture module 104 upon identification of the punch-out gesture 124. Again, it should be noted that although a specific example was described in which the punch-out gesture 124 was input using touch and stylus inputs, those inputs may be switched, a single input type (e.g., touch or stylus) may be used to provide the inputs, and so on. Additionally, as previously described functionality of the gestures may be combined into a single gesture, an example of which is shown in the following figure.

Figure 11:
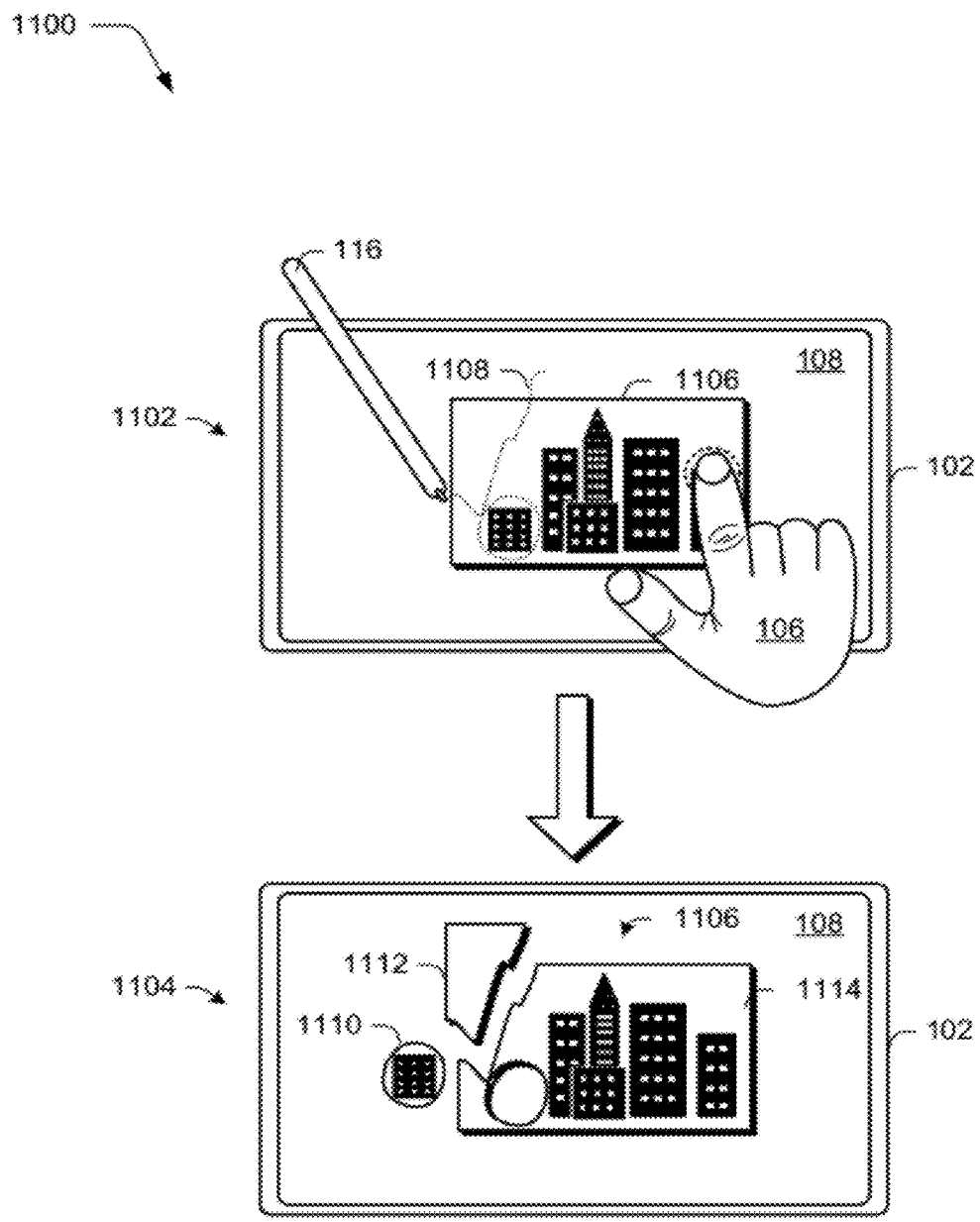
FIG. 11 is an illustration of an example implementation in which a combination of a cut gesture and a punch-out gesture of FIG. 1 are shown as being input in conjunction with the computing device.

FIG. 11 is an illustration of an example implementation 1100 in which a combination of a cut gesture 122 and a punch-out gesture 124 of FIG. 1 are shown as being input in conjunction with the computing device 102. The cut and punch-out gestures 122, 124 are illustrated through use of first and second stages 1102, 1104. In the first stage 1102, an image 1106 is illustrated as being selected using a finger of a user's hand 106. Movement 1108 of a stylus 116 is also illustrated through use of a dash line as before. In this case, however, the movement 1108 passes through two boundaries of the image 1106 and is self-intersecting within the image 1106.

In the second stage 1104, the image 1106 is cut along the described movement 1108 of the stylus 116. As with the cut gesture 122, portions 1110, 1112, 1114 are slightly displaced to show "where" the image 1106 was cut. Additionally, a portion of the movement 1108 is identified as self-intersecting and is therefore "punched out" of the image 1106. In this instance, however, the portion 1110 that is punched out is displayed proximal to the other portions 1112, 1114 of the image 1106. It should be readily apparent that this is but one of a variety of different examples of composing of gestures and that a variety of different combinations of the gestures described herein are contemplated without departing from the spirit and scope thereof.

Rip Gesture

Figure 12:
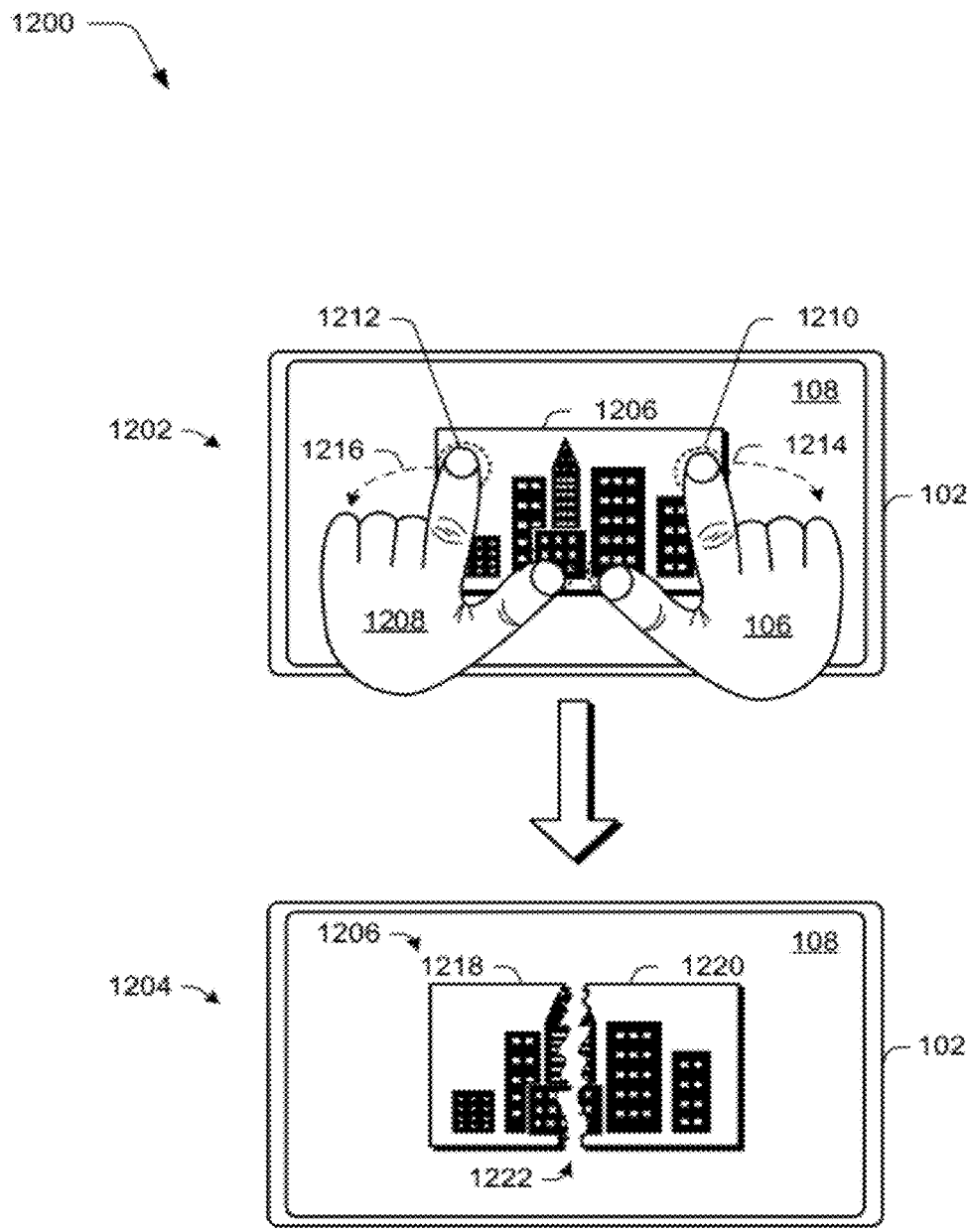
FIG. 12 is an illustration of an example implementation in which stages of a rip gesture of FIG. 1 are shown as being input through interaction with the computing device.

FIG. 12 is an illustration of an example implementation 1200 in which stages of the rip gesture 126 of FIG. 1 are shown as being input through interaction with the computing device 102. The rip gesture 126 is illustrated in FIG. 12 using first and second stages 1202, 1204. In the first stage 1202, an image 1206 is displayed by a display device 108 of the computing device 102. First and second fingers of the user's hand 106 and first and second fingers of the user's other hand 1208 are illustrated as selecting the image 1206. For example, the first and second fingers of the user's hand 106 may be used to indicate a first point 1210 and the first and second finger of the user's other hand 1208 may be used to indicate a second point 1212.

Movement is recognized by the gesture module 104 in which the first and second inputs have moved away from each other. In the illustrated implementation, this movement 1214, 1216 describes an arc much like a motion that would be used to rip physical paper. Accordingly, the gesture module 104 may identify a rip gesture 126 from these inputs.

The second stage 1204 shows a result of the rip gesture 126. In this example, the image 1206 is ripped to form first and second portions 1218, 1220. Additionally, a rip 1222 is formed between the first and second points 1210, 1212 of the image that is generally perpendicular to the described movement of the fingers of the user's hands 106, 1208 away from each other. In the illustrated example, the rip 1222 is displayed as having a jagged edge which differs from the clean edge of the cut gesture 122, although a clean edge is also contemplated in other implementations, e.g., to rip along a perforated line in an image displayed by the display device 108. As previously described, although a specific implementation has been described using touch and stylus inputs, it should be readily apparent that a variety of other implementations are also contemplated. For example, the touch and stylus inputs may be switched to perform the rip gesture 126, the gesture may be performed using touch or stylus inputs alone, and so on.

Figure 13:
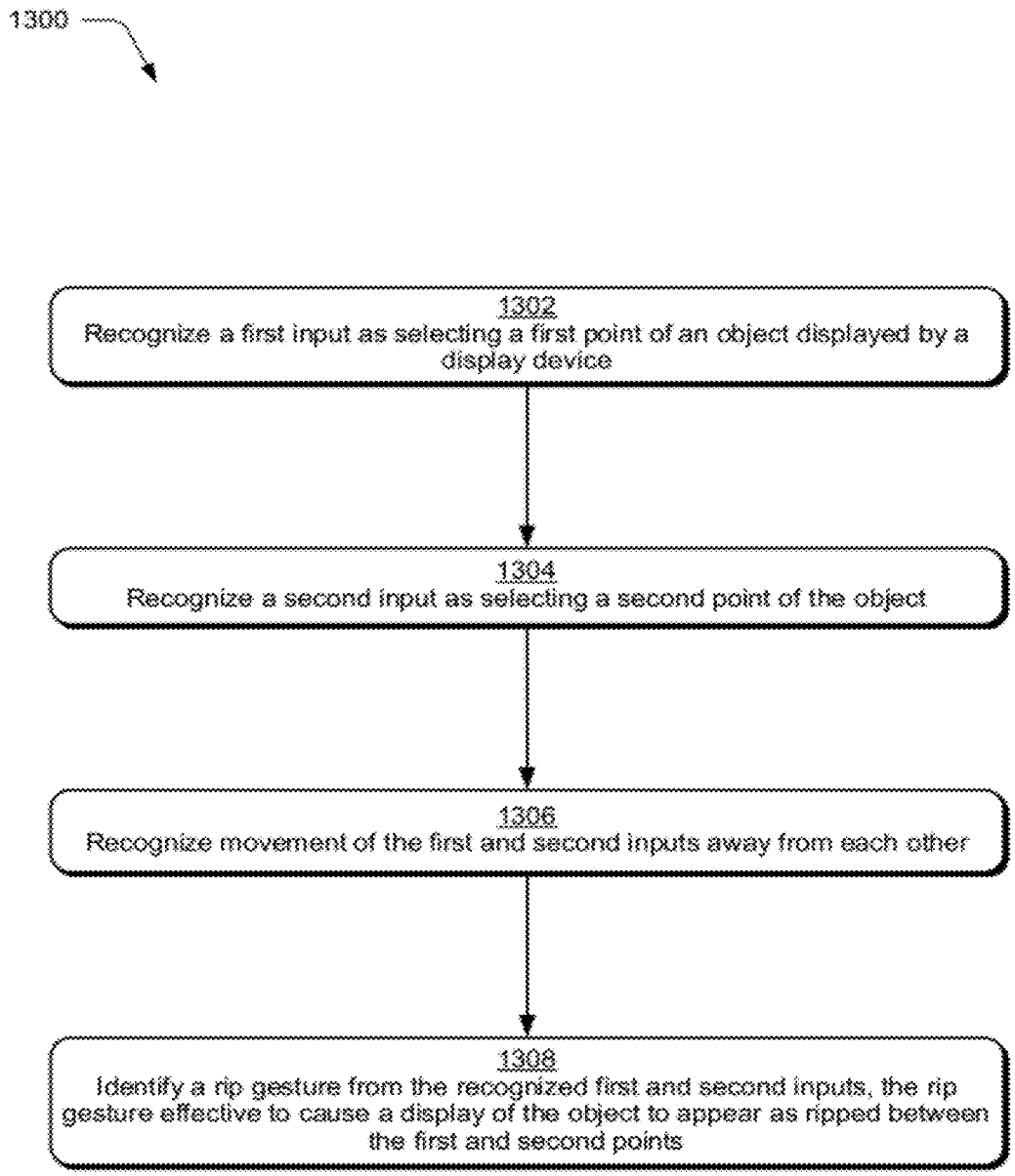
FIG. 13 is a flow diagram that depicts a procedure in an example implementation of a rip gesture in accordance with one or more embodiments.

FIG. 13 is a flow diagram that depicts a procedure 1300 in an example implementation of a rip gesture 126 in accordance with one or more embodiments. Aspects of the procedure may be implemented in hardware, firmware, software, or a combination thereof. The procedure is shown as a set of blocks in this example that specify operations performed by one or more devices and are not necessarily limited to the orders shown for performing the operations by the respective blocks. In portions of the following discussion, reference will be made to the environment 100 of FIG. 1, the system 200 of FIG. 2, and the example implementation 1200 of FIG. 12.

A first input is recognized as selecting a first point of an object displayed by a display device (block 1302). A second input is recognized as selecting a second point of the object (block 1304). For example, the finger of the user's hand 106 may select the first point 1210 and a finger from the user's other hand 1208 may select the second point of the image 1206.

Movement is recognized of the first and second inputs as moving away from each other (block 1306). For example, the movement may contain a vector component that indicates that the first and second inputs (and thus sources of the first and second inputs) are moving and/or have moved apart. Accordingly, a rip gesture is identified from the recognized first and second inputs, the rip gesture effective to cause a display of the object to appear as ripped between the first and second points (block 1308). As shown in FIG. 12, for instance, the rip 1222 may be formed at a general midpoint between the first and second points 1210, 1212 and run perpendicular to a straight line connecting the first and second points 1210, 1212 if so drawn. Yet again, it should be noted that although a specific example was described in which the rip gesture 126 was input using touch inputs, those inputs may be switched to stylus input, multiple input types may be used (e.g., touch and stylus), and so on.

Edge Gesture

Figure 14:
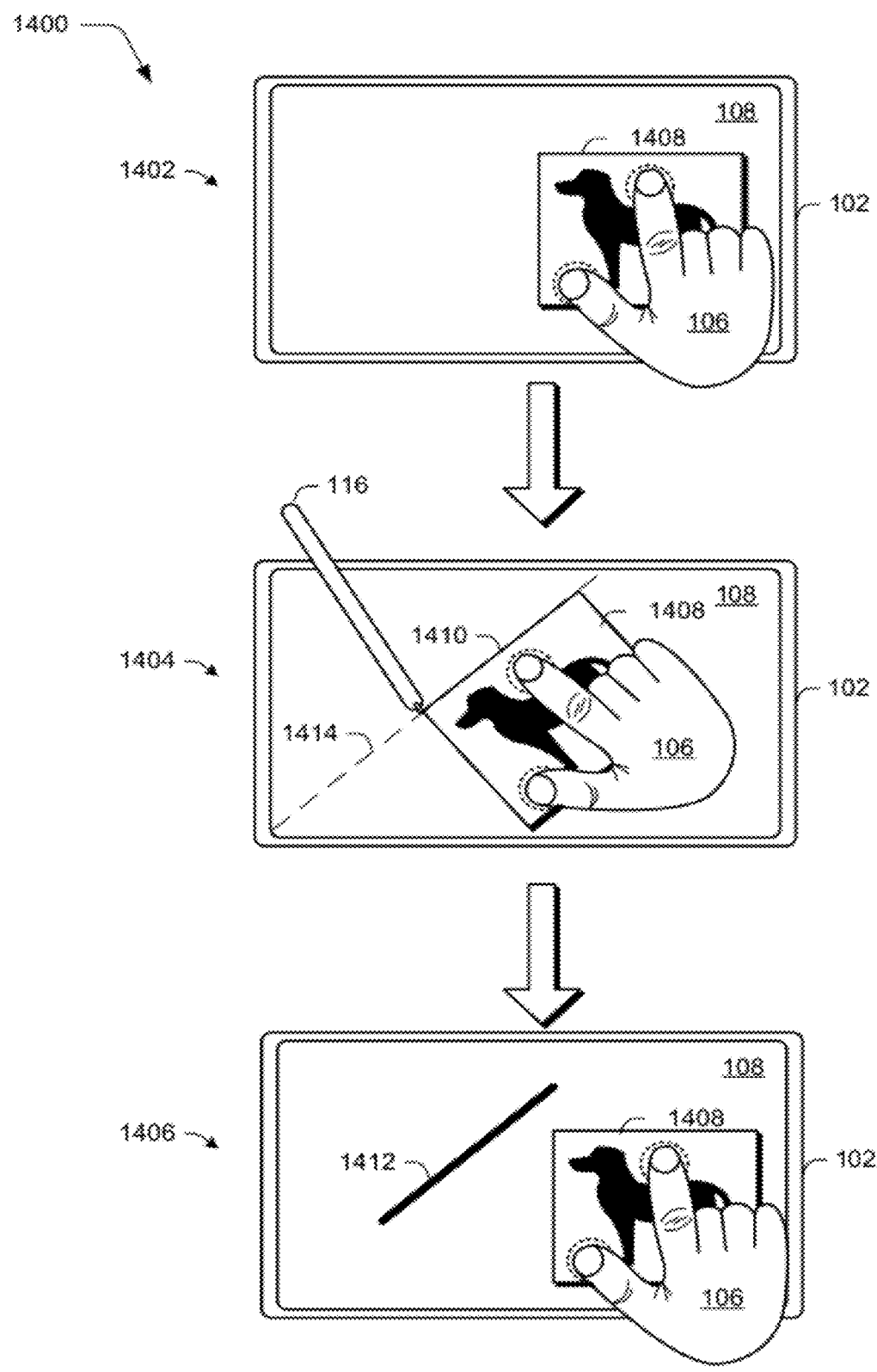
FIG. 14 is an illustration of an example implementation in which stages of an edge gesture of FIG. 1 are shown as being input through interaction with the computing device to draw a line.

FIG. 14 is an illustration of an example implementation 1400 in which stages of the edge gesture 128 of FIG. 1 are shown as being input in conjunction with the computing device 102 to draw a line. The edge gesture 128 is illustrated in FIG. 14 using first, second, and third stages 1402, 1404, 1406. At the first stage 1402, an image 1408 is selected using two points of contact. For example, first and second fingers of the user's hand 106 may be used to select the image 1408, although other examples are also contemplated. By using two-points of contact as opposed to one, the gesture module 104 may differentiate between an increased number of gestures, although it should be readily apparent that a single point of contact is also contemplated in this example.

In the second stage 1404, the two points of contact from the user's hand 106 are used to move and rotate the image 1408 from the initial location in the first stage 1402 to the new location illustrated in the second stage 1404. The stylus 116 is also illustrated as moving proximal to an edge 1410 of the image 1408. Accordingly, the gesture module 104 identifies the edge gesture 128 from these inputs and causes a line 1412 to be displayed as shown in the third stage 1406.

In the illustrated example, the line 1412 is displayed as proximal to where the edge 1410 of the image 1408 was located when the movement of the stylus 116 occurred. Thus, in this example the edge 1410 of the image 1408 acts as a straight edge to draw a corresponding line 1412 that is straight. In an implementation, the line 1412 may be continued to follow the edge 1410 even when proceeding past the corner of the image 1408. In this way, the line 1412 may be drawn as having a length that is greater that the length of the edge 1410.

Additionally, identification of the edge gesture 128 may cause output of an indication 1414 of where the line is to be drawn, an example of which is shown in the second stage 1404. The gesture module 104, for instance, may output the indication 1414 to give the user an idea of where the line 1412 is to be drawn in relation to the edge 1410. In this way, the user may adjust a location of the image 1408 to further refine where the line is to be drawn without actually drawing the line 1412. A variety of other examples are also contemplated without departing from the spirit and scope thereof.

In an implementation, the line 1412 has different characteristics depending on what is to be displayed beneath the line 1412, i.e., what the line is to be drawn upon. The line 1412, for instance, may be configured for display when drawn over a background of a user interface but not displayed when drawn over another image. Additionally, the image 1408 may be displayed as partially transparent when used as a part of the edge gesture 128 such that a user may view what is beneath the image 1408 and thus made better aware of a context in which the line 1412 is to be drawn. Further, although the edge 1410 is illustrated as straight in this example, the edge may take a variety of configurations, e.g., a French curve, circle, oval, wave, following the cut, torn, or punched-out edges from our previous example gestures, and so on. For instance, a user may select from a variety of preconfigured edges to perform the edge gesture 128 (such as from a menu, a template displayed in a side area of the display device 108, and so on). Accordingly, in such configurations the line drawn proximal to the edges may follow curves and other features of the edge.

As previously described, although a specific implementation has been described using touch and stylus inputs, it should be readily apparent that a variety of other implementations are also contemplated. For example, the touch and stylus inputs may be switched to perform the edge gesture 128, the gesture may be performed using touch or stylus inputs alone, and so on. For example, in some embodiments where finger painting or color-smudging are supported using touch inputs, these touch inputs also conform to the edge(s) thus formed. Other tools, such as an airbrush, can also be snapped to the edge, to produce a hard edge along the constraint line, and a soft edge on the underlying surface.

Figure 15:
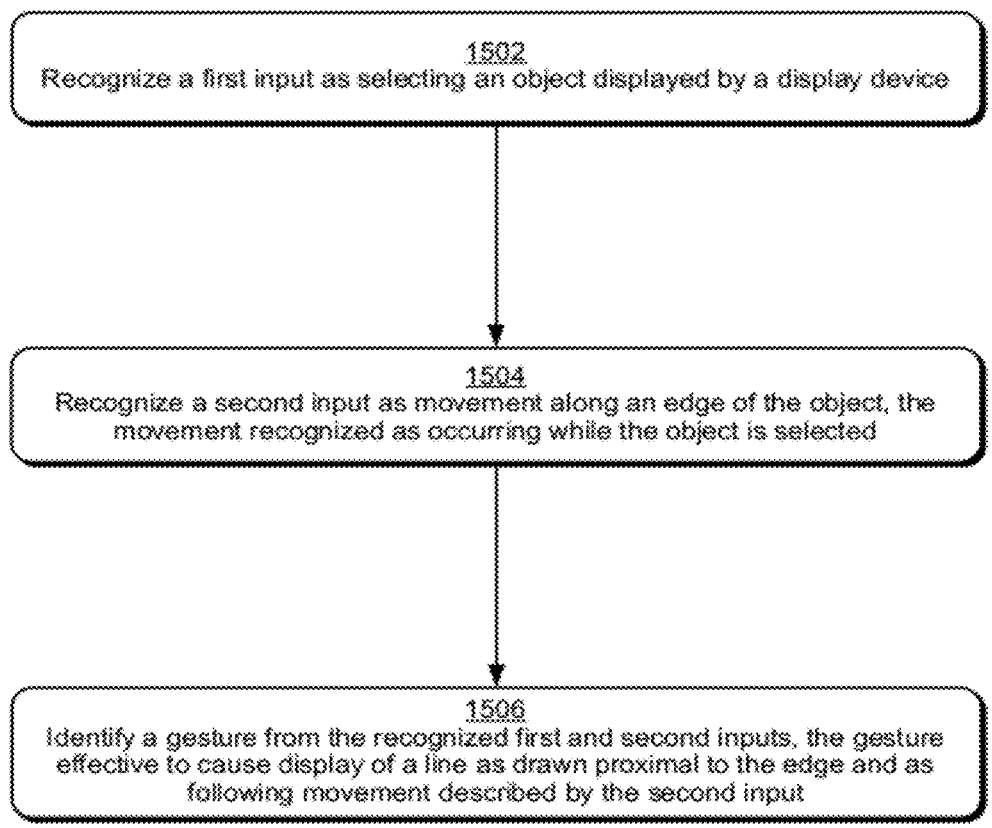
FIG. 15 is a flow diagram depicting a procedure in an example implementation of an edge gesture in accordance with one or more embodiments.

FIG. 15 is a flow diagram that depicts a procedure 1500 in an example implementation of the edge gesture 128 in accordance with one or more embodiments. Aspects of the procedure may be implemented in hardware, firmware, software, or a combination thereof. The procedure is shown as a set of blocks in this example that specify operations performed by one or more devices and are not necessarily limited to the orders shown for performing the operations by the respective blocks. In portions of the following discussion, reference will be made to the environment 100 of FIG. 1, the system 200 of FIG. 2, and the example implementation 1400 of FIG. 14.

A first input is recognized as selecting an object displayed by a display device (block 1502). As described above, the first input may be recognized as a touch input involving two points of contact on a display of an object, e.g., the image 1408. Although referenced as "points of contact," it should be readily apparent that actual contact is not required, e.g., the points of contact may be signified "in the air" using a natural user interface (NUI) and detected using a camera. Therefore, the points of contact may refer to an indication of an intent to indicate contact, and not limited to actual contact itself.

A second input is recognized as movement along an edge of the object, the movement recognized as occurring while the object is selected (block 1504). Continuing with the previous example, a stylus input may be recognized that was input as proximal to and following a displayed edge 1410 of the image 1408 using the stylus 116.

The gesture is identified from the recognized first and second inputs, the gesture effective to cause display of a line as drawn proximal to the edge and as following movement described by the second input (block 1506). The gesture module 104 may recognize the edge gesture 128 from these inputs. The edge gesture 128 is operable to cause a line to be displayed that corresponds to the recognized movement as well as to follow subsequent movement of the stylus 116. As previously noted, the line drawn using the edge gesture 128 is not limited to a straight line and rather may follow any desirable edge shape without departing from the spirit and scope thereof. Likewise multiple pen strokes may be drawn in succession along the same or different edges of a selected object.

Figure 16:
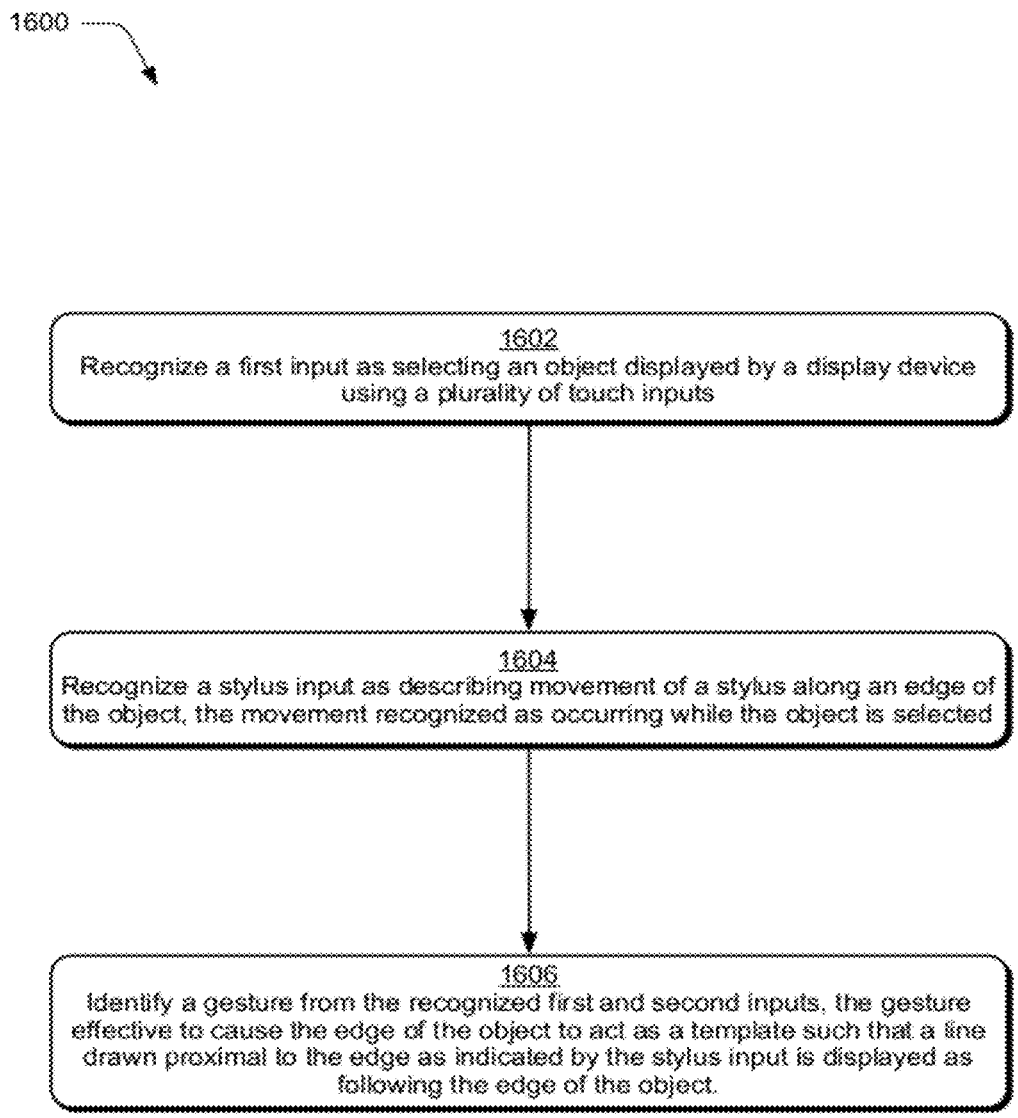
FIG. 16 is a flow diagram depicting a procedure in an example implementation of an edge gesture in accordance with one or more embodiments.

FIG. 16 is a flow diagram that depicts a procedure 1600 in an example implementation of the edge gesture 128 in accordance with one or more embodiments. Aspects of the procedure may be implemented in hardware, firmware, software, or a combination thereof. The procedure is shown as a set of blocks in this example that specify operations performed by one or more devices and are not necessarily limited to the orders shown for performing the operations by the respective blocks. In portions of the following discussion, reference will be made to the environment 100 of FIG. 1, the system 200 of FIG. 2, and the example implementation 1400 of FIG. 14.

A first input is recognized as selecting an object displayed by a display device using a plurality of touch inputs (block 1602). As described in relation to FIG. 14, the first input may be recognized as a touch input involving two points of contact on a display of an object, e.g., the image 1408.

A second input is recognized as describing movement of a stylus along an edge of the object, the movement recognized as occurring while the object is selected (block 1604). In this example, the input is a type of stylus input that is recognized as being input as proximal to and following a displayed edge 1410 of the image 1408 using the stylus 116.

A gesture is identified from the recognized first and second inputs, the gesture effective to cause the edge of the object to act as a template such that a line drawn proximal to the edge as indicated by the stylus input is displayed as following the edge of the object (block 1606). Thus, in this example, the edges of the object (e.g., image 1408) act as guide to cause display of a line responsive to identification of the edge gesture 128.

Figure 17:
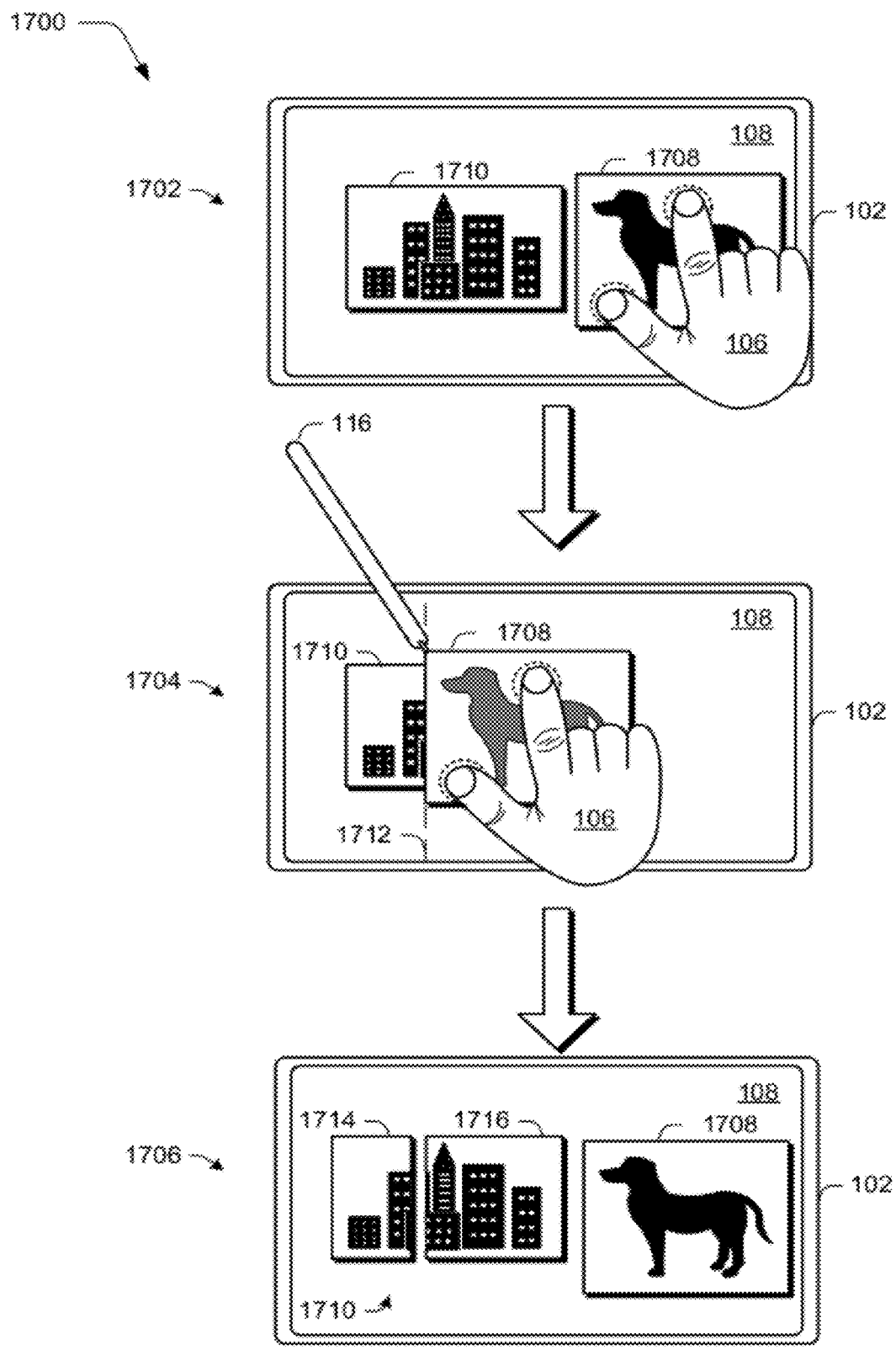
FIG. 17 is an illustration of an example implementation in which stages of an edge gesture of FIG. 1 are shown as being input through interaction with the computing device to cut along a line.

FIG. 17 is an illustration of an example implementation 1700 in which stages of the edge gesture 128 of FIG. 1 are shown as being input in conjunction with the computing device 102 to cut along a line. The edge gesture 128 is illustrated in FIG. 17 using first, second, and third stages 1702, 1704, 1706. At the first stage 1702, a first image 1708 is selected using two points of contact. For example, first and second fingers of the user's hand 106 may be used to select the image 1708, although other examples are also contemplated.

In the second stage 1704, the two points of contact from the user's hand 106 are used to move the first image 1708 from the initial location in the first stage 1702 to the new location illustrated in the second stage 1704 as positioned "over" a second image 1710. Additionally, the first image 1708 is illustrated as partially transparent (e.g., using grayscale) such that at least a portion of the second image 1710 that is positioned beneath the first image 1708 may be viewed. In this way, the user may adjust a location of the image 1708 to further refine where the cut is to occur.

The stylus 116 is illustrated as moving proximal to an edge 1712 of the first image 1708 along in indication 1712 of a "cut line." Accordingly, the gesture module 104 identifies the edge gesture 128 from these inputs, a result of which is shown in the third stage 1706. In an implementation, the object to be cut is also selected (e.g., via a tap) to indicate what is to be cut. The selection of the edge and cut/drawn objects may be performed in any order.

As shown in the third stage 1706, the first image 1708 has been moved away from the second image 1710, e.g., using a drag and drop gesture to move the image 1708 back to the previous location. Additionally, the second image 1710 is displayed as cut into first and second portions 1714, 1716 along where the edge of the first image 1708 was positioned in the second stage 1704, i.e., along the indication 1712. Thus, in this example the edge of the first image 1708 may be used as a template to perform the cut, rather than performing a "freehand" cut as previously described for the cut gesture 122.

In an implementation, the cut performed by the edge gesture 128 has different characteristics depending on where the cut is to be performed. For example, the cut may be used to cut objects displayed in a user interface but not a background of the user interface. Additionally, although the edge is illustrated as straight in this example, the edge may take a variety of configurations, e.g., a French curve, circle, oval, wave, and so on. For instance, a user may select from a variety of preconfigured edges to perform cut using the edge gesture 128 (such as from a menu, a template displayed in a side area of the display device 108, and so on). Accordingly, in such configurations the cut may follow curves and other features of a corresponding edge. Likewise, a tearing gesture may be performed with a finger to create a torn edge that follows the template.

As previously described, although a specific implementation has been described using touch and stylus inputs, it should be readily apparent that a variety of other implementations are also contemplated. For example, the touch and stylus inputs may be switched to perform the edge gesture 128, the gesture may be performed using touch or stylus inputs alone, and so on.

Figure 18:
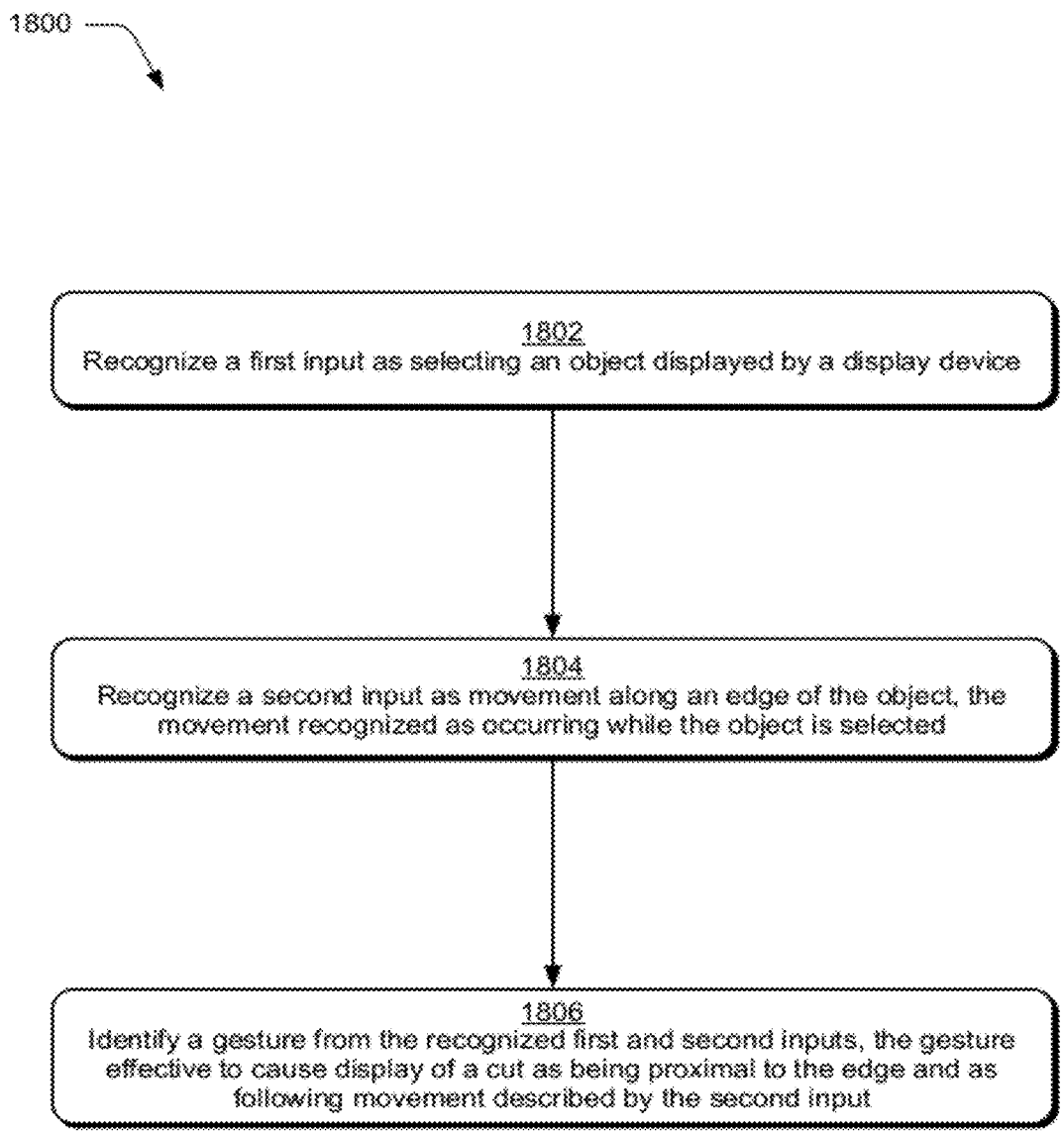
FIG. 18 is a flow diagram that depicts a procedure in an example implementation of an edge gesture to perform a cut in accordance with one or more embodiments.

FIG. 18 is a flow diagram that depicts a procedure 1800 in an example implementation of the edge gesture 128 to perform a cut in accordance with one or more embodiments. Aspects of the procedure may be implemented in hardware, firmware, software, or a combination thereof. The procedure is shown as a set of blocks in this example that specify operations performed by one or more devices and are not necessarily limited to the orders shown for performing the operations by the respective blocks. In portions of the following discussion, reference will be made to the environment 100 of FIG. 1, the system 200 of FIG. 2, and the example implementation 1700 of FIG. 17.

A first input is recognized as selecting an object displayed by a display device (block 1802). A second input is recognized as movement along an edge of the object, the movement recognized as occurring while the object is selected (block 1804). As before, a stylus input may be recognized that was input as proximal to and following a displayed edge of the image 1708 using the stylus 116 while the image 1708 is selected, e.g., using one or more fingers of the user's hand 106.

The gesture is identified from the recognized first and second inputs, the gesture is effective to cause display of a cut as being proximal to the edge and as following movement described by the second input (block 1806). The gesture module 104 may recognize the edge gesture 128 from these inputs. The edge gesture 128 is operable to cause a cut to be displayed that corresponds to the recognized movement as well as to follow subsequent movement of the stylus 116. For example, portions 1714, 1716 of the image 1710 may be displayed as slightly displaced to show "where" the cut occurred. As previously noted, the cut is not limited to a straight line and rather may follow any desirable edge shape without departing from the spirit and scope thereof.

Again, it should be noted that although the specific examples of FIGS. 14-18 were described in which the edge gesture 128 was input using touch and stylus inputs, those inputs may be switched, a single input type (e.g., touch or stylus) may be used to provide the inputs, and so on.

Stamp Gesture

Figure 19:
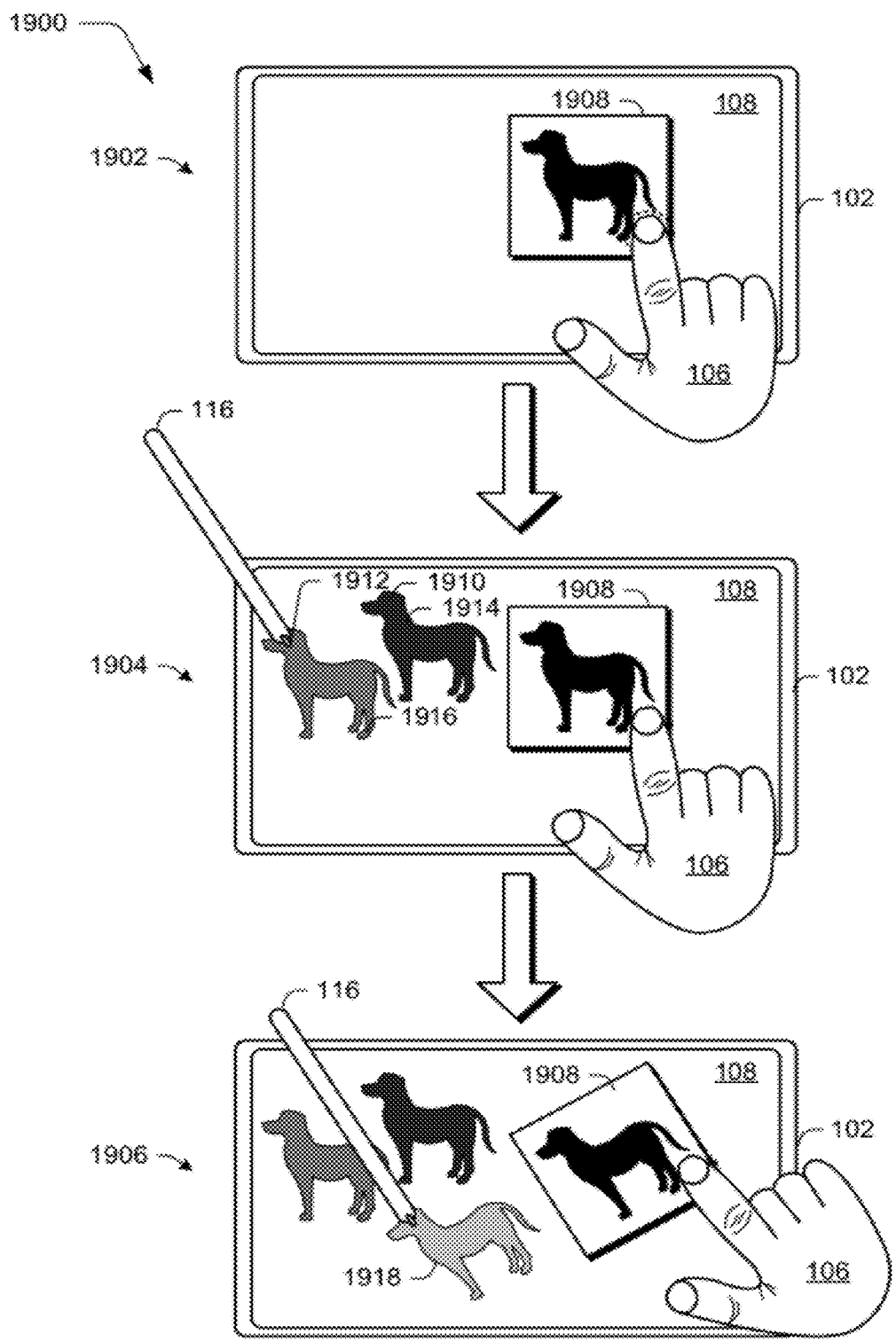
FIG. 19 is an illustration of an example implementation in which stages of a stamp gesture of FIG. 1 are shown as being input in conjunction with the computing device.

FIG. 19 is an illustration of an example implementation 1900 in which stages of the stamp gesture 130 of FIG. 1 are shown as being input in conjunction with the computing device 102. The stamp gesture 130 is illustrated in FIG. 19 using first, second, and third stages 1902, 1904, 1906. In the first stage 1902, an image 1908 is selected using a finger of the user's hand 106, although other implementations are also contemplated, e.g., selection using multiple points of contact, a cursor control device, and so on as previously described.

In the second stage 1904, the stylus 116 is used to indicate first and second locations 1910, 1912 in a user interface displayed by the display device 108 of the computing device 102. For example, the stylus 116 may be used to "tap" the display device 108 at those locations. In this example, the first and second locations 1910, 1912 are located "outside" the bounds of the image 1908. However, it should be readily apparent that other examples are contemplated. For instance, once the first location has fallen outside the bounds of the image, a "stamping phrase" may be established, and therefore subsequent taps may fall within the bounds of the image with introducing ambiguity with respect to other gestures, e.g., the staple gesture.

Responsive to these inputs, the gesture module 104 identifies the stamp gesture 130 and causes first and second copies 1914, 1916 to be displayed at the first and second locations 1910, 1912, respectively. In an implementation, the first and second copies 1914, 1916 of the image 1908 are displayed to give an appearance that the image 1908 was used similar to a rubber stamp to stamp the copies 1914, 1916 onto a background of the user interface. A variety of techniques may be used to give the rubber stamp appearance, such as granularity, use of one or more colors, and so on. Furthermore the stylus tap pressure and stylus tilt angles (azimuth, elevation, and roll, where available) may be used to weight the resulting ink impression, determine the stamp's image orientation, determine a direction of smudging or blurring effects, introduce a gradient of light to dark ink in the resulting image, and so on. Likewise, for touch inputs there may also be corresponding properties of contact area and orientation of the touch input. Additionally, successive stamp gestures 130 may be used to create successively lighter copies of the image 1908 in response to successive taps that are performed outside the boundary of the image 1908, optionally down to a minimum lightness threshold. An example of this is illustrated as the second copy 1916 of the image 1908 being displayed as lighter than the first copy 1914 of the image 1908 in the second stage 1904 through the use of grayscale. Other lightening techniques are also contemplated, such as use of contrast, brightness, and so on. The user may also "refresh the ink" or change the color or effect(s) produced by a stamp by engaging a color picker, color icons, effect icons, or the like during a stamping phrase.

In the third stage 1906, the image 1908 is displayed as rotated when compared with the image 1908 in the first and second stages 1902, 1904. Accordingly, in this example a third stamp gesture 130 causes a display of a third copy 1918 as having an orientation that matches the orientation of the image 1908, e.g., rotated. A variety of other examples are also contemplated, such as to manipulate a size, color, texture, view angle, and so on of the copies 1914-1918 of the image 1908. As previously described, although a specific implementation has been described using touch and stylus inputs, it should be readily apparent that a variety of other implementations are also contemplated. For example, the touch and stylus inputs may be switched to perform the stamp gesture 130 (e.g., the image 1908 may be held using the stylus 116 and the locations of where the stamp is to be made using a touch input), the gesture may be performed using touch or stylus inputs alone, and so on.

Figure 20:
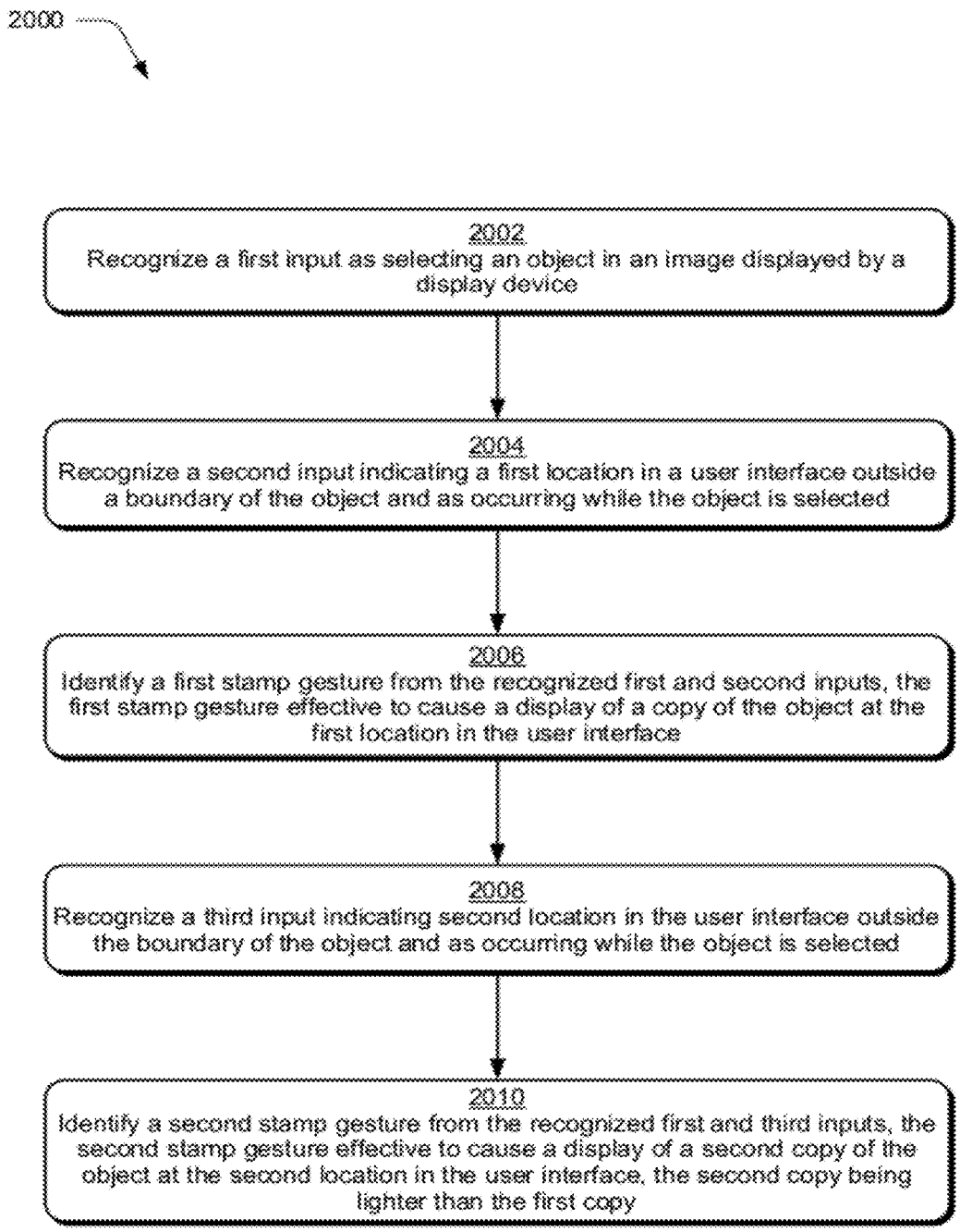
FIG. 20 is a flow diagram that depicts a procedure in an example implementation of a stamp gesture in accordance with one or more embodiments.

FIG. 20 is a flow diagram that depicts a procedure 2000 in an example implementation of a stamp gesture 130 in accordance with one or more embodiments. Aspects of the procedure may be implemented in hardware, firmware, software, or a combination thereof. The procedure is shown as a set of blocks in this example that specify operations performed by one or more devices and are not necessarily limited to the orders shown for performing the operations by the respective blocks. In portions of the following discussion, reference will be made to the environment 100 of FIG. 1, the system 200 of FIG. 2, and the system 1900 of FIG. 19.

A first input is recognized as selecting an object displayed by a display device (block 2002). For example, the image 1908 may be selected using one or more fingers of the user's hand 106, a stylus 116, use of a cursor control device, and so on. Accordingly, the first input describes this selection.

A second input is recognized as indicating a first location in a user interface outside a boundary of the object and as occurring while the object is selected (block 2004). For example, the second input may be recognized by the gesture module 104 as a stylus input that describes a tap of the stylus 116 in the first location 1910 in a user interface displayed by a display device 108 of the computing device 102. Additionally, the first location may occur outside a boundary of the image 1908.

A first stamp gesture is identified from the recognized first and second inputs, the first stamp gesture effective to cause a display of a copy of the object at the first location in the user interface (block 2006). Continuing with the previous example, the gesture module 104 may cause a first copy 1914 of the image 1908 to be displayed at the first location 1910. The copy 1914 of the image 1908 may be configured in a variety of different ways, such as to appear as if the image 1908 was used as a rubber stamp to create the copy 1914.

Additionally, the stamp may be initiated and placed in the user interface in a variety of ways. For example, the stylus 116 may "tap down" on the display device 108 to indicate an initially desired location, e.g., the second location 1912. If the stylus 116 is moved while still indicating desired interaction with the user interface (e.g., placed proximal to a user interface output by the display device 108), the second copy 1916 may follow the movement of the stylus 116. Once the stylus 116 indicates a final placement, e.g., through lifting the stylus 116 away from the display device 108, the copy may remain at that location, motion blur/smudging may be applied to the resulting stamp that follows the path prescribed by the stylus, and so on. Additional copies (e.g., stamps) may also be made, an example of which is described as follows.

A third input is recognized as indicating a second location in the user interface outside the boundary of the object and as occurring while the object is selected (block 2008). A second stamp gesture is identified from the recognized first and third inputs, the second stamp gesture effective to cause a display of the second copy of the object at the second location in the user interface, the second copy being lighter than the first copy (block 2010). Continuing yet again with the previous example, the gesture module 104 may cause a second copy 1916 of the image 1908 to be displayed at the second location 1912. In an implementation, successive implementation of the stamp gesture 130 causes successfully lighter copies to be displayed by the display device 108, an example of which is shown using successively lighter shades of gray in the example implementation 1900 of FIG. 19. Additionally, different semantics may be employed by the gesture module 104 depending on "what" is going to be stamped. For instance, the gesture module 104 may permit the copy (e.g., the stamp) to appear on a background but not on icons or other images displayed by the display device 108, may limit the copies to being implemented in data that may be manipulated by a user, and so on.

For example, in an embodiment an icon from a toolbar may be selected (e.g., held) and then instances of the icon may be "stamped" onto a user interface, e.g., shapes in a drawing program. A variety of other examples are also contemplated. Again, it should be noted that although a specific example was described in which the stamp gesture 130 was input using touch and stylus inputs, those inputs may be switched, a single input type (e.g., touch or stylus) may be used to provide the inputs, and so on.

Brush Gesture

Figure 21:
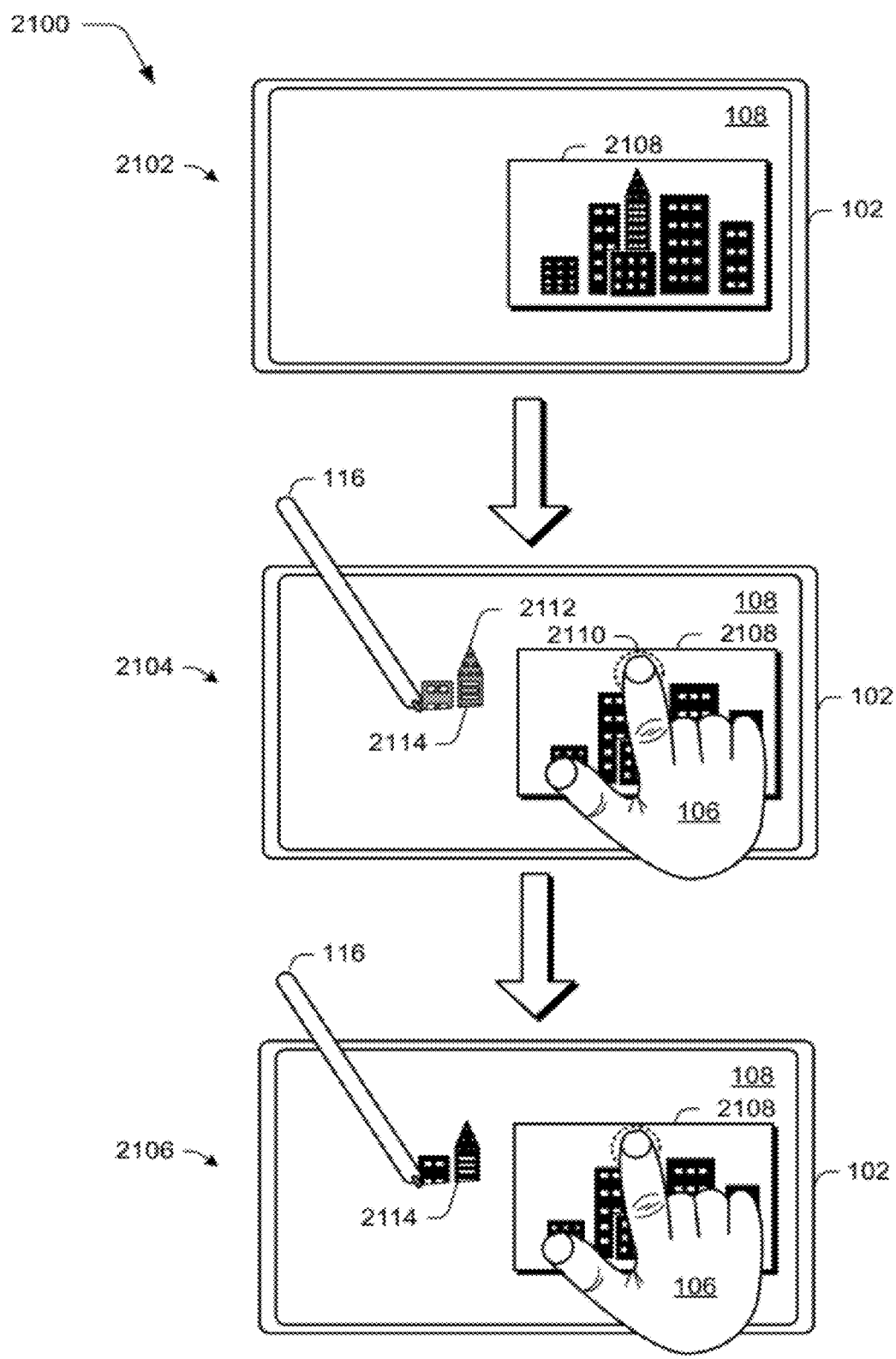
FIG. 21 is an illustration of an example implementation in which stages of a brush gesture of FIG. 1 are shown as being input through interaction with the computing device.

FIG. 21 is an illustration of an example implementation 2100 in which stages of the brush gesture 132 of FIG. 1 are shown as being input through interaction with the computing device 102. The brush gesture 132 is illustrated in FIG. 21 using first, second, and third stages 2102, 2104, 2106. In the first stage 2102, an image 2108 is displayed in a user interface by the display device 108 of the computing device 102. The image 2108 in this example is a photo of a city skyline having a plurality of buildings.

In the second stage 2104, a touch input is used to both select the image 2108 and to select a particular point 2110 in the image 2108, which is illustrated as being performed using a finger of the user's hand 106. The stylus 116 in this example is also illustrated as providing a stylus input that describes one or more lines that are "brushed" by the stylus 116 outside the borders of the image 2108. For example, the stylus 116 may make a series of zigzagging lines that begin at a location 2112 outside the boundary of the image 2108 in the user interface, a combination of lines taken together, a single line over a threshold distance, and so on. The gesture module 104 may then identify these inputs as the brush gesture 132. At this point, the gesture module 104 may consider these inputs to have initiated a brushing phrase, such that subsequent lines below a threshold distance are permitted.

Upon identification of the brush gesture 132, the gesture module 104 may use a bitmap of the image 2108 as fill for the lines drawn by the stylus 116. Additionally, in an implementation the fill is taken from corresponding lines of the image 2108 beginning at the particular point 2110 in the image 2108 indicated by the touch input, e.g., the finger of the user's hand 106, although other viewport mappings of the source image to the resulting brush strokes are contemplated within the scope thereof, such as by using properties of the source object, e.g., texture and so on. A result of these lines is illustrated as a portion 2114 of the image 2108 copied using the brush strokes of the stylus 116.

In an implementation, the opacity of the lines that are drawn by the stylus 116 increases as additional lines are drawn over a given area. As illustrated in the third stage 2106, for instance, the stylus 116 may draw back over the portion 2114 copied from the image 2108 to increase the opacity of the portion 2114. This is illustrated in the third stage 2106 by increasing the darkness of the portion 2114 as compared to the darkness of the portion 2114 illustrated in the second stage 2104 of the example implementation 2100.

As previously described, although a specific implementation has been described using touch and stylus inputs, it should be readily apparent that a variety of other implementations are also contemplated. For example, the touch and stylus inputs may be switched to perform the brush gesture 132, the brush gesture 132 may be performed using touch or stylus inputs alone, and so on.

Figure 22:
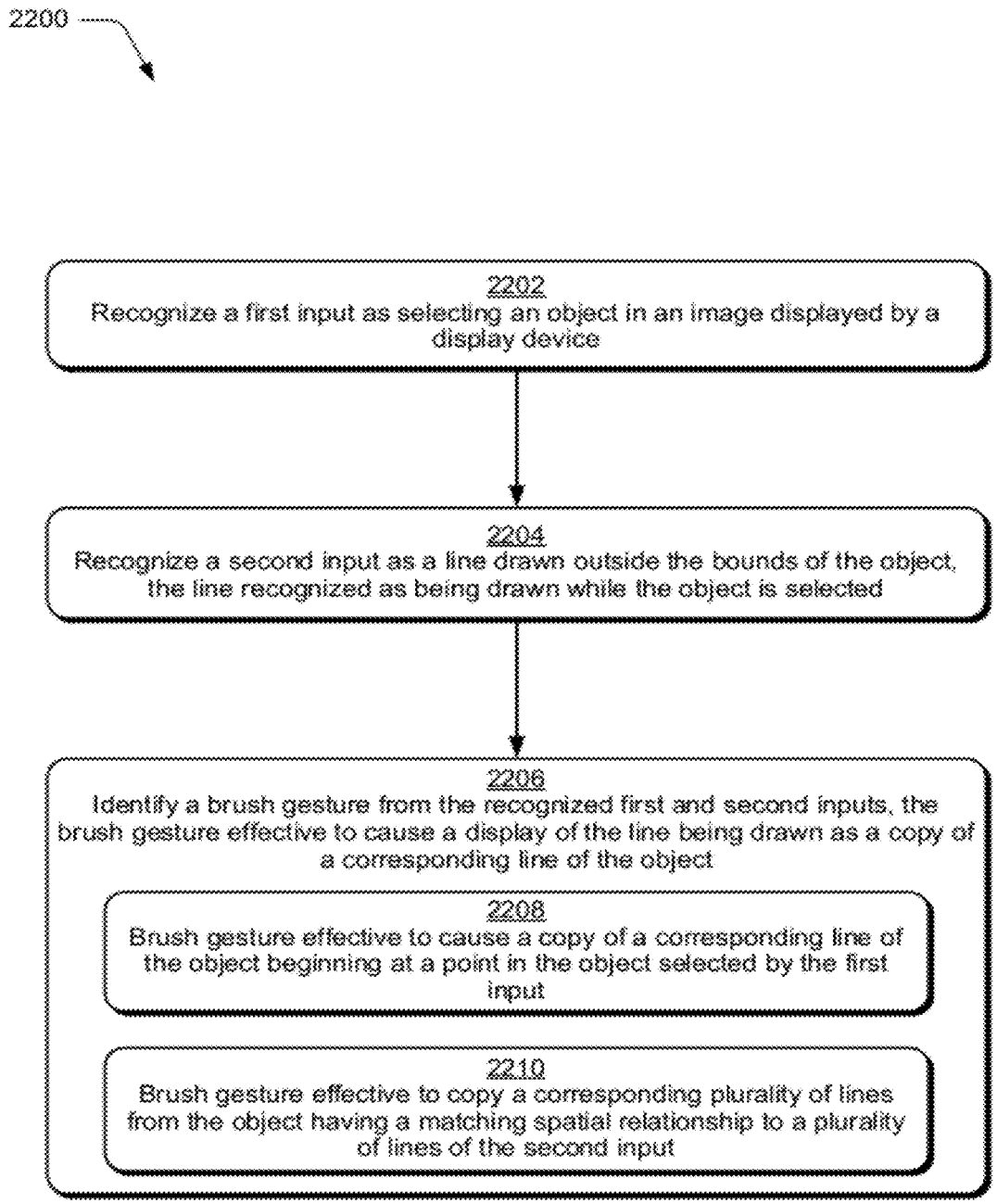
FIG. 22 is a flow diagram that depicts a procedure in an example implementation of a brush gesture in accordance with one or more embodiments.

FIG. 22 is a flow diagram that depicts a procedure 2200 in an example implementation of a brush gesture 132 in accordance with one or more embodiments. Aspects of the procedure may be implemented in hardware, firmware, software, or a combination thereof. The procedure is shown as a set of blocks in this example that specify operations performed by one or more devices and are not necessarily limited to the orders shown for performing the operations by the respective blocks. In portions of the following discussion, reference will be made to the environment 100 of FIG. 1, the system 200 of FIG. 2, and the example implementation 2100 of FIG. 21.

A first input is recognized as selecting an object displayed by a display device (block 2202). For example, the image 2108 may be selected using a touch input, a stylus input, through use of a cursor control device, and so on. In the illustrated implementation, a finger of the user's hand 106 is illustrated as selecting the image 2108 to provide the touch input.

A second input is recognized as a line drawn outside the bounds of the object, the line recognized as being drawn while the object is selected (block 2204). For example, the second input may be a stylus input that describes one or more lines drawn outside the boundary of the image 2108 in a user interface.

A brush gesture is identified from the recognized first and second inputs, the brush gesture effective to cause a display of the line being drawn as a copy of a corresponding line of the object (block 2206). Continuing with the previous example, the gesture module 104 may identify the brush gesture from the inputs and therefore use the image 2108 that was selected via the first input as fill for the lines described by the second input. For instance, the brush gesture may be effective to cause a copy of a corresponding line of the object beginning at a point in the object selected by the first input (block 2208). As shown in the second stage 2104 of FIG. 21, the touch input may select a particular point 2110 which may be used as a starting point to provide fill for the lines drawn by the stylus beginning at a point 2112 that is outside the image 2108. Although indication of a starting point for fill to be used for the brush gesture 132 by the touch input was described, a variety of other implementations are also contemplated. For example, the fill point for each brush gesture 132 may be set at a predefined location in the image 2108, such as a top-left corner of the image 2108, center of the image 2108, and so on.

Additionally, the brush gesture may be effective to cause copying of a corresponding plurality of lines from the object as having a matching spatial relationship to a plurality of lines of the second input (block 2210). In this example, the lines described by the stylus input are taken from corresponding portions of the image and preserve a spatial relationship of the image 2108. Further, continued selection of the image 2108 may cause lines drawn elsewhere in the user interface displayed by the display device 108 to preserve this relationship until an input is received that this is no longer desired, such as by lifting a finger of the user's hand 106 away from the display device. Therefore, even if the stylus 116 is lifted from the display device 108 and placed elsewhere on the device 108 to draw additional lines, the fill used for those additional lines in this embodiment maintains the same spatial relation from the image 2108 as the previous set of lines. A variety of other examples are also contemplated, such as to begin the fill process again using the point 2110 indicated by the touch input as a starting point. Again, it should be noted that although a specific example was described in which the brush gesture 132 was input using touch and stylus inputs, those inputs may be switched, a single input type (e.g., touch or stylus) may be used to provide the inputs, and so on.

Carbon-Copy Gesture

Figure 23:
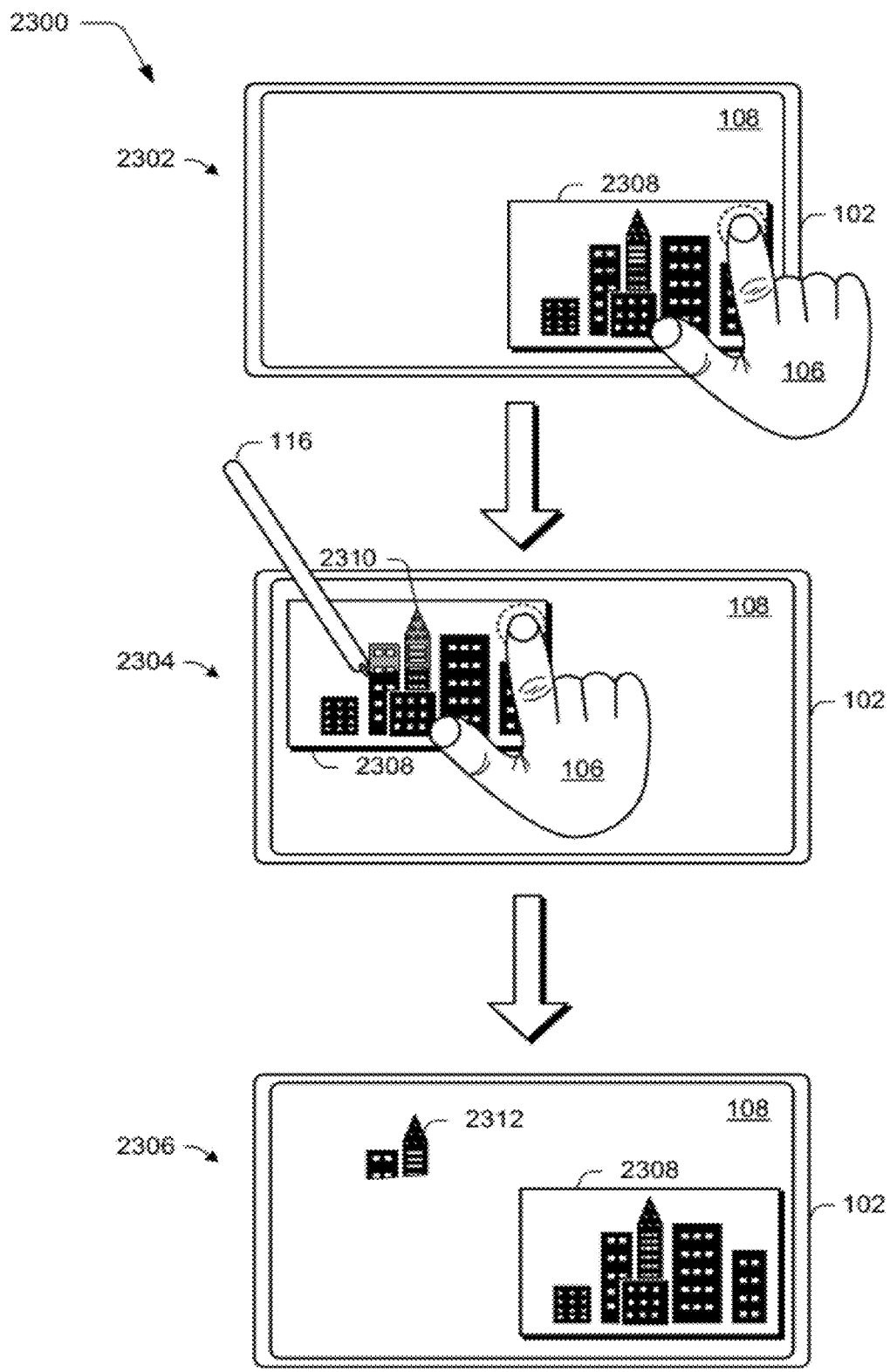
FIG. 23 is an illustration of an example implementation in which stages of a carbon-copy gesture of FIG. 1 are shown as being input through interaction with a computing device.

FIG. 23 is an illustration of an example implementation 2300 in which stages of the carbon-copy gesture 134 of FIG. 1 are shown as being input through interaction with the computing device 102. The carbon-copy gesture 134 is illustrated in FIG. 23 using first, second, and third stages 2302, 2304, 2306. In the first stage 2302, an image 2308 is displayed in a user interface by the display device 108 of the computing device 102. Like the image 2108 of FIG. 21, the image 2308 in this example is a photo of a city skyline having a plurality of buildings. The image 2308 is selected in the first stage 2302 using a touch input, e.g., a finger of the user's hand 106, and moved to a new location in the user interface as illustrated in the second stage 2304.

In the second stage 2304, the stylus 116 in this example is also illustrated as providing a stylus input that describes one or more lines that are "rubbed" by the stylus 116 within the borders of the image 2308. For example, the stylus 116 may make a series of zigzagging lines that begin at a location 2310 within the boundary of the image 2308 in the user interface, a single line above a threshold length may be used, and so on as previously described. The gesture module 104 may then identify these inputs (e.g., the selection and rubbing) as the carbon-copy gesture 134.

Upon identification of the carbon-copy gesture 134, the gesture module 104 may use a bitmap of the image 2308, texture of the image, and so on as fill for the lines drawn by the stylus 116. Additionally, these lines may be implemented to be drawn "through" the image 2308 such that the lines are displayed beneath the image 2308. Therefore, once the image 2308 is moved away as shown in the third stage 2306, a portion 2312 of the image 2308 that is copied to the user interface is shown, e.g., drawn on a background of the user interface. In an implementation, the overlying image may be displayed as semi-transparent state to allow a user to see both the overlying and underlying images. Thus, like the brush gesture 132, the carbon-copy gesture 134 may be used to copy portions of the image 2308 indicated by the lines drawn by the stylus 116. Likewise, the image 2308 may be used as fill for the portion 2312 in a variety of ways, such as use as a bitmap to make a "true" copy, use of one or more colors that may be user specified, and so on. Although this example implementation 2400 showed the carbon-copy gesture 134 as being implemented to "deposit" the portion 2312 onto a background of a user interface, the carbon-copy gesture 134 may also be implemented to "rub up" a portion of the image 2308, an example of which is shown in the next figure.

Figure 24:
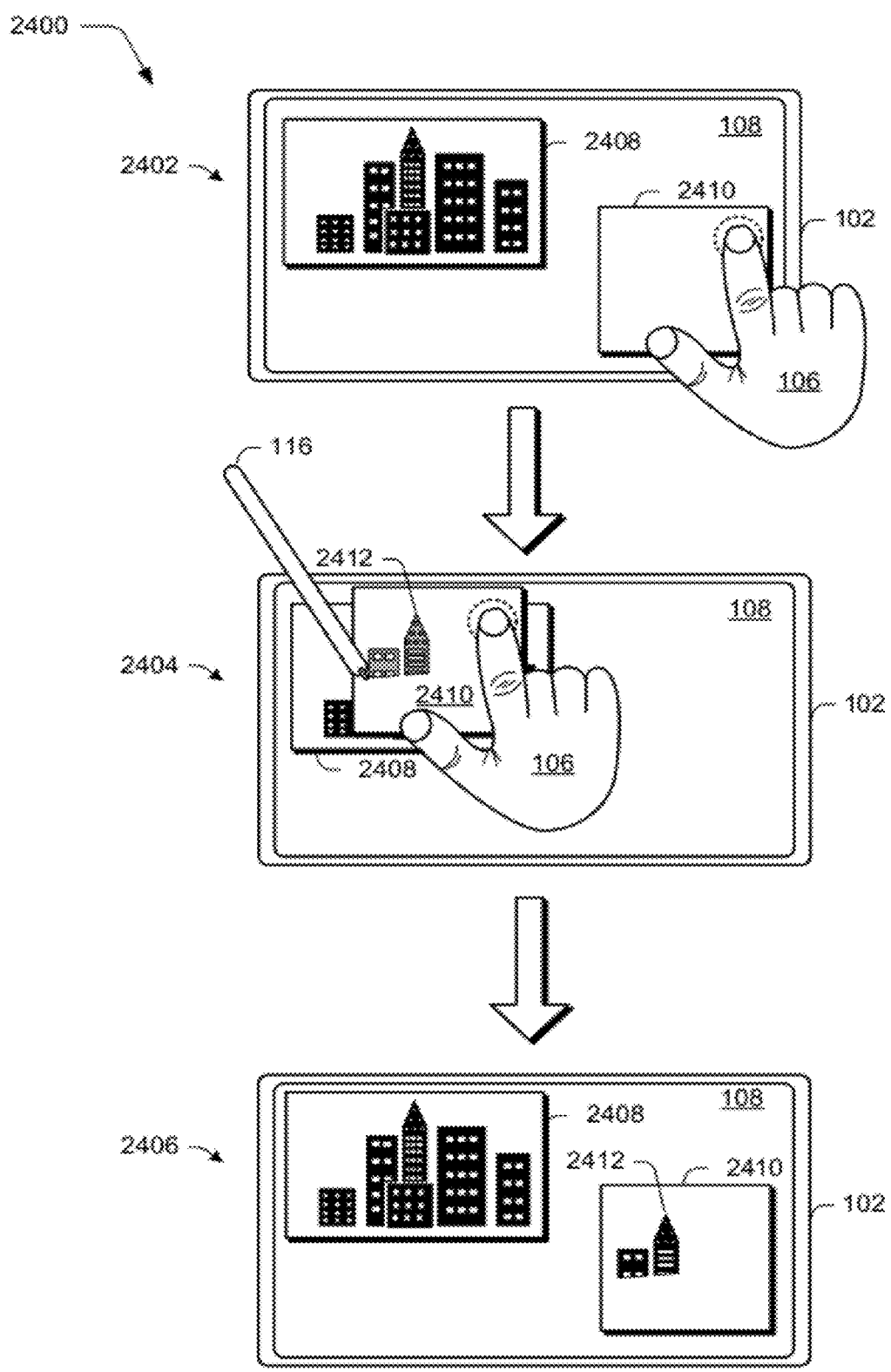
FIG. 24 is an illustration of an example implementation in which stages of a carbon-copy gesture of FIG. 1 are shown as being input in conjunction with the computing device.

FIG. 24 is an illustration of an example implementation 2400 in which stages of the carbon-copy gesture 134 of FIG. 1 are shown as being input in conjunction with the computing device 102. Like FIG. 23, the carbon-copy gesture 134 is illustrated in FIG. 24 using first, second, and third stages 2402, 2404, 2406. In the first stage 2402, an image 2408 is displayed in a user interface by the display device 108 of the computing device 102. Additionally, another object 2410 is also illustrated in the user interface, which in this instance is shown as a blank document for clarity of the discussion, although other objects are also contemplated. The object 2410 is selected in the first stage 2402 using a touch input, e.g., a finger of the user's hand 106, and moved to a new location in the user interface (as illustrated in the second stage 2404) as positioned over the image 2408, such as through use of a drag and drop gesture.

In the second stage 2404, the stylus 116 in this example is illustrated as providing a stylus input that describes one or more lines that are "rubbed" by the stylus 116 within the borders of the object 2410 and the image 2408. For example, the stylus 116 may make a series of zigzagging lines that begin at a location within the boundary of the object 2410 that is over the image 2408 in the user interface. The gesture module 104 may then identify these inputs (e.g., the selection, position of the object 2410 in relation to the image 2408, and rubbing) as the carbon-copy gesture 134.

Upon identification of the carbon-copy gesture 134, the gesture module 104 may use a bitmap of the image 2408 as fill for the lines drawn by the stylus 116. Additionally, these lines may be implemented to be "rubbed through" onto the object 2410 such that the lines are displayed as a portion 2412 within the object 2410. Therefore, once the object 2410 is moved away as shown in the third stage 2406, the portion 2412 of the image 2408 remains with the object 2410. Thus, like the brush gesture 132 in the previous example implementation 2300 of the carbon-copy gesture 134, the carbon copy gesture 134 of this example implementation 2400 may be used to copy portions of the image 2408 indicated by the lines drawn using a stylus 116. Likewise, the image 2408 may be used as fill for the portion 2412 in a variety of ways, such as use as a bitmap to make a "true" copy, use of one or more colors that may be user specified, and so on.

As previously described, although a specific implementation has been described using touch and stylus inputs, it should be readily apparent that a variety of other implementations are also contemplated. For example, the touch and stylus inputs may be switched to perform the carbon-copy gesture 134, the gesture may be performed using touch or stylus inputs alone, and so on.

Figure 25:
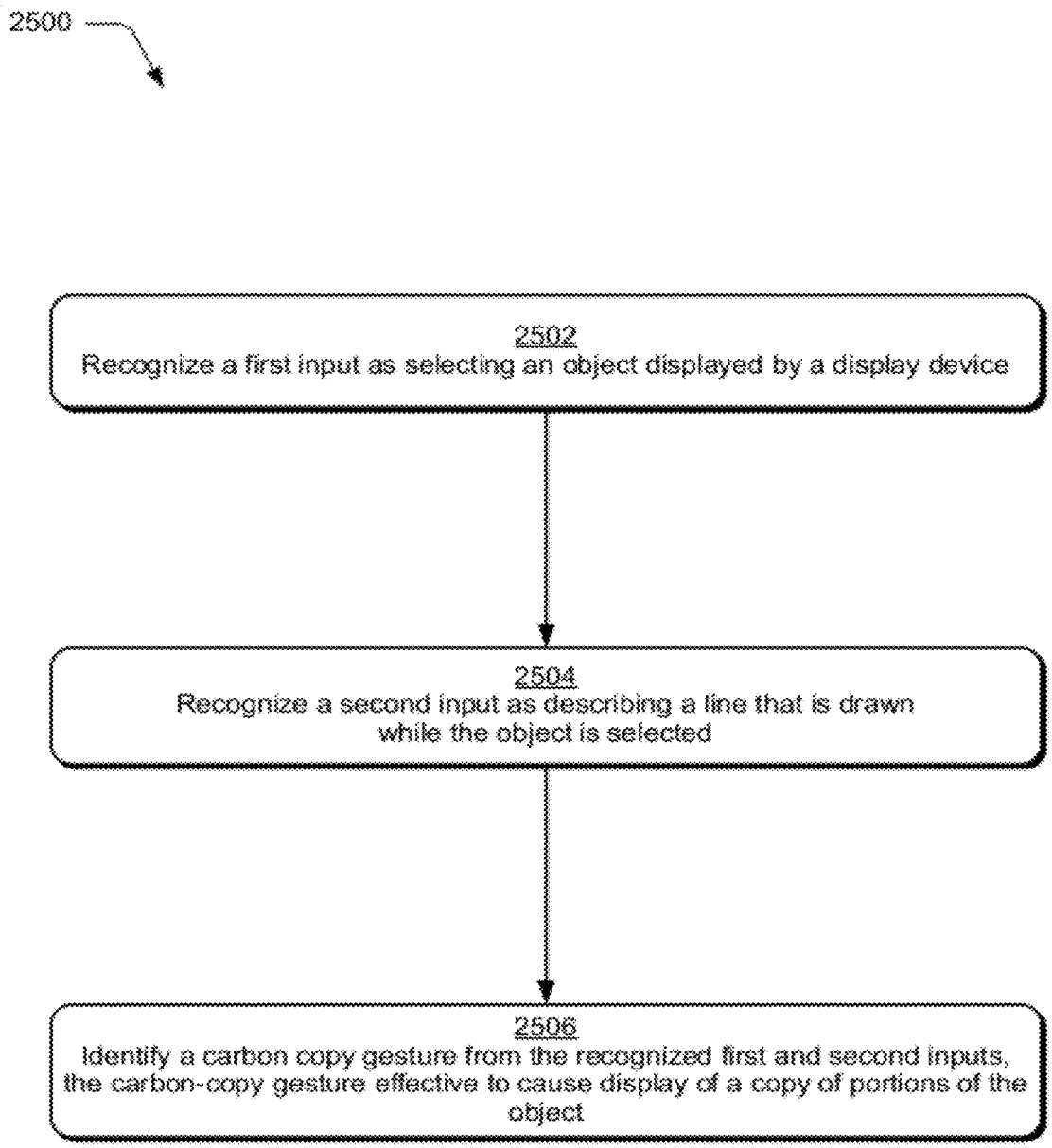
FIG. 25 is a flow diagram that depicts a procedure in an example implementation of a carbon-copy gesture in accordance with one or more embodiments.

FIG. 25 is a flow diagram that depicts a procedure 2500 in an example implementation of a carbon-copy gesture 134 in accordance with one or more embodiments. Aspects of the procedure may be implemented in hardware, firmware, software, or a combination thereof. The procedure is shown as a set of blocks in this example that specify operations performed by one or more devices and are not necessarily limited to the orders shown for performing the operations by the respective blocks. In portions of the following discussion, reference will be made to the environment 100 of FIG. 1, the system 200 of FIG. 2, and the example implementations 2300, 2400 of FIGS. 23 and 24, respectively.

A first input is recognized as selecting an object displayed by a display device (block 2502). For example, the image 2308 may be tapped by a finger of the user's hand 106, a stylus 116, through use of a cursor control device, and so on. In the illustrated implementation of FIG. 23, a finger of the user's hand 106 is illustrated as selecting the image 2408. In the illustrated implementation of FIG. 24, the image 2408 is selected through positioning of the object 2410 "over" the image 2408 using a touch input. A variety of other examples are also contemplated.

A second input is recognized as a line that is drawn while the object is selected (block 2504). The second input, for instance, may describe a line drawn outside the bounds of the object as shown in FIG. 23. In another instance, the second input may describe a line drawn within the bounds of the object as shown in FIG. 24.

A carbon-copy gesture is identified from the recognized first and second inputs, the carbon-copy gesture effect to cause display of a copy of portions of the object (block 2506). Continuing with the previous instances, the carbon copy gesture 134 may work to deposit portions of the object 2308 as shown in FIG. 23 or receive portions of the object 2408 onto another object 2410 as shown in FIG. 24. It should be noted that although a specific example was described in which the carbon-copy gesture 134 was input using touch and stylus inputs, those inputs may be switched, a single input type (e.g., touch or stylus) may be used to provide the inputs, and so on.

Fill Gesture

Figure 26:
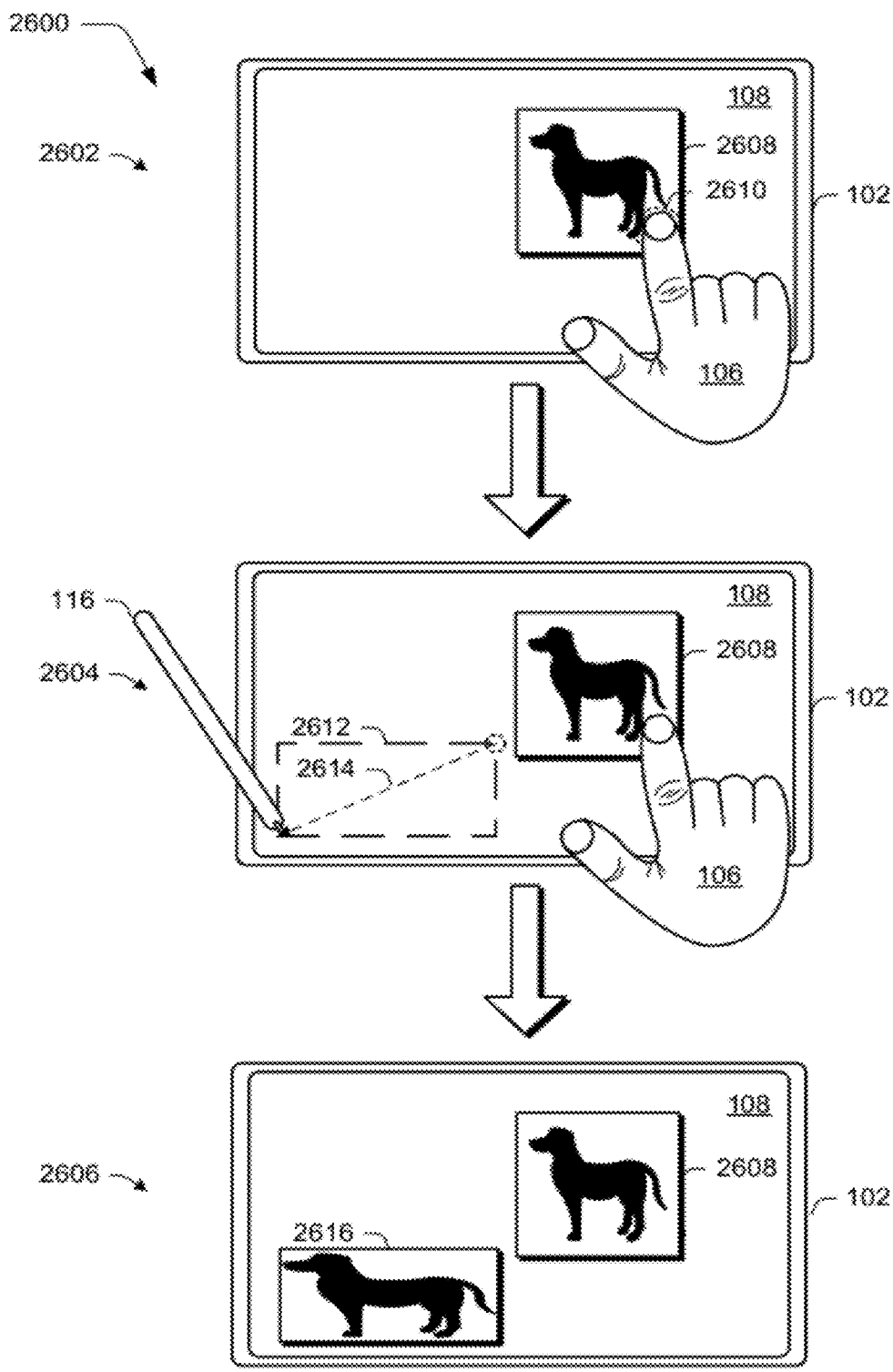
FIG. 26 is an illustration of an example implementation in which stages of a fill gesture of FIG. 1 are shown as being input in conjunction with the computing device.

FIG. 26 is an illustration of an example implementation 2600 in which stages of the fill gesture 136 of FIG. 1 are shown as being input in conjunction with the computing device 102. The fill gesture 136 is illustrated in FIG. 26 using first, second, and third stages 2602, 2604, 2606. In the first stage 2602, an image 2608 is displayed in a user interface by the display device 108 of the computing device 102, which may be performed by one or more of the ways previously or subsequently described.

In the second stage 2604, a frame 2612 is illustrated as being drawn using the stylus 116 having a rectangular shape that is defined through motion 2614 of the stylus 116. For example, the stylus 116 may be placed against the display device 108 and dragged to form the frame 2612. Although a frame 2612 having a rectangular shape is shown, a variety of different shapes may be employed as well as a variety of techniques employed to make them, e.g., circular, freehand, and so on.

The fill gesture 136 is then recognized from the inputs, an example of a result of which is shown in the third stage 2606. Upon identification of the fill gesture 136, the gesture module 104 may use the selected image 2608 to fill the frame 2612, thereby forming another image 2616. The fill may be provided in a variety of ways, such as stretched to fit the aspect ratio of the frame 2612 as illustrated in the third stage 2606, repeated in the original aspect ratio until the frame 2612 is filled, repeated in the original aspect ratio but cropped to fit, and so on. Although a specific implementation has been described using touch and stylus inputs, it should be readily apparent that a variety of other implementations are also contemplated. For example, the touch and stylus inputs may be switched to perform the fill gesture 136, the fill gesture 136 may be performed using touch or stylus inputs alone, and so on.

Figure 27:
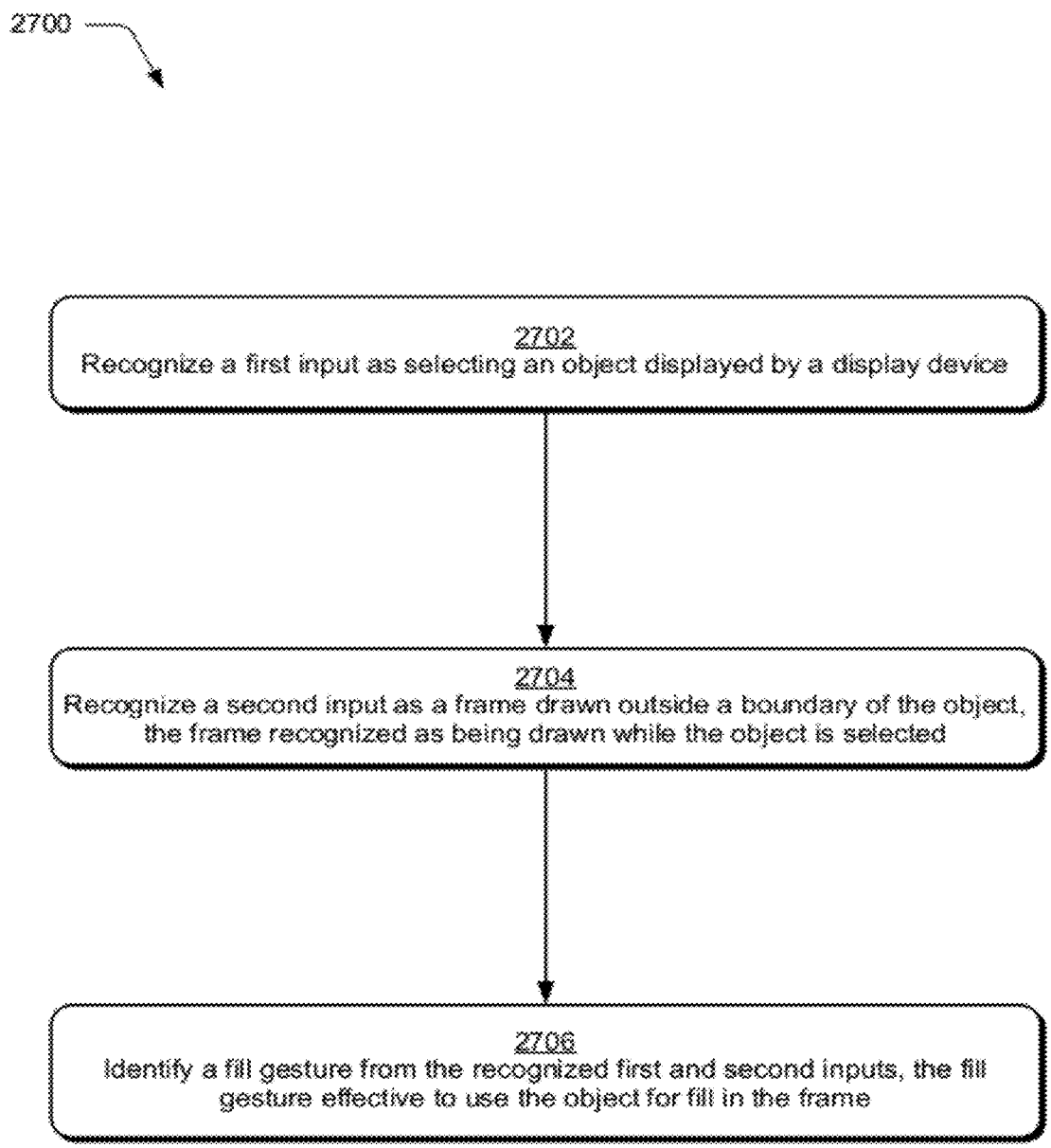
FIG. 27 is a flow diagram that depicts a procedure in an example implementation of a fill gesture in accordance with one or more embodiments.

FIG. 27 is a flow diagram that depicts a procedure 2700 in an example implementation of a fill gesture in accordance with one or more embodiments. Aspects of the procedure may be implemented in hardware, firmware, software, or a combination thereof. The procedure is shown as a set of blocks in this example that specify operations performed by one or more devices and are not necessarily limited to the orders shown for performing the operations by the respective blocks. In portions of the following discussion, reference will be made to the environment 100 of FIG. 1, the system 200 of FIG. 2, and the example implementation 2600 of FIG. 26.

A first input is recognized as selecting an object displayed by a display device (block 2702). A second input is recognized as a frame drawn outside a boundary of the object, the frame recognized as being drawn while the object is selected (block 2704). The frame may be drawn in a variety of ways, such as freehand using the stylus 116 or touch input to form a self-intersecting line, selection of a preconfigured frame, through drag-and-drop to specify a size for the frame, and so on.

A fill gesture is identified from the first and second inputs, the fill gesture effective to use the object for fill in the frame (block 2706). Upon identification of the fill gesture 136, the gesture module 104 may use the object selected using the first input to fill the frame recognized from the second input. The fill may be performed in a variety of ways, such as a stretch to fill an aspect ratio of the frame 2612, repetition of the image 2608 within the frame 2612, shrinking the image 2608, use of the image 2608 as a bitmap, and so on. Further, it should be noted that although a specific example was described in which the fill gesture 136 was input using touch and stylus inputs, those inputs may be switched, a single input type (e.g., touch or stylus) may be used to provide the inputs, and so on.

Cross-Reference Gesture

Figure 28:
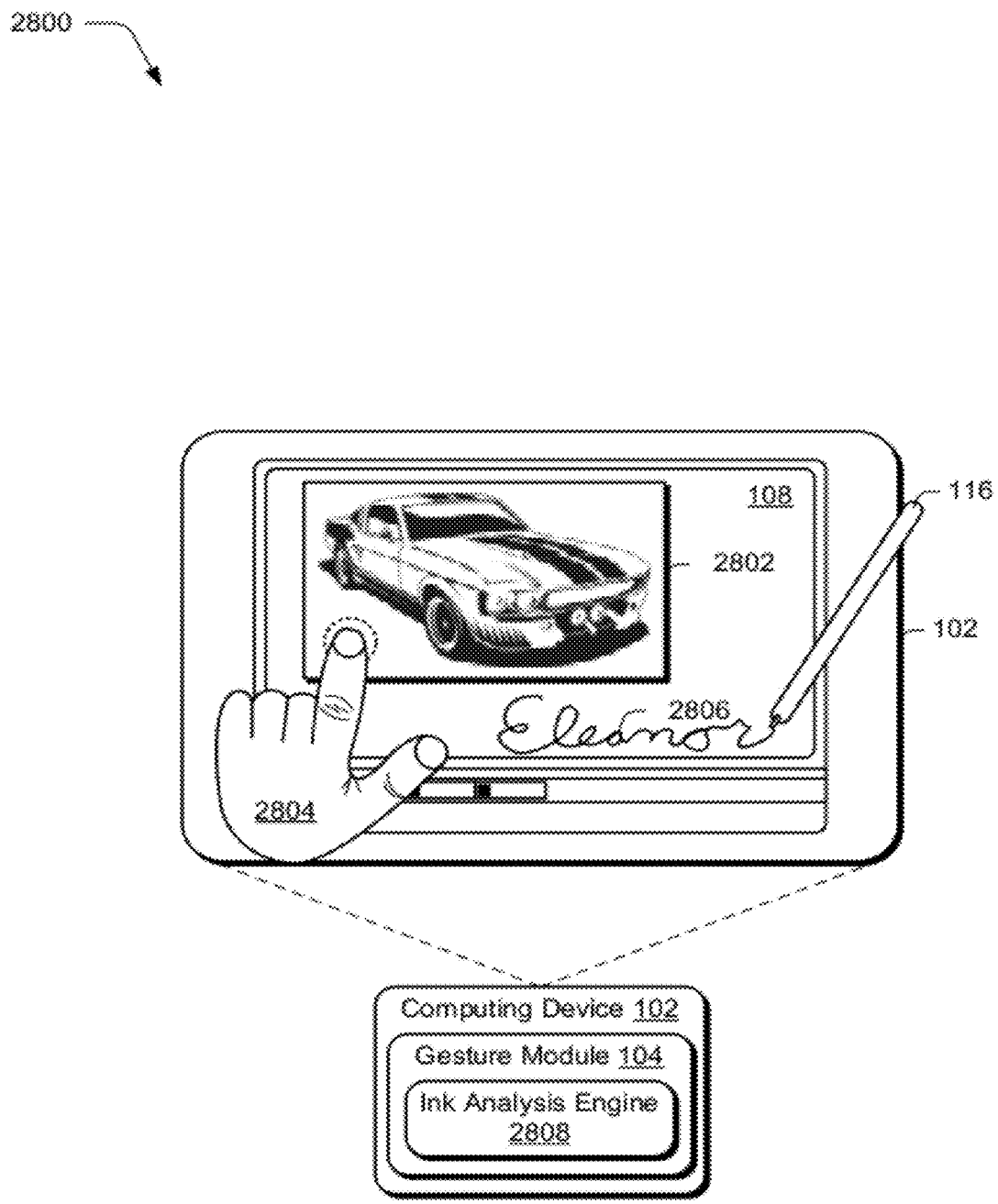
FIG. 28 is an illustration of an example implementation in which stages of a cross-reference gesture of FIG. 1 are shown as being input in conjunction with the computing device.

FIG. 28 is an illustration of an example implementation 2800 in which stages of the cross-reference gesture 138 of FIG. 1 are shown as being input in conjunction with the computing device 102. The cross-reference gesture 138 is illustrated in FIG. 28 as showing the computing device 102 of FIG. 1 in greater detail.

The display device 108 is illustrated as displaying an image 2802. A finger of a user's hand 2804 is also illustrated as selecting the image 2802, although as previously described a variety of different techniques may be used to select the image 2802.

While the image 2802 is selected (e.g., in a selected state), a stylus 116 is illustrated as providing a stylus input involving one or more lines 2806, which in this instance is illustrated as the word "Eleanor." The gesture module 104 may recognize the cross-reference gesture 138 from these inputs to provide a variety of functionality.

For example, the gesture module 104 may use the cross-reference gesture 138 to link the lines 2806 with the image 2802. Therefore, an operation that causes the image 2802 to be displayed may also cause the lines 2806 to be displayed in conjunction. In another example, the linking configures the lines 2806 to be selectable to navigate to the image 2802. For instance, selection of the lines 2806 may cause the image 2802 to be displayed, a portion of a document that contains the image 2802 (e.g., to jump to a page in the document that contains the image 2802), and so on. Likewise the cross-reference gesture may be used to group the objects, such that the objects move together during drag operations, or maintain the relative spatial relationships between image and annotations during document-reflow or other automatic or manual layout changes.

In a further example, the gesture module 104 may employ an ink analysis engine 2808 to identify "what is written" by the lines 2806, e.g., convert the lines to text. For instance, the ink analysis engine 2808 may be used to translate the lines 2806 to text that spells "Eleanor." Additionally, the ink analysis engine may be used to group separate lines to be converted to text, e.g., lines that form separate characters may be grouped together for translation. In an implementation, the one or more lines may provide a hint for parsing by the ink analysis engine 2808, such as a special symbol to indicate that the lines are to be converted to text.

Accordingly, the gesture module 104 through performance of the cross-reference gesture 138 may use this text in a variety of different ways. In an implementation, the text is used as a caption for the selected image 2802 and/or other metadata that may be associated with the image, such as to identify one or more persons in the image 2802, signify a location shown in the image 2802, and so on. This metadata (e.g., the text) that is linked to the image 2802 may be accessed and leveraged for search or other tasks, an example of which is shown in the following figure.

Figure 29:
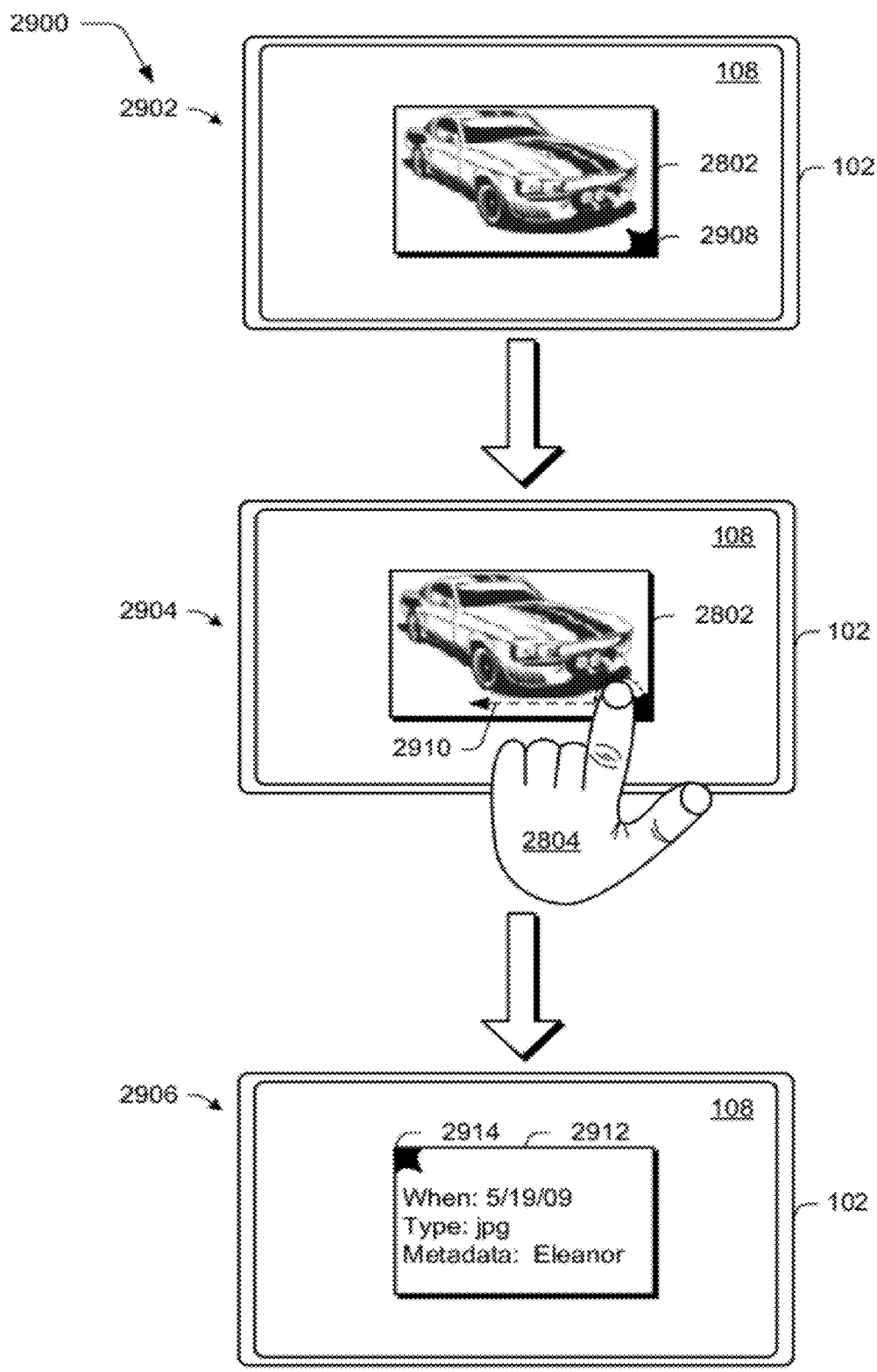
FIG. 29 is an illustration of an example implementation in which stages of a gesture are shown to access metadata associated with the image using the fill gesture of FIG. 28.

FIG. 29 is an illustration of an example implementation 2900 in which stages of a cross-reference gesture 138 are shown to access metadata associated with the image 2802 using the fill gesture 136 of FIG. 28. The gesture is illustrated in FIG. 29 using first, second, and third stages 2902, 2904, 2906. In the first stage 2902, the image 2802 of FIG. 28 is displayed in a user interface by the display device 108 of the computing device 102. The image 2802 optionally includes an indication 2908 that additional metadata is available for viewing that is associated with the image 2802.

In the second stage 2904, a finger of the user's hand 2804 is illustrated as selecting the indication 2908 and indicating movement 2910 similar to "flipping" the image 2802. In an implementation, upon identification of these inputs the gesture module 104 may provide an animation to give the appearance that the image 2802 is being "flipped over." Alternatively, metadata may be revealed through a context menu command associated with the item, e.g. a "Properties . . . " command.

In the third stage 2906, a result of the flip gesture is shown. In this example, a "back" 2912 of the image 2802 is displayed. The back 2912 includes a display of metadata associated with the image 2802, such as when the image 2802 was taken, a type for the image 2802, and the metadata input using the cross-reference gesture 138 of FIG. 28, which is "Eleanor" in this example. The back 2912 of the image 2802 also includes an indication 2914 that the back 2912 may be "flipped back" to return to the image 2802 shown in the first stage 2902. Although "flipping" of the image 2802 using a flip gesture was described in relation to FIG. 29, it should be readily apparent that a variety of different techniques may be used to access the metadata.

As previously described, although a specific implementation has been described using touch and/or stylus inputs in relation to FIGS. 28 and 29, it should be readily apparent that a variety of other implementations are also contemplated. For example, the touch and stylus inputs may be switched, the gesture may be performed using touch or stylus inputs alone, and so on.

Figure 30:
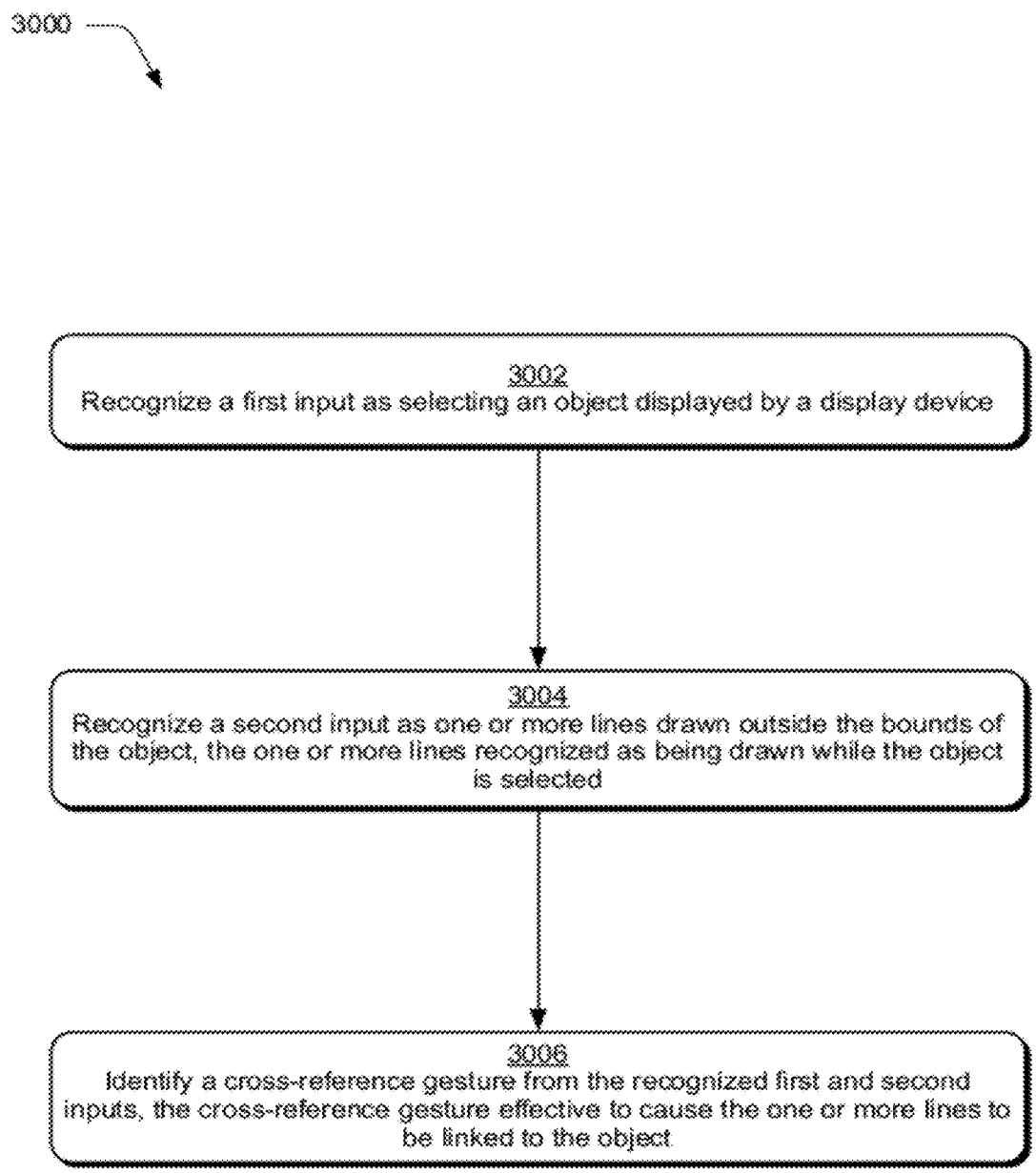
FIG. 30 is a flow diagram that depicts a procedure in an example implementation of the cross-reference gesture of FIG. 1 in accordance with one or more embodiments.

FIG. 30 is a flow diagram that depicts a procedure 3000 in an example implementation of the cross-reference gesture 138 of FIG. 1 in accordance with one or more embodiments. Aspects of the procedure may be implemented in hardware, firmware, software, or a combination thereof. The procedure is shown as a set of blocks in this example that specify operations performed by one or more devices and are not necessarily limited to the orders shown for performing the operations by the respective blocks. In portions of the following discussion, reference will be made to the environment 100 of FIG. 1, the system 200 of FIG. 2, and the example implementations 2800, 2900 of FIGS. 28 and 29, respectively.

A first input is recognized as selecting an object displayed by a display device (block 3002). For example, the image 2802 may be tapped by a finger of the user's hand 2804, a stylus 116, through use of a cursor control device, and so on. In the illustrated implementation, a finger of the user's hand 2804 is illustrated as selecting and holding the image 2802.

A second input is recognized as one or more lines drawn outside the bounds of the object, the one or more lines recognized as being drawn while the object is selected (block 3004). For example, the gesture module 104 may recognizes the lines 2806 as stylus inputs that were drawn by the stylus 116 while the image 2802 was selected. Additionally, it should be realized that the lines 2806 may be continuous and/or made up of segments without departing from the spirit and scope thereof.

A cross-reference gesture is identified from the recognized first and second inputs, the cross-reference gesture effective to cause the one or more lines to be linked to the object (block 3006). As previously described, the lines 2806 may be linked in a variety of ways. For example, the gesture module 104 may employ an ink analysis engine 2808 to translate the lines to text. The text may then be saved in conjunction with the image 2802, used as a link to the image 2802, displayed as a caption for the image 2802, and so on.

Again, it should be noted that although a specific example was described in which the cross-reference gesture 138 was input using touch and stylus inputs, those inputs may be switched, a single input type (e.g., touch or stylus) may be used to provide the inputs, and so on.

Link Gesture

Figure 31:
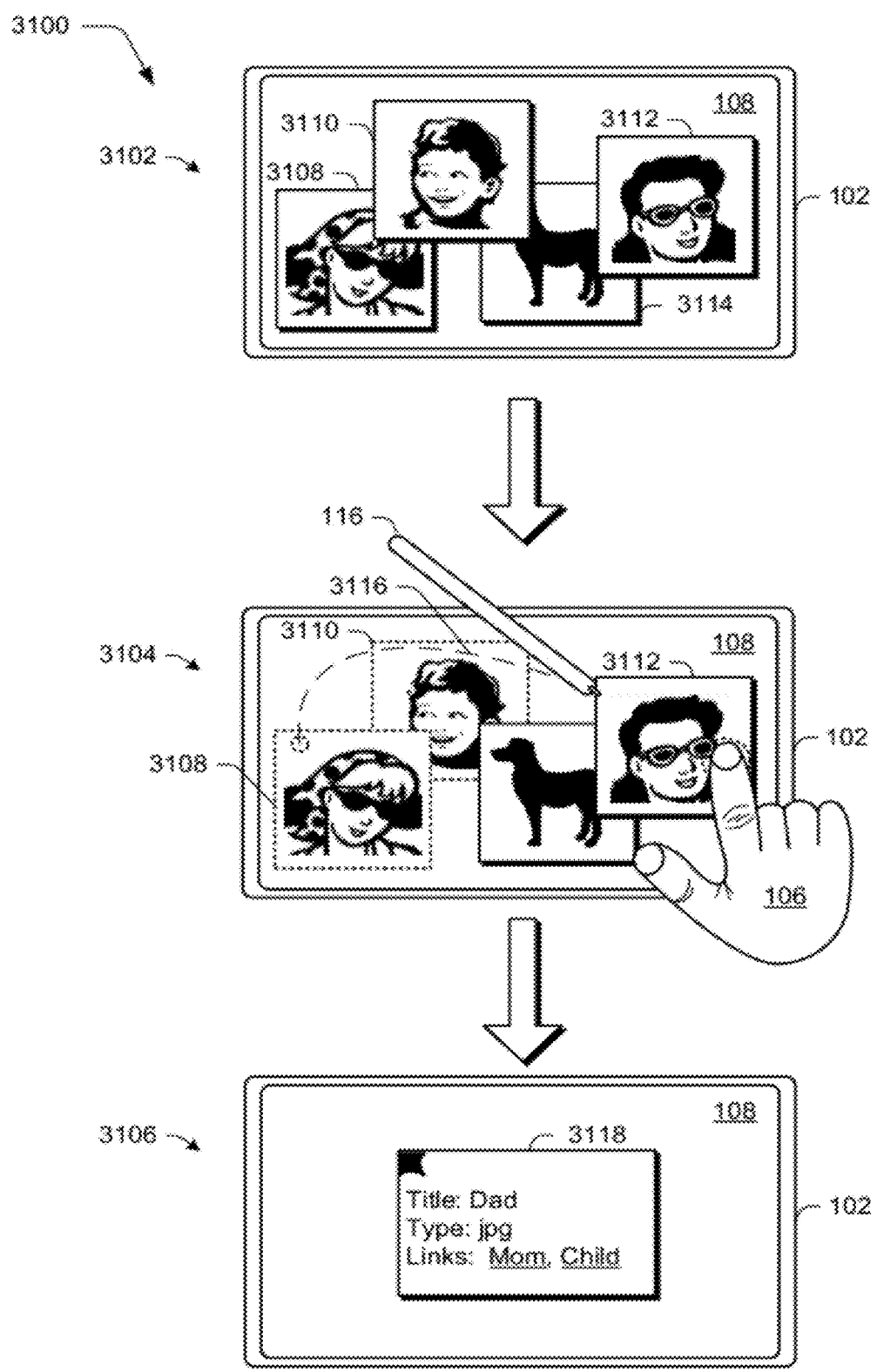
FIG. 31 is an illustration of an example implementation in which stages of a link gesture of FIG. 1 are shown as being input in conjunction with the computing device.

FIG. 31 is an illustration of an example implementation 3100 in which stages of the link gesture 140 of FIG. 1 are shown as being input in conjunction with the computing device 102. The link gesture 140 is illustrated in FIG. 31 using first, second, and third stages 3102, 3104, 3106. In the first stage 3102, the display device 108 of the computer 102 is illustrated as displaying first, second, third, and fourth images 3108, 3110, 3112, 3114.

In the second stage 3104, the third image 3112 is illustrated as being selected using a touch input, e.g., through use of a finger of the user's hand 106, although other implementations are also contemplated. A stylus 116 is illustrated as providing a stylus input that describes movement 3118 that begins within a boundary of the first image 3108, through the second image 3110, and ends at the third image 3112. For instance, the movement 3116 may involve placing the stylus 116 within the display of the first image 3108 and passing through the second image 3110 to the third image 3112, where the stylus 116 is lifted away from the display device 108. From these inputs, the gesture module 104 may recognize the link gesture 140.

The link gesture 140 may be used to provide a variety of different functionality. For example, the gesture module 104 may form links to be included with the third image 3112, an example of which is shown in the third stage 3106. In this stage, a back 3118 of the image 3112 is illustrated that includes a display of metadata associated with the image 3112, such as the title and type of the image. The metadata also includes links to the first and second images 3108, 3110, which are illustrated as the titles taken from the images of "Mom," and "Child." The links are selectable to navigate to the respective images, e.g., the link "Mom" is selectable to navigate to the first image 3108 and so on. Thus, the links may be formed using a simple gesture that does not involve manual input of text by a user. A variety of other functionality may also be made available via the link gesture 140, further discussion of which may be found in relation to FIGS. 32-33.

As previously described, although a specific implementation has been described using touch and stylus inputs, it should be readily apparent that a variety of other implementations are also contemplated. For example, the touch and stylus inputs may be switched to perform the link gesture 140, the gesture may be performed using touch or stylus inputs alone, and so on. Additionally, the linking may be performed in combinations with a variety of different inputs. For instance, a path may be drawn around multiple objects, e.g., using a stylus to circle a collection, to select the objects within the path. An icon (e.g., a group icon) may then be selected to link and/or group the objects together. A variety of other instances are also contemplated.

Figure 32:
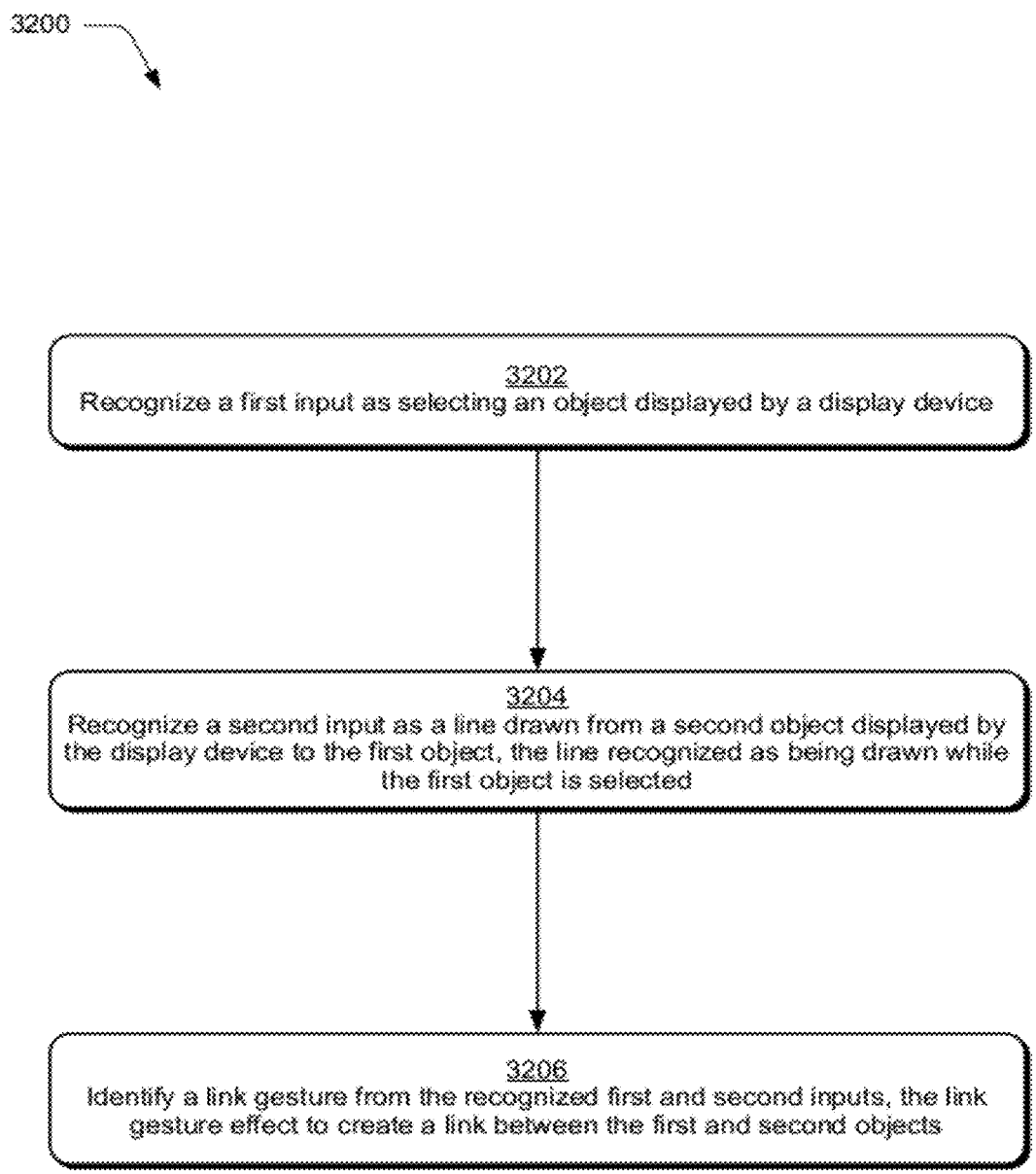
FIG. 32 is a flow diagram that depicts a procedure in an example implementation of a link gesture in accordance with one or more embodiments.

FIG. 32 is a flow diagram that depicts a procedure 3200 in an example implementation of a link gesture in accordance with one or more embodiments. Aspects of the procedure may be implemented in hardware, firmware, software, or a combination thereof. The procedure is shown as a set of blocks in this example that specify operations performed by one or more devices and are not necessarily limited to the orders shown for performing the operations by the respective blocks. In portions of the following discussion, reference will be made to the environment 100 of FIG. 1, the system 200 of FIG. 2, and the example implementation 3100 of FIG. 31.

A first input is recognized as selecting an object displayed by a display device (block 3202), such as through selection using one or more touch inputs, a stylus input, and so on. A second input is recognized as a line drawn from a second object displayed by the display device to the first object, the line recognized as being drawn while the first object is selected (block 3204). For example, the line may be recognized as movement 3116 of the stylus 116 from within a boundary of a second object (e.g., the second image 3112) to within a boundary of the object that is selected by the first input, e.g., the finger of the user's hand 106 in the second stage 3104 of FIG. 31. Intervening image 3110, or other objects passed over by the stylus, may either be considered as additional images that should also be linked together into a common set, or may be ignored as intermediary objects that are not the targets of the link gesture. The dynamics of the link gesture (e.g. inflection points, momentary pauses while dragging, velocity thresholds, and so on) may be used to decide between these cases, if desired.

A link gesture is identified from the recognized first and second inputs, the link gesture effective to create a link between the first and second objects (block 3206). The gesture module 104, for instance, may identify the link gesture 140 and form a link that involves the first object selected by the first input and the second object that was involved with the first object by the second input. The link may employ a variety of functionality, such as a hyperlink to navigate between the first and second objects, store the link (e.g., with the first or second objects) for later navigation, provide an indication of the existence of the link (e.g., through underlining of the first or second object), and so on. A variety of other links are also contemplated, an example of which may be found in relation to the following figure.

Figure 33:
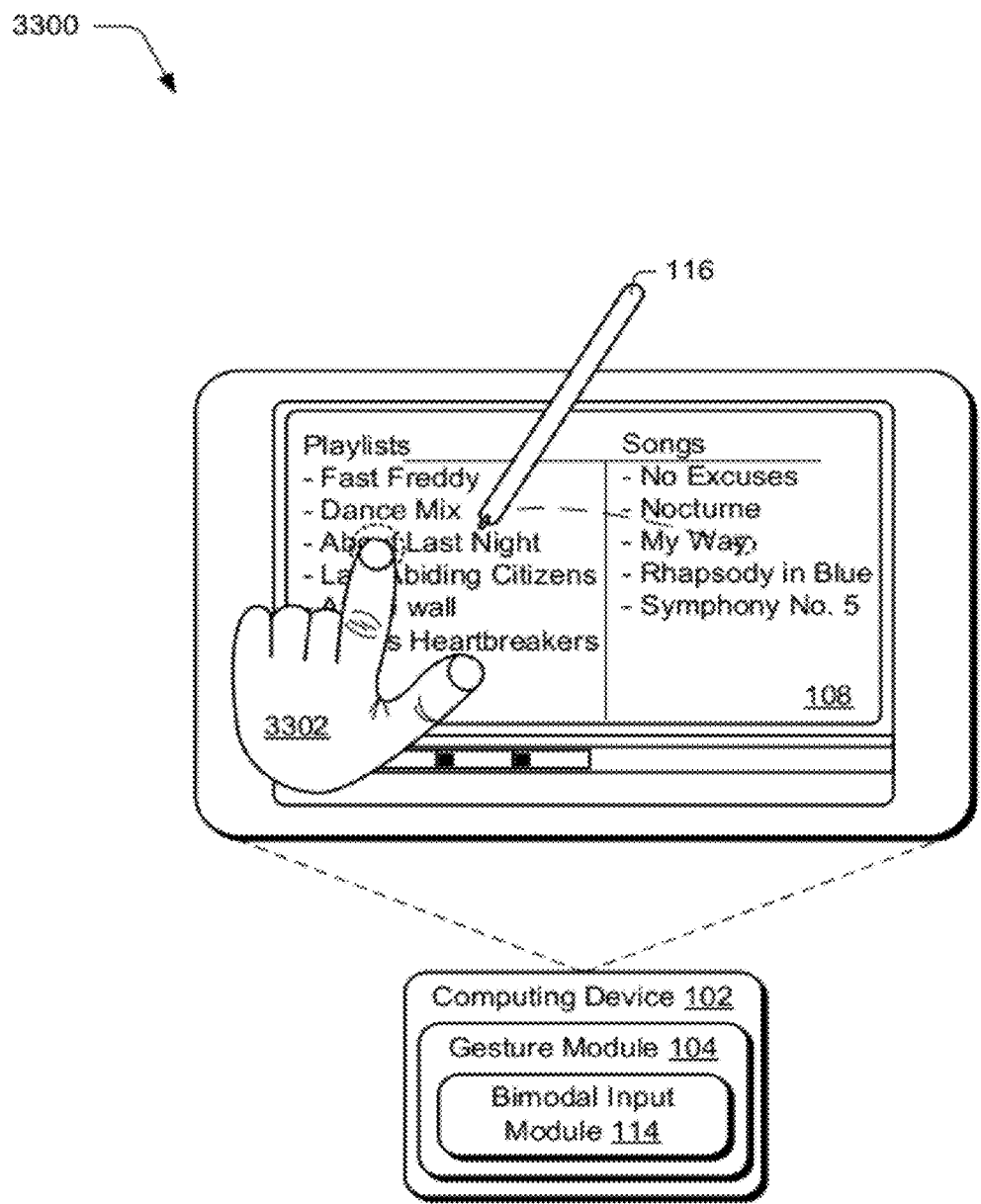
FIG. 33 is an illustration of an example implementation in which stages of the link gesture of FIG. 1 are shown as being input in conjunction with the computing device.

FIG. 33 is an illustration of another example implementation 3300 in which stages of the link gesture 140 of FIG. 1 are shown as being input in conjunction with the computing device 102. The computing device 102 is illustrated as outputting a user interface by a display device 108. The user interface includes a listing of playlists and a listing of songs.

A finger of the user's hand 3302 is illustrated as selecting a playlist "About Last Night" and the stylus 116 is illustrated as moved from the song "My Way" to the selected playlist. In this way, metadata associated with the second object (e.g., the song) is associated with the selected object (e.g., the playlist), which in this case causes the song to be added to the playlist. Thus, the gesture module 104 may identify the link gesture 140 from the inputs and cause a corresponding operation to be performed. Although formation of a playlist is described in this example, a variety of different metadata may be associated using the link gesture 140, such as to classify movies by type, rate objects, and so on.

Figure 34:
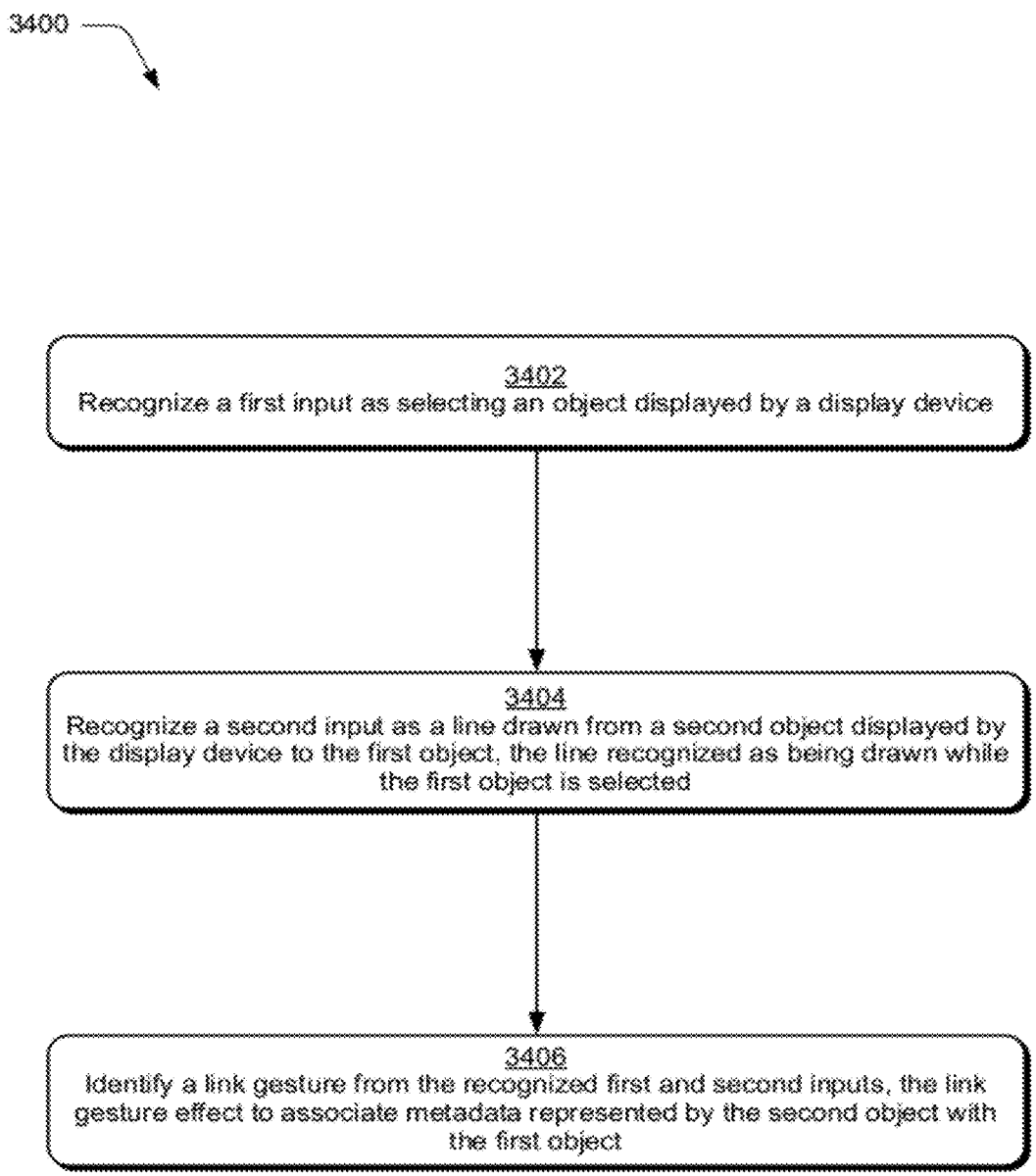
FIG. 34 is a flow diagram that depicts a procedure in an example implementation of a link gesture in accordance with one or more embodiments.

FIG. 34 is a flow diagram that depicts a procedure 3400 in an example implementation of a link gesture in accordance with one or more embodiments. Aspects of the procedure may be implemented in hardware, firmware, software, or a combination thereof. The procedure is shown as a set of blocks in this example that specify operations performed by one or more devices and are not necessarily limited to the orders shown for performing the operations by the respective blocks. In portions of the following discussion, reference will be made to the environment 100 of FIG. 1, the system 200 of FIG. 2, and the example implementation 3300 of FIG. 33.

A first input is recognized as selecting an object displayed by a display device (block 3402). A second input is recognized as a line drawn from a second object displayed by the display device to the first object, the line recognized as being drawn while the first object is selected (block 3404). For example, the line may be recognized as being drawn from a list of metadata to a song, a listing of places to an image, and so on.

A link gesture is identified from the recognized first and second inputs, the link gesture effect to associate metadata represented by the second object with the first object (block 3406). Continuing with the previous example, the link gesture 140 may be effective to cause the metadata to be stored as a part of the first object, e.g., so that the playlist includes the song, the image includes a name of a person, and so on.

Yet again, it should be noted that although a specific example was described in which the link gesture 140 was input using touch and stylus inputs in FIGS. 31-34, those inputs may be switched, a single input type (e.g., touch or stylus) may be used to provide the inputs, and so on.

Contextual Spatial Multiplexing

Figure 35:
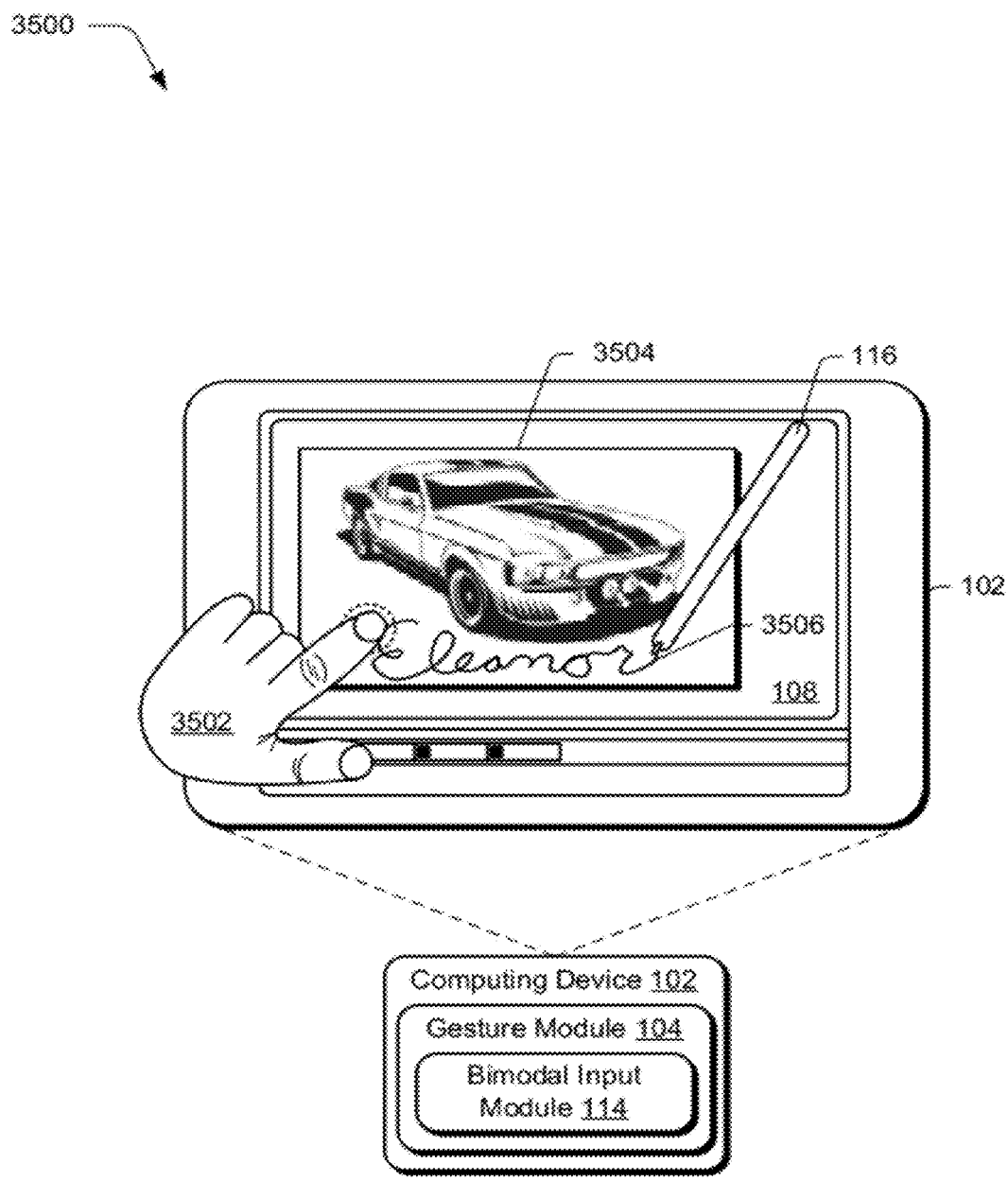
FIG. 35 depicts an example implementation showing techniques for contextual spatial multiplexing.

FIG. 35 depicts an example implementation 3500 showing techniques for contextual spatial multiplexing. In instances of the previous example implementations, different types of inputs (e.g., stylus inputs versus touch inputs) were used to specify different gestures. For example, the bimodal input module 114 may be used to distinguish between the types of inputs to identify gestures, such as one or more of the gestures previously described in relation to FIG. 1 and subsequent sections.

These techniques may also be leveraged for contextual spatial multiplexing. Contextual spatial multiplexing describes techniques in which specific areas of a user interface take on different functions for stylus or touch inputs. For example, the finger of the user's hand 3502 is illustrated as selecting the image 3504 at an initial point of the user interface. Additionally, the stylus 116 is illustrated as writing the word "Eleanor" 3506 which also began at the initial point in the user interface. Thus, the bimodal input module 114 may distinguish between the types of inputs (e.g., touch versus stylus inputs) to provide different functionality at the same point in the user interface.

In an implementation, primitives of touch (e.g., tap, hold, two-finger hold, drag, cross, pinch, and other hand or finger postures) and stylus (e.g., tap, hold, drag-off, drag-into, cross, stroke) can be composed by the bimodal input module 114 to create a larger possible space of intuitive and semantically rich gestures than either stylus or touch alone. For instance, direct touch mode switching may integrate mode activation, selection of object, and phrasing of subtasks into a single object-specific mode, e.g., to define a gesture as described above.

Additionally, the techniques may be composed, such as to arrive at different gestures. For example, selecting an object along with the phrasing of subtasks together afford composing of multiple tools and effects together. As previously described for the edge gesture 128 of FIGS. 14-18, for instance, drawing and cutting using an edge of an object were described. In other instances, a priority may be assigned to the gestures by the gesture module to avoid potential ambiguities, e.g. cut takes precedence on edge gesture 128 that overlaps an item, rather than the brush gesture 132. Thus, in these implementations the stylus writes (or cuts) and touch manipulates, while the combination of stylus plus touch yields new techniques. But in some contexts other divisions between stylus and touch are possible, and indeed consistent with user expectations.

For example, the user interface displayed by the display device 108 of the computing device 102 may react differently depending on the area of the object that is engaged, and the context of surrounding objects and the page (background). For example, ink notations on the user interface may be ignored for some touch inputs (e.g. selection, direct manipulation) to make it easier to perform two-finger zooming on the page, as well as to avoid accidental disruption of stylus inputs, such as ink strokes. The size of objects also may be considered, e.g. objects that are over a threshold size may be directly manipulated via touch inputs. A variety of other implementations are also contemplated, further discussion of which may be found in relation to the following figure.

Figure 36:
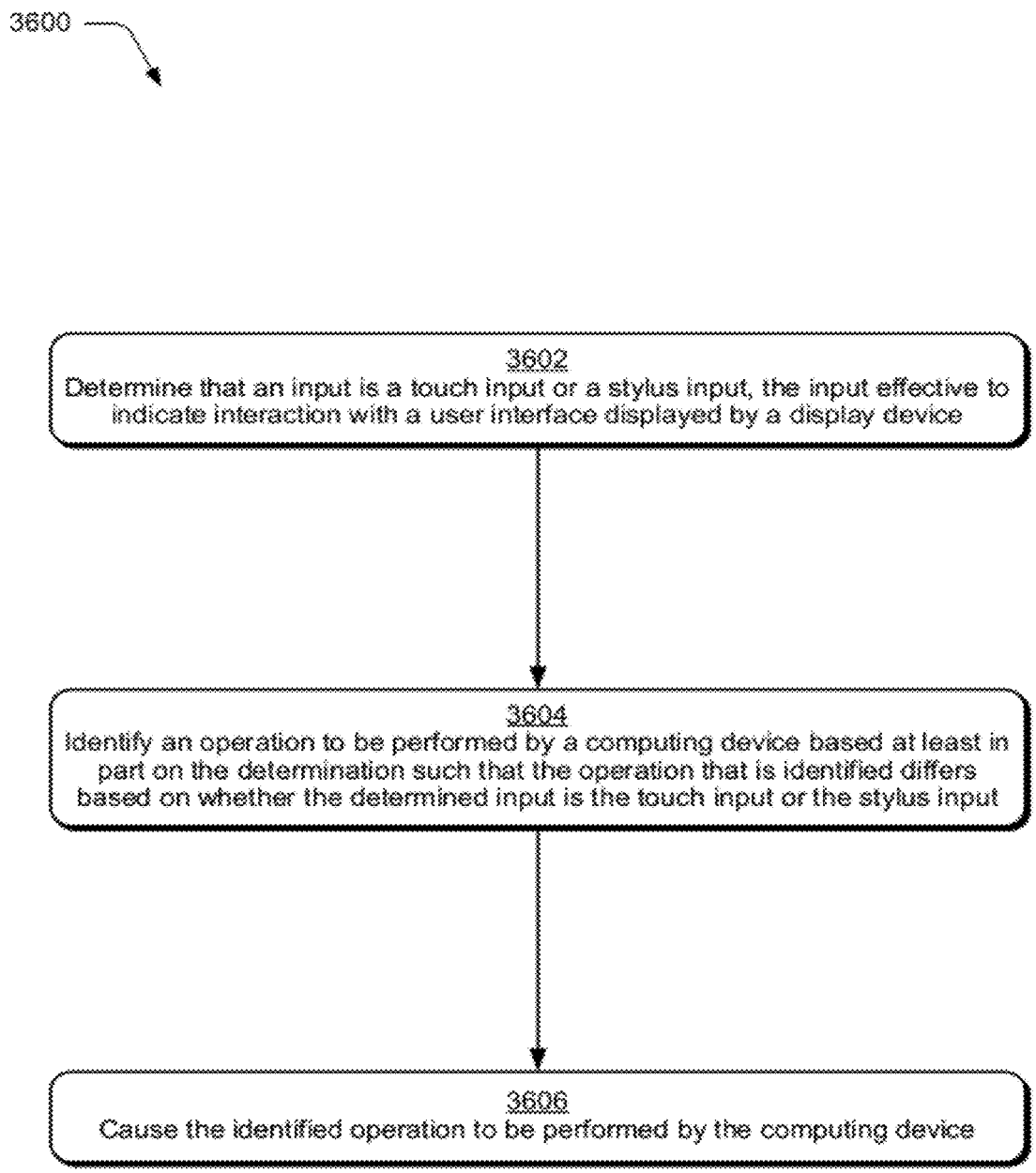
FIG. 36 is a flow diagram that depicts a procedure in an example implementation in which identification of whether an input is a stylus or touch input is used to identify an operation to be performed in conjunction with a user interface.

FIG. 36 is a flow diagram that depicts a procedure 3600 in an example implementation in which identification of whether an input is a stylus or touch input is used to identify an operation to be performed in conjunction with a user interface. Aspects of the procedure may be implemented in hardware, firmware, software, or a combination thereof. The procedure is shown as a set of blocks in this example that specify operations performed by one or more devices and are not necessarily limited to the orders shown for performing the operations by the respective blocks. In portions of the following discussion, reference will be made to the environment 100 of FIG. 1, the system 200 of FIG. 2, and the example implementation 3500 of FIG. 35.

A determination is made as to whether an input is a touch input or a stylus input, the input effective to indicate interaction with a user interface displayed by a display device (block 3602). For example, the gesture module 104 may detect the input using a variety of functionality, such as a touchscreen, cameras (e.g., cameras included along with a plurality of pixels of the display device), and so on. The gesture module 104 may then make a determination as to whether the input is a touch input (e.g., entered using one or more fingers of a user's hand) or a stylus input (e.g., entered using a pointed input device). This determination may be performed in a variety of ways, such as by detecting the stylus 116 using one or more sensors, based on an amount of the display device 108 that is contacted using the stylus versus touch, use of image recognition, and so on.

An operation is identified to be performed by a computing device based at least in part on the determination such that the operation that is identified differs based on whether the determined input is the touch input or the stylus input (block 3604). The identified operation is caused to be performed by the computing device (block 3606). As shown in FIG. 35, for example, the stylus input from the stylus 116 is used the write whereas the touch input from the finger of the user's hand 3502 may be used to select and move the image 3504 from the same point within the user interface. A variety of other examples are also contemplated, such as based on configuration of an object at which the interaction is directed. For instance, the gesture module 104 may be configured to make distinctions on whether the object is an image, represents a song, pertains to a document, size of the object, and so on to enable different operations to be performed based on the underlying and/or nearby objects. As another example, dragging a pen from a color pot may leave a pen stroke, whereas dragging a finger from a color pot may leave a smudge or finger paint stroke. Selecting a color pot with the pen, and then stroking with a finger; or conversely selecting a color pot with a finger, and then stroking the pen, may also imply different commands or parameters to commands (e.g. brush style, opacity, and so forth). Further discussion of such distinctions may be found in relation to the following figure.

Figure 37:
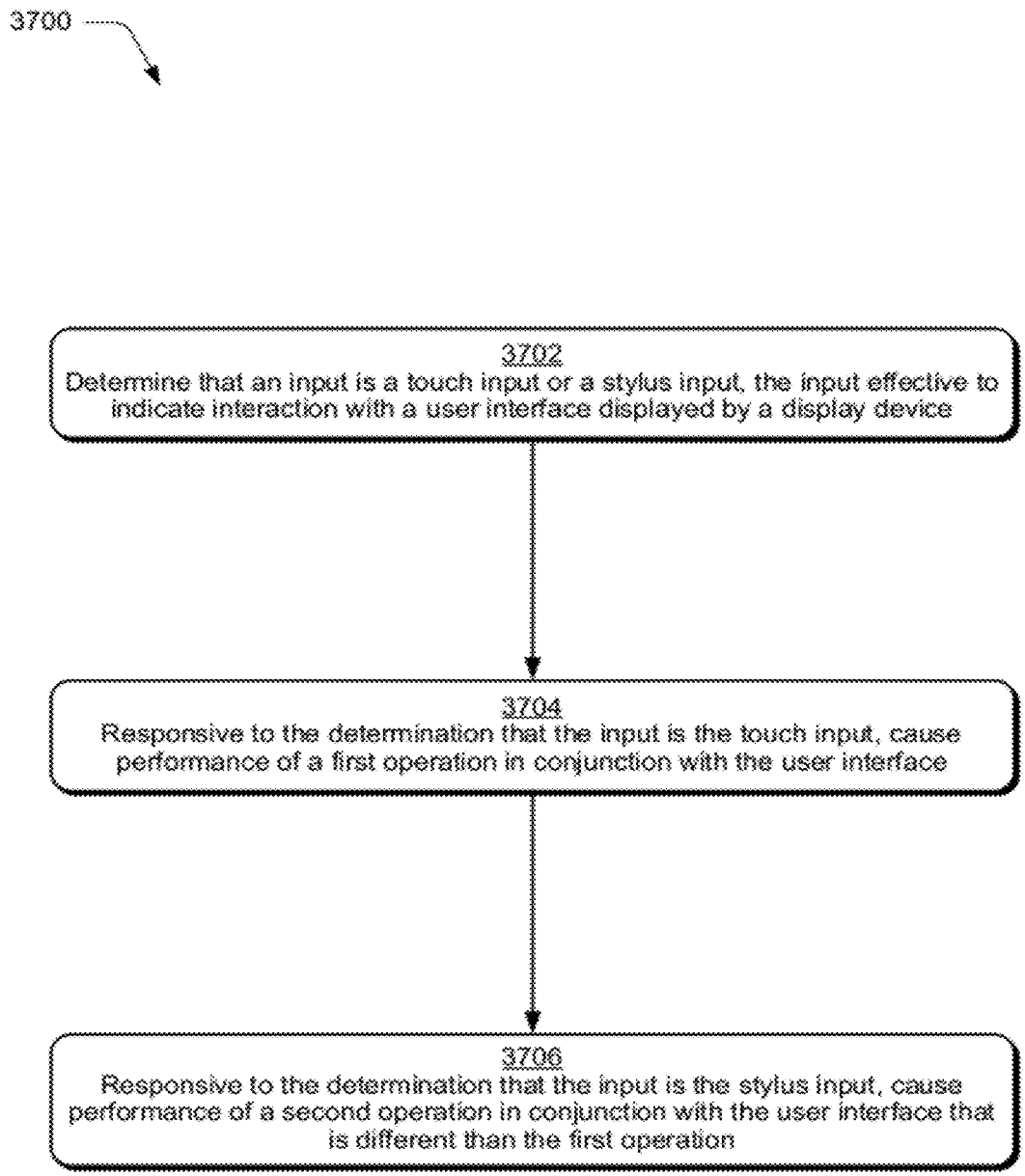
FIG. 37 is a flow diagram that depicts another procedure in an example implementation in which identification of whether an input is a stylus or touch input is used to identify an operation to be performed in conjunction with a user interface.

FIG. 37 is a flow diagram that depicts another procedure 3700 in an example implementation in which identification of whether an input is a stylus or touch input is used to identify an operation to be performed in conjunction with a user interface. Aspects of the procedure may be implemented in hardware, firmware, software, or a combination thereof. The procedure is shown as a set of blocks in this example that specify operations performed by one or more devices and are not necessarily limited to the orders shown for performing the operations by the respective blocks. In portions of the following discussion, reference will be made to the environment 100 of FIG. 1, the system 200 of FIG. 2, and the example implementation 3500 of FIG. 35.

A determination is made that an input is a touch input or a stylus input, the input effective to indicate interaction with a user interface displayed by a display device (block 3702). This determination may be performed in a variety of ways as previously and subsequently described. Responsive to the determination that the input is the touch input, a first operation is caused to be performed in conjunction with the user interface (block 3704). For example, the operation may involve moving an underlying object, e.g., the image 3504 of FIG. 35.

Responsive to the determination that the input is the stylus input, a second operation is caused to be performed in conjunction with the user interface that is different than the first operation (block 3706). Continuing with the previous example, the stylus input provided by the stylus 116 may be used to write on the image 3504 as opposed to moving it. Additionally, it should be readily apparent that a variety of other considerations may also be employed by the gesture module 104, such as proximity to other objects, "where" in the user interface the interaction involving the input is to occur, and so on.

Example Device

Figure 38:
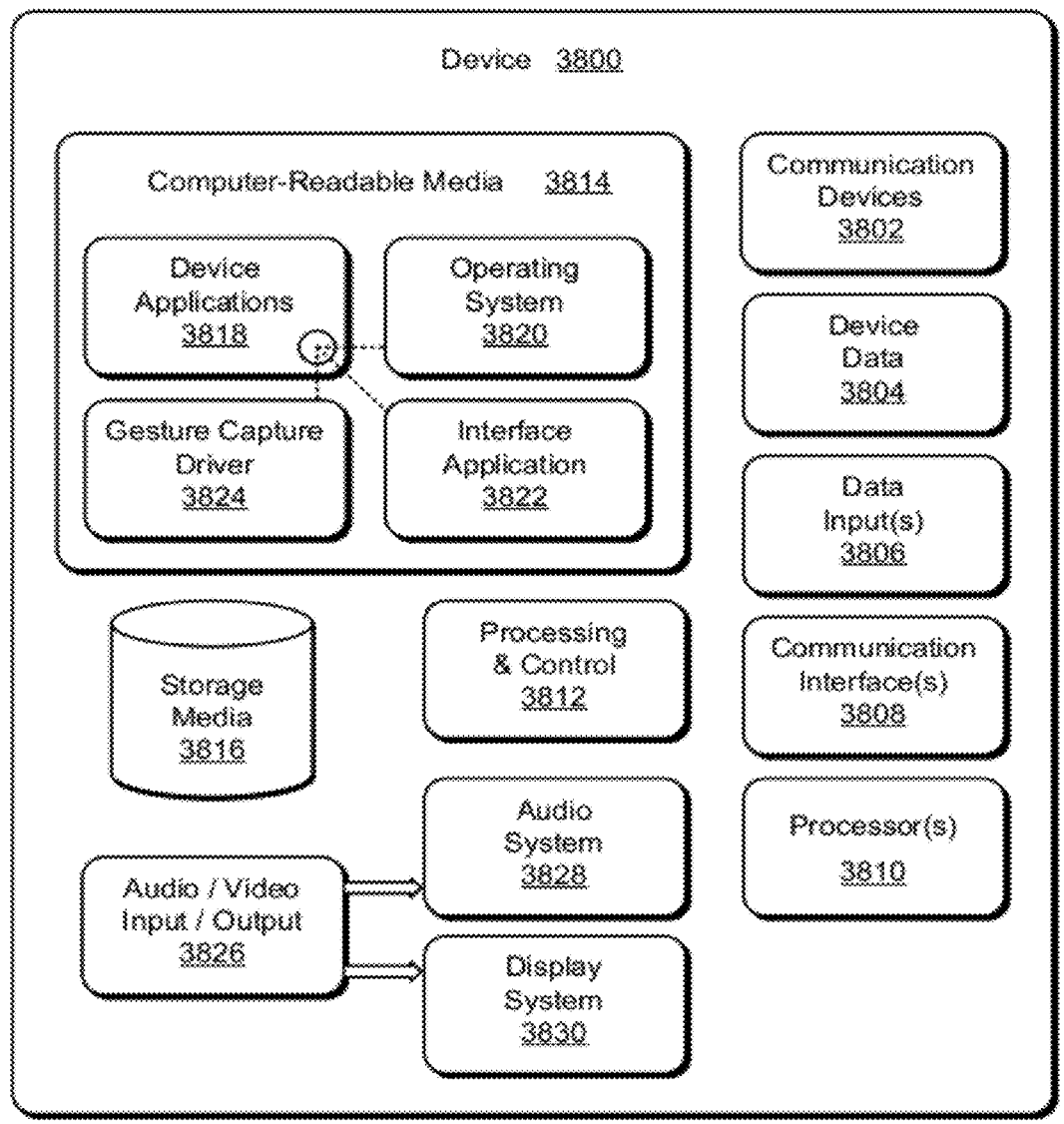
FIG. 38 illustrates various components of an example device that can be implemented as any type of portable and/or computer device as described with reference to FIGS. 1-37 to implement embodiments of the gesture techniques described herein.

FIG. 38 illustrates various components of an example device 3800 that can be implemented as any type of portable and/or computer device as described with reference to FIGS. 1 and 2 to implement embodiments of the gesture techniques described herein. Device 3800 includes communication devices 3802 that enable wired and/or wireless communication of device data 3804 (e.g., received data, data that is being received, data scheduled for broadcast, data packets of the data, etc.). The device data 3804 or other device content can include configuration settings of the device, media content stored on the device, and/or information associated with a user of the device. Media content stored on device 3800 can include any type of audio, video, and/or image data. Device 3800 includes one or more data inputs 3806 via which any type of data, media content, and/or inputs can be received, such as user-selectable inputs, messages, music, television media content, recorded video content, and any other type of audio, video, and/or image data received from any content and/or data source.

Device 3800 also includes communication interfaces 3808 that can be implemented as any one or more o\f a serial and/or parallel interface, a wireless interface, any type of network interface, a modem, and as any other type of communication interface. The communication interfaces 3808 provide a connection and/or communication links between device 3800 and a communication network by which other electronic, computing, and communication devices communicate data with device 3800.

Device 3800 includes one or more processors 3810 (e.g., any of microprocessors, controllers, and the like) which process various computer-executable instructions to control the operation of device 3800 and to implement embodiments of a touch pull-in gesture. Alternatively or in addition, device 3800 can be implemented with any one or combination of hardware, firmware, or fixed logic circuitry that is implemented in connection with processing and control circuits which are generally identified at 3812. Although not shown, device 3800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 3800 also includes computer-readable media 3814, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 3800 can also include a mass storage media device 3816.

Computer-readable media 3814 provides data storage mechanisms to store the device data 3804, as well as various device applications 3818 and any other types of information and/or data related to operational aspects of device 3800. For example, an operating system 3820 can be maintained as a computer application with the computer-readable media 3814 and executed on processors 3810. The device applications 3818 can include a device manager (e.g., a control application, software application, signal processing and control module, code that is native to a particular device, a hardware abstraction layer for a particular device, etc.). The device applications 3818 also include any system components or modules to implement embodiments of the gesture techniques described herein. In this example, the device applications 3818 include an interface application 3822 and a gesture-capture driver 3824 that are shown as software modules and/or computer applications. The gesture-capture driver 3824 is representative of software that is used to provide an interface with a device configured to capture a gesture, such as a touchscreen, track pad, camera, and so on. Alternatively or in addition, the interface application 3822 and the gesture-capture driver 3824 can be implemented as hardware, software, firmware, or any combination thereof. Additionally, the gesture-capture driver 3824 may be configured to support multiple input devices, such as separate devices to capture touch and stylus inputs, respectively. For example, the device may be configured to include dual display devices, in which one of the display device is configured to capture touch inputs while the other stylus inputs.

Device 3800 also includes an audio and/or video input-output system 3826 that provides audio data to an audio system 3828 and/or provides video data to a display system 3830. The audio system 3828 and/or the display system 3830 can include any devices that process, display, and/or otherwise render audio, video, and image data. Video signals and audio signals can be communicated from device 3800 to an audio device and/or to a display device via an RF (radio frequency) link, S-video link, composite video link, component video link, DVI (digital video interface), analog audio connection, or other similar communication link. In an embodiment, the audio system 3828 and/or the display system 3830 are implemented as external components to device 3800. Alternatively, the audio system 3828 and/or the display system 3830 are implemented as integrated components of example device 3800.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method performed on a computing device, the method comprising:
   recognizing, by the computing device, a first user input as selecting and holding an object displayed at a first location on a touch screen, the first user input being recognized as a first touch input;
   recognizing, by the computing device, a second user input as drawing an empty frame at a second location on the touch screen, where the second location is separate and distinct from the first location, the empty frame recognized as being drawn while the object is being selected and held via the first user input, the second user input being recognized as a second touch input that defines at least two points of the empty frame, where the first touch input and the second touch input are each provided by a finger or a stylus; and detecting, by the computing device, a fill gesture from the recognized first and second user inputs, the fill gesture effective to use the object selected via the first user input to fill the empty frame defined via the second user input so as to generate and display on the touch screen a filled frame that comprises a version of the selected object within the filled frame at the second location while the selected object remains displayed at the first location.

2. A method as described in claim 1, wherein the first user input is recognized as selecting two points of the selected object.

3. A method as described in claim 1, wherein the version of the selected object is stretched to fill an aspect ratio of the empty frame.

4. A method as described in claim 1, wherein the version of the selected object is a copy of the selected object.

5. A method as described in claim 1, wherein the version of the selected object is shrunk to fit in the empty frame.

6. A method as recited in claim 1, further comprising distinguishing between the touch inputs made by fingers and the stylus inputs.

7. A method as recited in claim 1, wherein the empty frame is drawn by forming a self-intersecting line by dragging the second touch input from a first corner of the empty frame to a second corner of the empty frame that opposes the first corner.

8. A computing device comprising:
one or more modules implemented at least partially in hardware, the one or more modules configured to perform operations comprising:
recognizing, by the computing device, a first user input as selecting and holding an object displayed at a first location on a touch screen, the first user input being recognized as a first touch input;
recognizing, by the computing device, a second user input as drawing an empty frame at a second location on the display device, where the second location is separate and distinct from the first location, the second user input being recognized as a second touch input that defines at least two points of the empty frame, where the first touch input and the second touch input are each provided by a finger or a stylus, the empty frame recognized as being drawn while the object is being selected and held via the first user input; and
detecting, by the computing device, a fill gesture from the recognized first and second user inputs, the fill gesture effective to use the object selected via the first user input to fill the empty frame defined via the second user input so as to generate and display on the touch screen a filled frame that comprises a version of the selected object within the filled frame at the second location while the selected object remains displayed at the first location.

9. A computing device as described in claim 8, wherein the first user input is recognized as selecting two points of the selected object.

10. A computing device as described in claim 8, wherein the version of the selected object is shrunk to fit in the empty frame or is a copy of the selected object.

11. A computing device as described in claim 8, wherein the version of the selected object is stretched to fill an aspect ratio of the empty frame.

12. A computing device as described in claim 8, wherein the empty frame is drawn via a drag-and-drop gesture to specify a size for the empty frame.

13. A computing device as described in claim 8, wherein the empty frame is drawn by forming a self-intersecting line by dragging the second touch input from a first corner to a second corner of the empty frame, the first and second corners being opposing corners of the empty frame.

14. One or more hardware computer readable storage devices comprising instructions stored thereon that, responsive to execution by a computing device, cause the computing device to implement a gesture module configured to:
recognize a first user input as selecting and holding an object displayed at a first location on a touch screen, the first user input being recognized as a first of touch input;
recognize a second user input as drawing an empty frame at a second location on the display device, where the second location is separate and distinct from the first location, the empty frame recognized as being drawn while the object is being selected and held via the first user input, the second user input being recognized as a second touch input that defines at least two points of the empty frame, where the first touch input and the second touch input are each provided by a finger or a stylus; and
detect a fill gesture from the recognized first and second user inputs, the fill gesture effective to use the object selected via the first user input to fill the empty frame defined via the second user input so as to generate and display on the touch screen a filled frame that comprises a version of the selected object within the filled frame at the second location while the selected object remains displayed at the first location.

15. One or more hardware computer readable storage devices as described in claim 14, wherein the first user input is recognized as selecting two points of the selected object.

16. One or more hardware computer readable storage devices as described in claim 14, wherein the version of the selected object is stretched to fill an aspect ratio of the empty frame.

17. One or more hardware computer readable storage devices as described in claim 14, wherein the version of the selected object is a copy of the selected object.

18. One or more hardware computer readable storage devices as described in claim 14, wherein the version of the selected object is shrunk to fit in the empty frame.

19. One or more hardware computer readable storage devices as described in claim 14, wherein the empty frame is drawn via a drag-and-drop gesture to specify a size for the empty frame.

20. One or more hardware computer readable storage devices as described in claim 14, wherein the empty frame is drawn by dragging the second touch input to form a self-intersecting line that intersects opposing corners of the empty frame.

* * * * *